United States Patent
Shirakawa et al.

(10) Patent No.: US 6,539,164 B2
(45) Date of Patent: Mar. 25, 2003

(54) DISK MEDIA, AND METHOD OF AND DEVICE FOR PLAYING BACK INFORMATION ON OR FROM A DISK MEDIA

(75) Inventors: Kouichi Shirakawa, Nagaokakyo (JP);
Tadashi Kasezawa, Nagaokakyo (JP);
Masato Nagasawa, Nagaokakyo (JP);
Yoshihiro Kiyose, Nagaokakyo (JP);
Hiroyuki Ohata, Nagaokakyo (JP);
Hidetoshi Mishima, Nagaokakyo (JP);
Yoshinori Asamura, Nagaokakyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/327,953

(22) Filed: Jun. 8, 1999

(65) Prior Publication Data

US 2001/0031132 A1 Oct. 18, 2001

Related U.S. Application Data

(62) Division of application No. 08/887,929, filed on Jul. 3, 1997, now Pat. No. 5,949,953, which is a continuation of application No. 08/539,339, filed on Oct. 4, 1995, now abandoned.

(30) Foreign Application Priority Data

| Oct. 11, 1994 | (JP) | ............................................. 6-245618 |
| Oct. 28, 1994 | (JP) | ............................................. 6-265421 |
| Nov. 10, 1994 | (JP) | ............................................. 6-276542 |
| Nov. 30, 1994 | (JP) | ............................................. 6-296697 |

(51) Int. Cl.$^7$ .......................... H04N 5/781; H04N 5/783
(52) U.S. Cl. ........................... 386/70; 386/95; 386/111; 386/126
(58) Field of Search .............................. 386/6–8, 33, 45, 386/68, 69, 82, 111, 95, 112, 125, 126, 70, 52, 55, 64, 4; 345/328; 348/7, 13; H04N 5/76, 5/92, 5/783, 5/781, 9/79

(56) References Cited

U.S. PATENT DOCUMENTS 4,937,804 A * 6/1990 Ishihara ....................... 369/48

(List continued on next page.)

FOREIGN PATENT DOCUMENTS

DE 3504354 C2 8/1985

(List continued on next page.)

OTHER PUBLICATIONS

Baron, Stan,; Wilson, W. Robin: MPEG Overview; In: SMPTE Journal, Jun. 1994, pp. 391–394.

(List continued on next page.)

Primary Examiner—Thai Tran
(74) Attorney, Agent, or Firm—Birch, Stewart, Kolasch & Birch, LLP

(57) ABSTRACT

In a video disk recording/playback device for converting a digital video signal or the like into high-efficiency coded data and recording the coded data on a video disk, or for restoring high-efficiency coded data recorded on the video disk and reproducing an output image, wherein said digital video signal is composed of a succession of video signals of a plurality of frames and including an I picture encoded within a frame, a P picture interframe coded by forward motion compensation with reference to said I picture and/or another P picture, and a B picture interframe coded by motion compensation in both directions with reference to said I and/or P pictures temporally preceding and succeeding the B picture, there are further provided a means for recording in an image information table set up on said video disk all of the start addresses of coded data representing selected images such as images to be retrieved and the start addresses of data containing information required for reproducing the coded data. With the above configuration, retrieval of all kinds of images of I, P, and B pictures is possible by recording all of the start addresses of coded data representing selected images such as images to be retrieved and the start addresses of data containing information required for reproducing the coded data in the image information table on the video disk.

36 Claims, 39 Drawing Sheets

U.S. PATENT DOCUMENTS

| | | | |
|---|---|---|---|
| 5,126,991 A | | 6/1992 | Verboom |
| 5,195,068 A | | 3/1993 | Morishima |
| 5,371,602 A | * | 12/1994 | Tsuboi et al. ............... 386/111 |
| 5,371,605 A | | 12/1994 | Masuda et al. |
| 5,428,393 A | * | 6/1995 | Enokida ..................... 386/111 |
| 5,440,345 A | | 8/1995 | Shimoda ..................... 348/411 |
| 5,488,482 A | | 1/1996 | Ueda et al. ................. 386/111 |
| 5,510,840 A | | 4/1996 | Yonemitsu et al. ......... 348/402 |
| 5,539,466 A | | 7/1996 | Igarashi et al. ............. 348/401 |
| 5,566,353 A | * | 10/1996 | Cho et al. .................... 348/13 |
| 5,577,191 A | * | 11/1996 | Bonomi ..................... 348/384 |
| 5,640,601 A | * | 6/1997 | Peters ........................ 386/112 |
| 5,715,356 A | * | 2/1998 | Hirayama et al. .......... 386/112 |
| 5,809,201 A | | 9/1998 | Shirakawa et al. |
| 5,991,502 A | * | 11/1999 | Kawakami et al. ......... 386/125 |
| 6,151,444 A | * | 11/2000 | Abecassis ................... 386/125 |

FOREIGN PATENT DOCUMENTS

| | | |
|---|---|---|
| DE | 4203266 A1 | 8/1992 |
| GB | 2287603 A | 9/1995 |
| JP | 5-74053 | 3/1993 |

OTHER PUBLICATIONS

Teichner, Detlef: Der MPEG 2–Standard; In: Fernseh–und Kino–Technik, 1994, Issue 5, pp. 227 to 230 and 232 to 237.

* cited by examiner

| SELECTED IMAGE | START ADDRESS OF SEQUENCE HEADER | START ADDRESS OF GOP HEADER | START ADDRESS OF SELECTED IMAGE |
|---|---|---|---|
| 1 | 0010 | 0035 | 0070 |
| ⋮ | ⋮ | ⋮ | ⋮ |

FIG. 8
SELECTED IMAGE
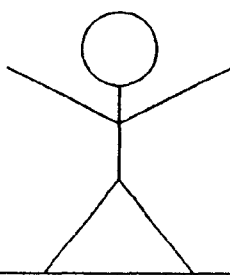
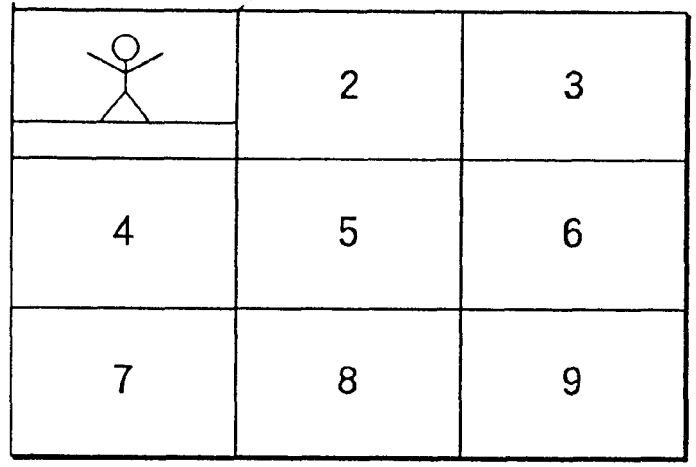
LIST DISPLAY IMAGE

FIG. 11

| ID SIGNAL (114) | SELECTED IMAGE (110) | START ADDRESS OF SEQUENCE HEADER (111) | START ADDRESS OF GOP HEADER (112) | START ADDRESS OF SELECTED IMAGE (113) |
|---|---|---|---|---|
| 3 | 1 | 0010 | 0035 | 0070 |
| 9 | 2 | 0003 | 0020 | 0063 |
| ⋮ | ⋮ | ⋮ | ⋮ | ⋮ |

| FILE TILTLE | TIME | START SECTOR ADDRESS | SIZE | CODING RATE |
|---|---|---|---|---|
| GOP1 | 00 : 12 : 00 | 500000 | 300000 | 4.5 |
| GOP2 | 00 : 12 : 50 | 500300 | 280000 | 4.3 |
| GOP3 | 00 : 13 : 00 | 500580 | 290000 | 4.3 |
| GOP4 | 00 : 13 : 50 | 500870 | 350000 | 5.0 |
|  |  |  |  |  |

| SEQUENCE TITLE | START SECTOR ADDRESS OF GOP FILE | | | | |
|---|---|---|---|---|---|
| No-1 | ADDRESS 1 | ADDRESS 2 | ADDRESS 3 | ADDRESS 4 | ... |
| No-2 | ADDRESS A | ADDRESS B | ADDRESS C | ADDRESS D | ... |
| No-3 | ADDRESS a | ADDRESS b | ADDRESS c | ADDRESS d | ... |
| ⋮ | ⋮ | ⋮ | ⋮ | ⋮ | ... |

DISK MEDIA, AND METHOD OF AND DEVICE FOR PLAYING BACK INFORMATION ON OR FROM A DISK MEDIA

This application is a divisional of application Ser. No. 08/887,929, filed on Jul. 3, 1997 now U.S. Pat. No. 5,949, 953, which is a Rule 62 continuation of application Ser. No. 08/539,339 filed on Oct. 4, 1995 which is now abandoned, the entire contents of which are hereby incorporated by reference.

BACKGROUND OF THE INVENTION

The present invention relates to a disk media, such as a video disk or optical disk for recording a digital image signal, such as an image signal having been coded, e.g., converted to high-efficiency coded data, and a method of and device for recording and playing back a digital image signal on or from such a disk media, a high-efficiency-coded data on a video disk, and method and device for playing back the image by restoring the high-efficiency-coded data from the video disk.

The present invention also relates to a method of performing fast playback or retrieval from a disk media.

FIG. 40 shows a conventional optical disk recording/playback device described in Japanese Patent Kokai Publication No. 114369/1992. As illustrated, it comprises an A/D converter 12 for converting a video signal, audio signal, or the like into digital information, an information compressing means 13, a frame-sector conversion means 14 for converting compressed information into sector information whose length is equal to an integer multiple of a frame, an encoder 15, and a modulator 16 for conversion into modulated codes so as to reduce inter-code interference on a recording media. A laser drive circuit 17 and a laser output switch 18 serve to modulate a laser beam according to the modulated codes.

An optical head 19 is for emitting the laser light. An actuator 20 is for tracking the light beam emitted from the optical head 19. A traverse motor 21 is for moving the optical head 19. A disk motor 22 is for rotating a disk 23. Reference numeral 24 denotes a motor drive circuit, 25 denotes a first control circuit, and 26 denotes a second control circuit. A playback amplifier 27 is for amplifying a playback signal sent from the optical head 19. A demodulator 28 is for acquiring data from a modulated signal that has been recorded. Reference numeral 29 denotes a decoder, and 30 denotes a frame-sector inverse conversion circuit. An information expanding means 31 is for expanding compressed information. A D/A converter 51 is for converting expanded information into, for example, an analog video signal or audio signal.

FIG. 41 is a simplified illustration of a data structure (layered structure) according to the moving picture experts group (hereinafter MPEG) system that is becoming the standard for transmission and storage of digital moving picture information in compressed form.

In FIG. 41, reference numeral 51 denotes a sequence formed of a plurality of image information blocks, also called GOPs (groups of pictures) 52 and sequence headers. Each GOP 52 is formed of a plurality of pictures (screens) or image data for a plurality of frames 53. Each picture (screen) is divided into slices 54, and each of the slices 54 is formed of a plurality of macroblocks 55. Each macroblock 55 is formed of four adjoining blocks 56y of luminance signal (Y), one block 56b of a color difference signal (Cr), and one block 56r of another color difference signal (Cb).

The positions of the blocks 56b and 56r of the color difference signals are associated with the positions of the four blocks 56y of the luminance signal.

One block 56y of luminance signal is formed of eight pixels by eight pixels, and forms a minimum coding unit.

The block 56y, 56b, 56r is regarded as a unit for information compression based on discrete cosine transform (hereinafter DCT). The macroblock 55 is a minimum unit for motion-compensated prediction. Detection of a motion vector used for the motion-compensated prediction is carried out taking in macroblock units, with regard to each macroblock.

The coded data is output as a bit stream (continuous serial data) having a structure described above.

The sequence 51 has a structure shown in FIG. 42. In the figure, 65a, 65b, 65c and 65d denote GOPs, and 66a, 66b and 66d denote sequence headers (SHs). The sequence headers are provided to designate the image format such as the number of pixels, the number of lines of the image, and may be appended to the head of all or only some of the GOPs. In the figure, GOP1, GOP2 and GOP4 are provided with a sequence header appended to the head thereof, while GOP3 is not provided with a sequence header. Provided at the start of the GOP is data (hereinafter referred to as "time code") indicating the time from the start of the sequence (title, program).

FIG. 43 shows a coding scheme for a case where one GOP 52 is composed of ten pictures (screens, frames). In FIG. 43, reference numeral 67 denotes an I picture that is image information subjected to information compression based on intra-frame DCT. 68 denotes a P picture that is image information subjected to the information compression based on intra-frame DCT as well as to motion compensation using the temporally preceding I picture 67 as a reference screen. 69 denotes a B picture subjected to the information compression based on intra-frame DCT and to motion compensation using the temporally preceding and succeeding I and/or another P pictures 67, 68 as reference screens.

Next, the operations of the conventional optical disk recording/playback device will be described. With the advancement of compression of digital image information technology, it has become possible to realize an image filing system in which compressed moving picture information is recorded on optical disks, offering more excellent retrievability than tape media represented by a conventional VTR, and which is easy to use. Since this kind of disk filing system handles digital information, degradations due to copying are not observed. Moreover, since optical recording/playback is employed, a non-contacting and therefore reliable system can be constructed.

Conventionally, recording of compressed moving picture information on an optical disk is achieved by recording digital compressed moving picture information, which conforms to the MPEG system shown in FIG. 41, in an optical disk device shown in the block diagram of FIG. 40. Image information digitized by the A/D converter 12 is transformed by the information compressing means 13 according to the MPEG or any other standard compressed moving picture system. The compressed information is encoded by the encoder 15, and modulated by the modulator 16 in order to reduce the influence of inter-code interference on the optical disk 23. The resultant information is recorded on the optical disk 23. At this time, data is allocated such that, for example, the amount of data per GOP is substantially identical (in other words, at a fixed rate), and data is allocated to sectors whose length is equal to an integer multiple of a frame. This facilitates GOP-by-GOP editing or the like.

For playback, image information read from the optical disk 23 is amplified by the playback amplifier 27. Digital data is then restored by the demodulator 28 and decoder 29. Thereafter, pure and original image data devoid of address and parity bits is restored by the frame-sector inverse conversion means. The information expanding means 31 performs MPEG decoding so as to restore the original digital video signal. The D/A converter 32 provides an analog video signal that can be displayed on a monitor or the like.

Assuming that the aforesaid MPEG system is used for digital moving picture compression, a coding scheme such as the one shown in FIG. 43 is recorded on the optical disk 23 as it is. Herein, the coding scheme is constructed by combining the I picture 67, which has been subjected to information compression based on intra-frame DCT, with several P pictures 68 which have been subjected to information compression by intra-frame DCT and motion compensation using the temporally preceding I picture 67 or another P picture 68 as a reference screen, and several B pictures 69 which have been subjected to information compression, by intra-frame DCT and motion compensation using the I and/or P pictures 67, 68 as reference screens.

The P and B pictures may be coded by reference to other pictures are coded, such that the arrow-headed lines schematically illustrating the relationship between reference pictures and the pictures (predicted pictures) coded using the reference pictures within one GOP as shown in in FIG. 43. With such an arrangement, the P and B pictures are coded by reference to other pictures within the same GOP, then the image signal within one GOP can be decoded independently.

An I picture 67 results from intra-frame DCT, so that an image can be reproduced using the I picture 67 alone. However, with regard to a P picture 68 that results from forward motion compensation, an image cannot be reproduced until the I picture 67 is reproduced. As for a B picture 69 resulting from forward and backward motion compensation, an image cannot be reproduced until the preceding and succeeding I and/or P pictures 67, 68 are reproduced. The B picture 69 resulting from forward and backward motion compensation therefore contains the least amount of data and is coded most efficiently. By contrast, the I picture 67 resulting from compression based solely on intra-frame DCT contains the largest amount of data and is coded least efficiently.

Coding efficiency can be improved by increasing the number of B pictures 69. Increasing the number of B pictures requires increase in the storage capacity of a a buffer memory for storing the I and P pictures 67 and 68 necessary for reproducing the B pictures 69. Moreover, a delay time from the input of data to image reproduction is longer. However, a greater demand on the storage media such as an optical disk is a higher compression efficiency to achieve a longer-time recording, and the delay time for image reproduction does not pose a critical problem. The coding scheme shown in FIG. 43 is therefore suitable.

When data having the above coding scheme is recorded on an optical disk, fast retrieval and playback of an image are accomplished as described below.

That is, when data has the coding scheme shown in FIG. 43, fast playback is enabled by consecutively reproducing only the data representing I pictures 67. After data representing an I picture 67 belonging to a certain GOP is reproduced, a track jump is made to another preceding or succeeding GOP, or at an arbitrary GOP distance, to consecutively reproduce the data of I pictures 67, and to thereby realize fast retrieval or playback at a speed of (number of frames constituting a GOP)×(track jump distance in terms of the number of GOPs) times the normal speed.

Recording digital video signal on recording media such as optical disk using the data compression coding method according to the MPEG system can be achieved either by a method of recording the image signal data of each GOP as a variable amount of data, i.e., recording each GOP with a variable data rate, in order to maintain the picture quality constant between GOPs, as shown in FIG. 44A, or by a method of recording each GOP with a fixed amount of data, i.e., recording each GOP with a fixed data rate, in order to maintain the recording time of each GOP constant, as shown in FIG. 10B.

The former method is advantageous in increasing the recording density on the disk, while the latter method is advantageous in that it is easy to predict the recording position of the image data in retrieving an image signal at a known time from the start of the image of one sequen(e (title, program).

In the former method, the amount of data per COP varies with time depending on the nature of the pictures forming the GOP, as shown in FIG. 45A, in which ($\alpha$) represents the maximum data rate and ($\beta$) represents the average data rate. For instance, the picture quality per GOP and the amount of data for each of the three types of images V1, V2 and V3 are as shown in FIG. 45B. It is seen that in the former method, the picture quality is maintained constant by varying the amount of data per GOP of the image.

A disk playback device using the image signal, coding method according to the MPEG method is a video CD (compact disc) player. FIG. 46 schematically illustrates a track configuration in a video CD and a data configuration within the user region of one sector in a track. A margin of a predefined number of sectors is provided at the head and tail of each track, and other sectors in combination form one unit of transmission (pack) of MPEG data. Time stamp data indicating the time from the start of the recorded sequence (title, program) is recorded at the head of the one pack of image data.

The method of recording each GOP with a fixed amount of data, i.e., with a fixed data rate is used for the image signal coded by the MPEG system.

In such video CD, the image signal and audio signal of one entire sequence (title, program) that are recorded are treated as one data file. The GOPs forming the data are successively recorded in consecutive sectors on the disk as consecutive data as shown in FIG. 42. File management data such as file identification data and start sector address, not shown, are recorded in the track at the head of the disk, and the access to the file consisting of the image signal and the audio signal of the desired title can be made on the basis of the file management data.

Image signal of the desired sequence (title, program) can be reproduced by successively accessing the sectors, from the sector at the head of the region where the file is recorded, in accordance with the start sector address of the data file corresponding to the sequence, by referring to the file management data.

Generally, data on the recording media such as disks are physically recorded in sectors forming units of recording, and recording (writing) and reproduction (reading) of data are performed taking each sector as a unit of access.

When a GOP in the middle of a sequence (title, program) is to be reproduced, a sector in the middle of the succession of the sectors where the data file is recorded is accessed first. However, the GOP data in the pack of each sector is recorded as consecutive data, as shown in FIG. 46, the GOP data data read first is from the middle of a GOP, and the other part partially recorded in the immediately preceding sector will be dropped in the reproduced data.

Accordingly, the reference picture data used for coding P and B pictures in the GOP read first is missing, and image obtained by decoding them would be unnatural, so that they would not be used for playback of the image.

The GOP in the middle of a sequence (title, program), at a desired time from the start of the sequence is to be reproduced, the sector address where the desired GOP is recorded is first predicted, on the basis of the fixed rate of the recorded image signal. Then, access is made to the predicted sector address, and the signal recorded in the sector is read, and the time stamp data in it is detected. By comparing the contents of the detected time stamp data with the desired time instant, the sector where the desired GOP is recorded is identified. Then, the GOPs are successively read, from the first GOP recorded in the sector, and the time code at the head of each GOP is detected, and when the time code is of the desired time instant, the GOP is found to be the desired GOP, and the GOP is decoded to produce the playback image.

In a coding scheme recorded on a video disk is configured as described above, only I-pictures can be decoded by themselves. An image that can be retrieved has therefore been limited to the I pictures.

Moreover, with the conventional video disk recording/playback device or playback device, it is not possible to identify the video disk being recorded or played back, so that images to be retrieved, images from which the playback should start, and the like are not known.

When a GOP in the middle of a sequence (title, program) is reproduced, the GOP which is read first from the sector accessed first has its part missing, so that it would produce unnatural image if it were decoded and output. Accordingly, it is not used, and as a result, there is a time delay before the image signal is reproduced and displayed.

Moreover, when the conventional recording method is applied to a write-once media, and when editing, such as overwriting or tag recording is conducted, the image signal is recorded consecutively in the recording region within the sector, so that when the GOP to be overwritten is in the middle of the sector, and if the entire sector is overwritten, the tail part of the GOP preceding the GOP to be edited will be missing, and when the edit point is reproduced, the GOP preceding the GOP having been edited will not be reproduced and the image will be missing. Even if the reproduction is forcibly made, a resultant image would be unnatural.

Furthermore, when the conventional recording method is applied to a write-once media, the entire sequence is treated as one file, and recorded in consecutive sectors on the disk. During playback, the position on the disk where the file is recorded can be identified only by the start sector address which is the file management data. It is not possible to utilize, for recording and playback, vacant sectors which result by repeating erasure and recording. Thus, the recording regions on the disk are not effectively utilized.

In addition, when a GOP in the middle of a sequence (title, program) is reproduced, and when a GOP at a desired time from the start of the sequence is to be reproduced, it is necessary to follow a complicated process wherein the sector address of the sector where the desired GOP is recorded is predicted on the basis of the data rate of the image signal, and by comparing the time stamp data indicating the recording time of the sector and desired time instant, the sector where the desired GOP is recorded is identified, and by comparing the time code at the head of the GOPs successively read from the sector, with the desired time instant, the desired GOP is identified. It is therefore not possible to promptly identify the sector where the desired GOP is recorded, and there is a certain time delay before the image signal is reproduced. Moreover, where the image signal of each GOP is recorded with a variable data rate, the time from the start of the sequence and the recording position are not proportional, so the prediction of the sector address of the sector where the GOP of the desired time instant is recorded is difficult, and there is a further delay before the image signal is reproduced.

Furthermore, in the conventional optical disk recording/playback device having the aforesaid configuration, only the I pictures of GOPs are reproduced consecutively. When it is taken into account that human eyes are sensitive to what is called a "scene change;" such as a change in strength of a luminance signal, the fast playback or retrieval is not always satisfactory to viewers.

In addition, as for fast playback or retrieval achieved by consecutively reproducing I pictures alone, positions of the I pictures in GOPs do not have correlation to positions of the I pictures on recording tracks on an optical disk. When an image compression ratio for recording is varied, the length of each GOP itself is not fixed. The correlation becomes even less. When a track jump is made, it is difficult to specify a start position of an I picture of each GOP. Every time a jump is made to another track, a random rotation wait time arises, and consecutive reproduction of I pictures cannot be made smoothly.

Furthermore, the speed of fast playback or retrieval cannot be raised in harmony with human visual characteristics.

SUMMARY OF THE INVENTION

An object of the present invention is to solve the foregoing problems.

Another object of the present invention is to enable high high-speed retrieval of any of I, P, and B pictures during image retrieval.

Another object of the present invention is to provide a video disk recording/playback device enabling selection of an image such as an image to be retrieved from images represented by a video signal during recording of the video signal on a video disk or the like.

Another object of the present invention is to enable selection of an image such as an image to be retrieved from reproduced images during reproduction of a video signal recorded on a video disk or the like.

Another object of the present invention is to enable a user to determine or retrieve recorded contents readily by simultaneously displaying a plurality of images such as images to be retrieved that have been recorded on a video disk or the like.

Another object of the present invention is to enable high-speed retrieval of all kinds of images of I, P, and B pictures during image retrieval.

A further object of the invention is to shorten the time required taken before reproducing the image signal and displaying it, when a coding unit, such as a GOP, which is in the middle of the image signal as a whole, such as a sequence (title, program), is to be reproduced.

Another object of the invention is to facilitate editing such as overwriting and tag recording taking each coding unit as a unit, and to avoid dropout of playback image.

Another object of the invention is to utilize the vacant sectors distributed throughout the disk media, to play back.

Another object of the invention is to identify readily and promptly the position at which the coding unit at a desired time instant is recorded and to shorten the time taken before the image signal is reproduced, when a coding unit, such as a GOP which is in the middle of the image signal as a whole, such as a sequence (title, program) is played back, and in particular when playback is started at a coding unit at a desired time from the starting point of the sequence.

A further object of the present invention is to enable fast playback or retrieval suitable to viewer's visual characteristics, to reproduce consecutive I pictures smoothly, and to raise the speed of fast playback or retrieval in harmony with human visual characteristics.

According to one aspect of the invention, there is provided a video disk recording and playback method wherein a digital video signal or the like is converted into high-efficiency coded data, and the coded data is recorded on a video disk, or the high-efficiency coded data recorded on the video disk or the like is restored and an output image or the like is reproduced, wherein said digital video signal is composed of a succession of video signals of a plurality of frames and including an I picture encoded within a frame, a P picture interframe coded by forward motion compensation with reference to said I picture and/or another P picture, and a B picture interframe coded by motion compensation in both directions with reference to said I and/or P pictures temporally preceding and succeeding said B picture, and the start addresses of coded data representing selected images such as images to be retrieved and the start addresses of data containing information required for reproducing the coded data are all recorded in an image information table set up on said video disk.

The above recited video disk recording/playback method enables retrieval of all kinds of images of I, P, and B pictures by recording in the image information table set up on the video disk all of the start addresses of coded data representing selected images such as images to be retrieved and the start addresses of data containing information required for reproducing the coded data.

According to another aspect of the invention, there is provided a video disk recording/playback device for converting a digital video signal or the like into high-efficiency coded data and recording the coded data on a video disk, or for restoring high-efficiency coded data recorded on the video disk and reproducing an output image, wherein said digital video signal is composed of a succession of video signals of a plurality of frames and including an I picture encoded within a frame, a P picture interframe coded by forward motion compensation with reference to said I picture and/or another P picture, and a B picture interframe coded by motion compensation in both directions with reference to said I and/or P pictures temporally preceding and succeeding the B picture, wherein said video disk recording/playback device further comprises a means for recording in an image information table set up on said video disk all of the start addresses of coded data representing selected images such as images to be retrieved and the start addresses of data containing information required for reproducing the coded data.

It may so arranged that said recording means records, in an image information table set up on said video disk, all of said start addresses of coded data representing selected images and the start addresses of the data containing information required for reproducing the coded data.

The above recited video disk recording/playback device enables retrieval of all kinds of images of I, P, and B pictures by recording all of the start addresses of coded data representing selected images such as images to be retrieved and the start addresses of data containing information required for reproducing the coded data in the image information table on the video disk.

The video disk recording/playback device may further comprise a means for selecting one of input images as a selected image during recording of said input images on the video disk.

The above recited video disk recording/playback device enables selection of any of images represented by an input image signal as a selected image such as an image to be retrieved during recording of the input image signal on the video disk.

The video disk recording/playback device may further comprise a means for selecting one of output images as a selected image during restoration of coded data recorded on the video disk and output of said output images.

The above recited video disk recording/playback device enables selection of any of images represented by an output signal as a selected image such as an image to be retrieved during output of a video signal recorded on the video disk.

The video disk recording/playback device may further comprise a means for performing low-pass filtering on selected images that have been decoded, a means for performing sub-sampling on images that have been filtered, and a means for storing the images that have been obtained by the sub-sampling, and displaying a single or a plurality of select screens recorded on the video disk as small screens that are N (N≧1) fractions of one screen.

The above recited video disk recording/playback device enables identification or retrieval of contents recorded on the video disk by displaying any number of selected images recorded on the video disk as small screens that are 1/N fractions of one screen.

It may so arranged that said recording means also stores an ID signal for identifying the video disk.

With the above arrangement, it is possible to retrieve any of the I, P and B pictures.

According to another aspect of the invention, there is provided a video disk playback device for playing back from a video disk on which a high-efficiency coded data of a digital video signal is recorded, wherein the digital video signal is a succession of image signals of several frames comprising in combination an I-picture coded within the frame, a P picture inter-frame coded by forward motion compensation with reference to the I picture or another P picture, and B pictures inter-frame coded by both directional motion compensation with reference to the I and/or P pictures positioned in front and at the back, said device comprising:

means for storing a start address of the coded data of the selected image, a start address of the data containing information required for reproducing coded data, and an ID signal for identifying the video disk, and means for obtaining the ID signal from the bit sequence recorded in a specific part of the video disk.

With the above arrangement, it is possible to retrieve any of the I, P and B pictures.

According to another aspect of the invention, there is provided a video disk on which high-efficiency coded data transformed from a digital video signal or the like is recorded, wherein said digital video signal is composed of a succession of video signals of a plurality of frames and including an I picture to be encoded within a frame, a P picture interframe coded by forward motion compensation with reference to said I picture and/or another P picture, and a B picture interframe coded by motion compensation in both directions with reference to said I and/or P pictures temporally preceding and succeeding the B picture, and said video disk has an image information table in which the start addresses of coded data representing selected images such as images to be retrieved and the start addresses of data containing information required for reproducing the coded data are all recorded.

The above recited video disk enables retrieval of all kinds of images of I, P, and B pictures by recording in the image information table set up on the video disk all of the start addresses of coded data representing selected images such as images to be retrieved and the start addresses of data containing information required for reproducing the coded data.

According to another aspect of the invention, there is provided an image signal recording method in which an image signal is divided into coding units each corresponding to a predefined number of images, and the coding units are separately coded, and recorded onto a disk media, comprising the steps of:

generating data files for the coded data of each of coding units; and recording the data files, from the start of the sector which is a unit of access on the disk media.

With the above arrangement, when the image signal of the coding units at a position in the middle of an image signal as a whole is reproduced from a disk media, the coded data in the coding unit read from the sector accessed first will not be dropped, and the decoding and output can be started from the coded data of the coding unit recorded at the start of the sector without fail. As a result, the time required from the reproduction of the image signal and before the image is displayed can be shortened. Moreover, when editing such as overwriting or tag recording, taking each coding unit as a unit, it is possible to avoid dropout of the coded data of the coding units, before the editing. As a result, editing such as overwriting or tag recording taking each coding unit as a unit can be made easily, and dropout of the image signal will not occur when the edit point is reproduced.

It may so arranged that information indicating the order of playback is recorded in a predefined sector region of the disk media.

With the above arrangement, during playback, the information indicating the order of playback of the data files is detected, and the data files can be read according to the order of playback of data files indicated thereby, to reproduce the image signal. As a result, the vacant sectors distributed over the disk media can be effectively utilized for recording and playback.

According to another aspect of the invention, there is provided an image signal recording device in which an image signal is divided into coding units each corresponding to a predefined number of images, and the coding units are separately coded, and recorded onto a disk media, comprising:

data file generation means for generating data files for the coded data of each of coding units;

data recording means for recording data in sectors which are units of access on the disk media; and recording control means for controlling the data recording means such that data files are recorded from the start of the sector.

With the above arrangement, when the image signal of the coding units at a position in the middle of an image signal as a whole is reproduced from a disk media, the coded data in the coding unit read from the sector accessed first will not be dropped, and the decoding and output can be started from the coded data of the coding unit recorded at the start of the sector without fail. As a result, the time required from the reproduction of the image signal and before the image is displayed can be shortened. Moreover, when editing such as overwriting or tag recording, taking each coding unit as a unit, it is possible to avoid dropout of the coded data of the coding units, before the editing. As a result, editing such as overwriting or tag recording taking each coding unit as a unit can be made easily, and dropout of the image signal will not occur when the edit point is reproduced.

The image signal recording device may further comprise playback order information generating means for generating information indicating the order of playback of the data files, said recording means controls the data recording means such that the information indicating the order of playback of the data files generated by the playback order information generating means is recorded in a predefined section region on the disk media.

With the above arrangement, during playback, the information indicating the order of playback of the data files is detected, and the data files can be read according to the order of playback of data files indicated thereby, to reproduce the image signal. As a result, the vacant sectors distributed over the disk media can be effectively utilized for recording and playback.

According to another aspect of the invention, there is provided an image signal playback method of playing back image signal in coding units positioned in the middle of the image signal as a whole, from a disk media on which data files formed for each coded data, obtained by dividing an image signal into coding units each corresponding to a predefined number of images, and separately coding the coding units, comprising the steps of:

reading data from sector group in which data files are generated from the coded data in the coding units positioned in the middle within the image signal as a whole;

restoring the coding units obtained by coding from the start of the coded data read from the sector recorded first, among the sector group; and decoding and outputting the coding data in the coding units having been restored.

With the above arrangement, even when the coding units at a position in the middle of the image signal as a whole is to be reproduced, it is not necessary to consider the dropout of the coded data, and the coded data read from the sector recorded first can be taken as the first image for playback and display. As a result, the time required from the reproduction of the image signal and before the image is displayed can be shortened. Moreover, when editing such as overwriting or tag recording, taking each coding unit as a unit, it is possible to avoid dropout of the coded data of the coding units, before the editing. As a result, editing such as overwriting or tag recording taking each coding unit as a unit can be made easily, and dropout of the image signal will not occur when the edit point is reproduced.

According to another aspect of the invention, there is provided an image signal playback device for playing back image signal in coding units from a disk media on which data files formed for each coded data, obtained by dividing an image signal into coding units each corresponding to a predefined number of images, and separately coding the coding units, comprising data read means for reading data from the sector;

read control means for generating sector addresses of the sectors to be accessed, and controlling the data read means such that it reads the data from the sectors of the sector addresses; and coding unit restoring means for restoring the coding units from the coded data having read by means of the data read means;

wherein when the image signal in the coding units positioned in the middle of the image signal as a whole is played back, said read control means generates sector address group recorded in the data file in which the coding unit in question is contained, and said coding unit restoring means restores the coding units from the start of the coded data having been read by the read means, from the sector in which the data filed is first recorded, of the sector group corresponding to the sector address group.

With the above arrangement, even when the coding units at a position in the middle of the image signal as a whole is to be reproduced, it is not necessary to consider the dropout of the coded data, and the coded data read from the sector recorded first can be taken as the first image for playback and display. As a result, the time required from the reproduction of the image signal and before the image is displayed can be shortened. Moreover, when editing such as overwriting or tag recording, taking each coding unit as a unit, it is possible to avoid dropout of the coded data of the coding units, before the editing. As a result, editing such as overwriting or tag recording taking each coding unit as a unit can be made easily, and dropout of the image signal will not occur when the edit point is reproduced.

According to another aspect of the invention, there is provided an image signal playback method of playing back image signal from a disk media on which data files formed for each coded data, obtained by dividing an image signal into coding units each corresponding to a predefined number of images, and separately coding the coding units, and information indicating the order of playback of the data files is recorded in a predefined sector region, comprising the steps of:

detecting information indicating the order of playback of the data files, from the data read from the predefined sector region;

reading data files from the disk media on the basis of the information indicating the order of playback of the data files having been detected; and decoding the coded data in the coding units contained in the data file having been read, so as to reproduce image data.

With the above arrangement, the image signal recorded in the sectors distributed over the disk media can be reproduced, and vacant sectors distributed over the disk media can be utilized effectively for recording and playback.

According to another aspect of the invention, there is provided an image signal playback device for playing back image signal from a disk media on which data files formed for each coded data, obtained by dividing an image signal into coding units each corresponding to a predefined number of images, and separately coding the coding units, and information indicating the order of playback of the data files is recorded in a predefined sector region, comprising the steps of:

data read means for reading data from the sector;

read control means for generating sector addresses of the sectors to be accessed, and controlling the data read means such that it reads the data from the sector of the sector address;

playback order information detecting means for detecting the information indicating the order of playback of the data files from the data read by means of the read means; and decoding means for decoding the coded data in the coding units contained in the data file having been read by means of the read means;

wherein when the playback is started said read control means generates sector addresses of the predefined sector region in which the information indicating the order of playback of the data files is recorded, and after the playback order information is detected by the playback order information detecting means from the data having been read from the data by the data read means, the sector addresses are generated on the basis of the playback order information detecting means.

With the above arrangement, the image signal recorded in the sectors distributed over the disk media can be reproduced, and vacant sectors distributed over the disk media can be utilized effectively for recording and playback.

According to another aspect of the invention, there is provided a An image signal recording method of recording image signal after dividing the image signal into coding units each corresponding to a predefined number of images, and separately coding the coding units, comprising the steps of:

generating a data file for each of the coded data in the coding unit;

generating data file identification information indicating a position within the image signal as a whole and a position of recording on the disk media, for each data file corresponding to the coding unit; and recording the data file and the data file identification information in the respective predefined regions of the disk media.

With the above arrangement, when the image signal of the coding unit at a position in the middle of the image signal as a whole is reproduced, it is possible to readily and promptly identify the position on the disk media where the desired coding unit is recorded, by detecting the data file identification information, so that the time required for the reproduction of the image signal can be shortened.

According to another aspect of the invention, there is provided an image signal recording device for recording coding units each corresponding to a predefined number of images, and separately coding the coding units, and recording the coding units on a disk media, comprising:

data file generating means for generating data file for each coding data in the coding unit;

data file identification means for generating data file identification information a position within the image signal as a whole and a position of recording on the disk media, for each data file corresponding to the coding unit;

data recording means for recording the data in the sector which is a unit of access on the disk media; and recording control means for controlling the data recording means such that it records the data file and the data file identification information in the respective predefined regions of the disk media.

With the above arrangement, when the image signal of the coding unit at a position in the middle of the image signal as a whole is reproduced, it is possible to readily and promptly identify the position on the disk media where the desired coding unit is recorded, by detecting the data file identification information, so that the time required for the reproduction of the image signal can be shortened.

According to another aspect of the invention, there is provided an image signal playback method of playing back image signal in the coding units positioned in the middle of the image signal as a whole, from a disk media in which data files containing signals obtained by coding the coding units consisting of image signals of a predefined number of images and data file information indicating the position within the image signal as a whole and the recording position on the disk media for each of the data files corresponding to the coding units are recorded in respective predefined sector regions of the disk media, comprising the steps of:

inputting the position identification signal indicating the position of the coding unit to be reproduced, within the image signal as a whole;

detecting the data file identification signal from the signals read from the predefined sector regions on the disk media;

identifying the recording position on the disk media of the data file corresponding to the coding unit which is at a position indicated by the position identification signal;

reading the data file on the basis of the position on the disk media that has been identified; and decoding the signal coded for each coding unit, contained in the data file having been read, and reproducing an image signal.

With the above arrangement, it is possible to readily and promptly identify the position in which a certain coding unit is recorded at a desired time instant, and it is possible to shorten the time required for the reproduction of the image signal.

According to another aspect of the invention, there is provided an image signal playback device of playing back image signal from a disk media in which data files containing signals obtained by coding the coding units consisting of image signals of a predefined number of images and data file information indicating the position within the image signal as a whole and the recording position on the disk media for each of the data files corresponding to the coding units are recorded in respective predefined sector regions of the disk media, comprising the steps of:

position identification signal input means for inputting the position identification signal indicating the position of the coding unit to be reproduced, within the image signal as a whole;

data read means for reading data from the sector of the disk media;

read control means for generating the sector address of the sectors to be accessed and controlling the data read means such that it reads the data from the sectors of the sector addresses;

data file identification information detecting means for detecting the data file identification information from the data read by the data read means;

recording sector identification means for identifying the sector in which the data file is recorded on the disk media, on the basis of the data file identification information; and decoding means for decoding the signal coded in the coding units, contained in the data file having been read, and reproducing the image signal;

wherein when the image signal in the coding units positioned in the middle within the image signal as a whole is reproduced, said recording sector identification means identifies the sector in which the data file corresponding to the coding unit at a position indicated by the position identification signal input by means of the position identification signal input means is recorded;

said read control means generates sector addresses on the basis of the sector in which the data file corresponding to the coding unit at a position indicated by the position identification signal identified by the recording sector identification means is recorded.

With the above arrangement, it is possible to readily and promptly identify the position in which a certain coding unit is recorded at a desired time instant, and it is possible to shorten the time required for the reproduction of the image signal.

According to another aspect of the invention, there is provided an An image signal recording disk media in which data file generated for each coding data obtained by dividing an image signal into coding units of a predefined number of images and coding each coding unit separately is recorded from the start of the sector which is a unit of access.

With the above arrangement, when the image signal, of the coding units at a position in the middle of an image signal as a whole is reproduced from a disk media, the coded data in the coding unit read from the sector accessed first will not be dropped, and the decoding and output can be started from the coded data of the coding unit recorded at the start of the sector without fail. As a result, the time required from the reproduction of the image signal and before the image is displayed can be shortened. Moreover, when editing such as overwriting or tag recording, taking each coding unit as a unit, it is possible to avoid dropout of the coded data of the coding units, before the editing. As a result, editing such as overwriting or tag recording taking each coding unit as a unit can be made easily, and dropout of the image signal will not occur when the edit point is reproduced.

It may so arranged that information indicating the order of playback of the data files is recorded in a predefined sector region.

With the above arrangement, during playback, the information indicating the order of playback of the data files is detected, and the data files can be read according to the order of playback of data files indicated thereby, to reproduce the image signal. As a result, the vacant sectors distributed over the disk media can be effectively utilized for recording and playback.

According to another aspect of the invention, there is provided an image signal recording disk media wherein data file containing the signal obtained by coding the coding units consisting of an image signal of a predefined number of images and data file identification information indicating the position within the image signal as a whole and the recording position on the disk media, for each of data files corresponding to the coding units are recorded in respective predefined sector regions on the disk media.

With the above arrangement, when the image signal of the coding unit at a position in the middle of the image signal as a whole is reproduced, it is possible to readily and promptly identify the position on the disk media where the desired coding unit is recorded, by detecting the data file identification information, so that the time required for the reproduction of the image signal can be shortened.

According to another aspect of the invention, there is provided an optical disk recording/playback device comprising:

an A/D conversion means for sampling an input image signal at a given interval so as to produce frame images;

an information compressing means for constructing an image information block using several consecutive frames images to several tens of consecutive frame images, performing information compression on part of frame images constituting said image information block so as to produce a two-dimensionally compressed frame image, and performing information compression on the remaining frame images according to motion vectors detected between said frame images so as to produce three-dimensionally compressed frame images;

a scene change detecting means for detecting a scene change between said image information blocks on the basis of frame images obtained by sampling said image information blocks at a given interval;

a recording means for recording image information blocks having been subjected to the information compression by said information compressing means and scene change information detected by said scene change detecting means, on an optical disk; and a reproducing means for consecutively reproducing the two-dimensionally compressed frame images of said image information blocks, for which scene changes have occurred, according to said scene change information recorded on said optical disk.

With the above arrangement, address information of the two-dimensionally compressed frame images of image information blocks for which scene changes have occurred is recorded on an optical disk together with the image information blocks, data at positions specified with the address information is consecutively reproduced during playback, and thus fast playback or retrieval of an image signal is achieved.

It may be so arranged that the positions of the two-dimensionally compressed frame image and three-dimensional frame images in each image information block can be varied, and the frame images can be divided, and therefore the start positions of the two-dimensionally compressed frame images of the image information blocks are aligned along predetermined radial lines of the optical disk on recording tracks thereof.

With the above arrangement, the positions of two-dimensional and three-dimensionally compressed frame images in each image information block can be varied, and compressed frame images can be divided, and the start positions of the two-dimensionally compressed images of image information blocks will always coincide with specific positions on an optical disk. The randomness of a rotation wait time associated with a track jump during fast playback or retrieval can therefore be eliminated.

It may be so arranged that a plurality of threshold levels are defined for scene change detection, scene change information acquired using the respective threshold levels is recorded on said optical disk, and only the two-dimensionally compressed frame images of image information blocks for which scene changes have occurred using the scene change information corresponding to the selected threshold levels are reproduced consecutively.

With the above arrangement, a plurality of threshold values are defined for scene change detection. Fast playback or retrieval of an image signal can therefore be achieved at different speeds.

It may be so arranged that scene change information detected by said scene change detecting means is recorded in a given area defined along an inner or outer circumference of said optical disk, a header part of the two-dimensionally compressed frame image is used for recording an address information indicating the position of the two-dimensionally compressed frame image contained in an image information block adjoining an image information block containing the two-dimensionally compressed frame image, and either of a scene change playback mode, in which only the two-dimensionally compressed frame images of image information blocks for which scene changes have been detected are reproduced consecutively from said optical disk according to said scene change information, or an adjoining image information block playback mode, in which the two-dimensionally compressed frame images of adjoining image information blocks are reproduced consecutively from said optical disk according to said address information, can be selected.

With the above arrangement, address information of the two-dimensionally compressed frame images of image information blocks for which scene changes have been detected, and address information of the two-dimensionally compressed frame images of adjoining image information blocks are recorded mutually independently on an optical disk. For playback, either of the address information can be selected according to the purpose of use to achieve fast playback or retrieval of an image signal.

According to another aspect of the invention, there is provided an optical disk recording device comprising:

an A/D conversion means for sampling an input image signal at a given interval so as to produce frame images;

an information compressing means for constructing one image information block using several consecutive frame images to several tens consecutive frame images, performing information compression on part of frame images constituting said image information block so as to produce a two-dimensionally compressed frame image, and performing information compression on the remaining frame images according to motion vectors detected between said frame images so as to produce three-dimensionally compressed frame images;

a scene change detecting means for detecting a scene change between said image information blocks on the basis of frame images obtained by sampling said image information blocks at a given interval; and a recording means for recording image information blocks having been subjected to information compression by said information compressing means and scene change information detected by said scene change detecting means, on an optical disk.

With the above arrangement, address information of the two-dimensionally compressed frame images of image information blocks for which scene changes have occurred is recorded on an optical disk together with the image information blocks.

It may be so arranged that the positions of the two-dimensionally compressed frame image and three-dimensionally compressed frame images in each image information block can be varied, frame images can be divided, and image information blocks are recorded in such a way that the start positions of the two-dimensionally compressed frame images of image information blocks are aligned along predetermined radial lines of said optical disk on recording tracks thereof.

With the above arrangement, the positions of two-dimensionally and three-dimensionally compressed image frames in each image information block can be varied, and compressed image frames can be divided, so that the start positions of the two-dimensionally compressed frame images of image information blocks will always coincide with specific positions on an optical disk.

It may be so arranged that a plurality of threshold levels are defined for scene change detection, and scene change information acquired for the respective threshold levels is recorded on said optical disk.

With the above arrangement, scene change information is detected and recorded for a plurality of threshold values.

It may be so arranged that said scene change information detected by said scene change detecting means is recorded in a given area defined along an inner or outer circumference of said optical disk, and a header part of the two-dimensionally compressed frame image is used for recording an address information indicating the position of the two-dimensionally compressed frame image contained in an image information block adjoining an image information block containing the two-dimensionally compressed frame image.

With the above arrangement, address information of the two-dimensionally compressed frame images of image information blocks for which scene changes have been detected and address information of the two-dimensionally compressed frame images of adjoining image information blocks are mutually independently recorded on an optical disk.

According to another aspect of the invention, there is provided an optical disk playback device for reproducing images from an optical disk on which image information blocks each serving as a recording unit formed by combining several frames to several tens of frames of I, P and B pictures, with an I picture being a frame image having been obtained by two-dimensional information compression based on frequency transformation, and P and B pictures that are frame images having been obtained by three-dimensional information compression based on frequency transformation and motion-compensated prediction, and scene change information detected between said image information blocks are recorded, and comprising:

a scene change reproducing means for reproducing said scene change information from said optical disk; and an image reproducing means for consecutively reproducing only the I pictures of image information blocks for which scene changes have been detected, according to reproduced scene change information.

With the above arrangement, based on address information of I pictures of image information blocks which are recorded on an optical disk and for which scene changes have occurred, the I pictures alone are consecutively reproduced to thus achieve fast playback or retrieval of an image signal.

It may be so arranged that the start positions of the I pictures of image information blocks recorded on said optical disk are aligned along given radial lines of said optical disk on recording tracks thereof.

With the above arrangement, the start positions of I pictures of image information blocks always coincide with specific positions on an optical disk. The randomness of a rotation wait time associated with a track jump during fast playback or retrieval can therefore be eliminated.

It may be so arranged that said scene change information is detected between image information blocks for a plurality of threshold levels, said scene change reproducing means reproduces scene change information for a threshold level selected by a selecting means, and consecutively reproduces from said optical disk only the I pictures of image information blocks for which scene changes have been detected, according to said scene change information.

With the above arrangement, I pictures selected according to scene change information detected for a plurality of thresholds are consecutively reproduced. Fast playback or retrieval of an image signal can therefore be achieved at different speeds.

It may be so arranged that said scene change information is recorded in a given area defined along an inner or outer circumference of said optical disk, a header part of the I picture is used for recording the address information indicating the position of an I picture contained in an image information block adjoining an image information block containing the I picture, and said optical disk reproducing device further comprises a mode selecting means for use in selecting either of a scene change playback mode, in which only the I pictures of image information blocks for which scene changes have been detected are consecutively reproduced from said optical disk according to said scene change information, or an adjoining image information block playback mode, in which I pictures of adjoining image information blocks are consecutively reproduced from said optical disk according to said address information.

With the above arrangement, either a scene change playback mode, in which only the I pictures of image information blocks for which scene changes have been detected are consecutively reproduced, or an adjoining image information block playback mode, in which I pictures of adjoining image information blocks are consecutively reproduced, can be selected according to the purpose of use.

According to another aspect of the invention, there is provided an optical disk recording/playback method comprising the step of:

sampling an input image signal at a given interval so as to produce frame images, constructing one image information block using images of several consecutive frame images to several tens of consecutive frame images, performing information compression on part of frame images constituting said image information block so as to produce a two-dimensionally compressed frame image, and performing information compression on the remaining frame images according to motion vectors detected between said frame images so as to produce three-dimensionally compressed frame images;

detecting a scene change between said image information blocks on the basis of frame images obtained by sampling said image information blocks at a given interval;

recording image information blocks subjected to said information compression and scene change information on an optical disk; and consecutively reproducing only the two-dimensionally compressed frame images of said image information blocks for which scene changes have occurred, according to scene change information recorded on said optical disk.

With the above arrangement, address information of the two-dimensionally compressed frame images of image information blocks for which scene changes have occurred is recorded on an optical disk together with the image information blocks, data at positions specified with the address information is consecutively reproduced during playback, and thus fast playback or retrieval of an image signal is achieved.

It may be so arranged that the positions of the two-dimensionally compressed frame image and three-dimensionally compressed frame images in each image information block can be varied, frame images can be divided, and the start positions of the two-dimensionally compressed frame images of image information blocks are aligned along predetermined radial lines of said optical disk on recording tracks thereof.

With the above arrangement, the positions of two-dimensional and three-dimensionally compressed frame images in each image information block can be varied, and compressed frame images can be divided, and the start positions of the two-dimensionally compressed images of image information blocks will always coincide with specific positions on an optical disk. The randomness of a rotation wait time associated with a track jump during fast playback or retrieval can therefore be eliminated.

It may be so arranged that a plurality of threshold levels are defined for scene change detection, scene change information acquired for the respective threshold levels is recorded on said optical disk, and only the two-dimensionally compressed frame images of image information blocks for which scene changes have occurred are reproduced consecutively according to scene change information associated with a selected threshold level.

With the above arrangement, a plurality of threshold values are defined for scene change detection. Fast playback or retrieval of an image signal can therefore be achieved at different speeds.

It may be so arranged that scene change information detected by said scene change detecting means is recorded in a given area defined alone an inner or outer circumference of said optical disk, a header part of the two-dimensionally compressed frame image is used for recording an address information indicating the position of the two-dimensionally compressed frame image contained in an image information block adjoining an image information block containing the two-dimensionally compressed frame image, either a scene change playback mode, in which only the two-dimensionally compressed frame images of image information blocks for which scene changes have been detected are consecutively reproduced from said optical disk according to said scene chance information, or an adjoining image information block playback mode, in which the two-dimensionally compressed frame images of adjoining image information blocks are consecutively reproduced from said optical disk according to said address information, can be selected.

With the above arrangement, address information of the two-dimensionally compressed frame images of image information blocks for which scene changes have been detected, and address information of the two-dimensionally compressed frame images of adjoining image information blocks are recorded mutually independently on an optical disk. For playback, either of the address information can be selected according to the purpose of use to achieve fast playback or retrieval of an image signal.

According to another aspect of the invention, there is provided an optical disk recording method comprising the steps of:

sampling an input image signal at a given interval so as to produce frame images;

constructing one image information block using several consecutive frame images to several tens of consecutive frame images, performing information compression on part of frame images constituting said image information block so as to produce a two-dimensionally compressed frame image, and performing information compression on the remaining frame images according to motion vectors detected between said frame images so as to produce three-dimensionally compressed frame images;

detecting a scene change between said image information blocks on the basis of frame images obtained by sampling said image information blocks at a given interval; and recording image information blocks subjected to information compression and scene change information on an optical disk.

With the above arrangement, address information of the two-dimensionally compressed frame images of image information blocks for which scene changes have occurred is recorded on an optical disk together with the image information blocks.

It may be so arranged that the positions of the two-dimensionally compressed frame image and three-dimensionally compressed frame images in each image information block can be varied, frame images can be divided, and image information blocks are recorded in such a way that the start positions of the two-dimensionally compressed frame images of image information blocks are aligned along predetermined radial lines of said optical disk on recording tracks thereof.

With the above arrangement, the positions of two-dimensionally and three-dimensionally compressed image frames in each image information block can be varied, and compressed image frames can be divided, so that the start positions of the two-dimensionally compressed frame images of image information blocks will always coincide with specific positions on an optical disk.

It may be so arranged that a plurality of threshold levels are defined for scene change detection at said scene change detecting step, and scene change information acquired for the threshold levels is recorded on said optical disk.

With the above arrangement, scene change information is detected and recorded for a plurality of threshold values.

It may be so arranged that said scene change information is recorded in a given area along an inner or outer circumference of said optical disk, and a header part of the two-dimensionally compressed frame image information is used for recording the position of a two-dimensionally compressed image contained in an image information block adjoining an image information block containing the two-dimensionally compressed image.

With the above arrangement, address information of the two-dimensionally compressed frame images of image information blocks for which scene changes have been detected and address information of the two-dimensionally compressed frame images of adjoining image information blocks are mutually independently recorded on an optical disk.

According to another aspect of the invention, there is provided an optical disk playback method for reproducing images from an optical disk on which image information blocks each serving as a recording unit formed by combining several frames to several tens of frames of I, P and B pictures, with an I picture being a frame image having been obtained by two-dimensional information compression based on frequency transformation, and P and B pictures that are frame images having been obtained by three-dimensional information compression based on frequency transformation and motion-compensated prediction, and scene change information detected between said image information blocks are recorded, and comprising the steps of:

reproducing said scene change information from said optical disk, and consecutively reproducing only the I pictures of image information blocks for which scene changes have been detected, according to said reproduced scene change information.

With the above arrangement, based on address information of I pictures of image information blocks which are recorded on an optical disk and for which scene changes have occurred, the I pictures alone are consecutively reproduced to thus achieve fast playback or retrieval, of an image signal.

It may be so arranged that the start positions of I pictures of image information blocks recorded on said optical disk are aligned along predetermined radial lines of said optical disk on recording tracks thereof.

With the above arrangement, the start positions of I pictures of image information blocks always coincide with specific positions on an optical disk. The randomness of a rotation wait time associated with a track jump during fast playback or retrieval can therefore be eliminated.

It may be so arranged that said scene change information is detected for a plurality of threshold levels, scene change information associated with a selected threshold level is reproduced, and only the I pictures of image information blocks for which scene changes have been detected are consecutively reproduced from said optical disk according to said scene change information.

With the above arrangement, I pictures selected according to scene change information detected for a plurality of thresholds are consecutively reproduced. Fast playback or retrieval of an image signal can therefore be achieved at different speeds.

It may be so arranged that said scene change information is recorded in a given area defined along an inner or outer circumference of said optical disk, a header part of the I picture is used for recording the address information indicating the position of an I picture contained in an image information block adjoining an image information block containing the I picture, and either a scene change playback mode, in which only the I pictures of image information blocks for which scene changes have been detected are consecutively reproduced from said optical disk according to said scene change information, or an adjoining image information block playback mode, in which I pictures of adjoining image information blocks are consecutively reproduced from said optical disk according to said address information, can be selected.

With the above arrangement, either a scene change playback mode, in which only the I pictures of image information blocks for which scene changes have been detected are consecutively reproduced, or an adjoining image information block playback mode, in which I pictures of adjoining image information blocks are consecutively reproduced, can be selected according to the purpose of use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 shows a list display image produced by the video disk recording/playback device in accordance with Embodiment A5;

FIG. 11 is a diagram for explaining the operation of Embodiment B1;

DETAILED DESCRIPTION OF THE PREFERRED EMBODIMENTS

Embodiment A1

Figures 1A, 1B:
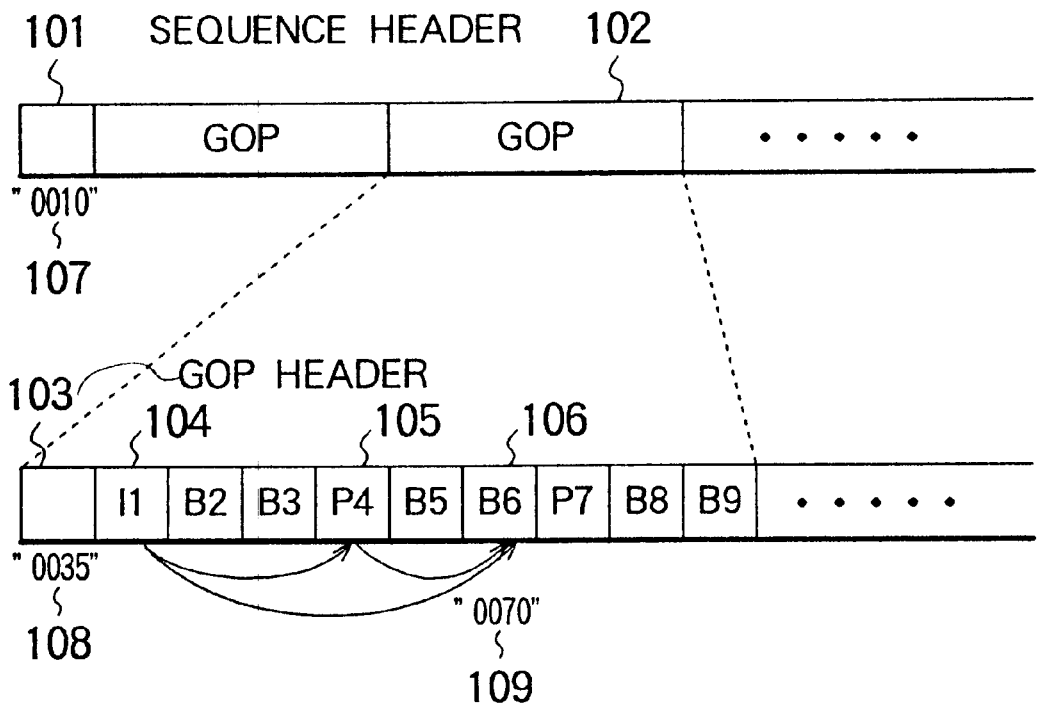
FIG. 1A shows the data structure of coded data recorded on a video disk according to Embodiment A1.
FIG. 1B is a schematic diagram of an image information table recorded on a video disk according to Embodiment A1.

FIG. 1A and FIG. 1B are diagrams for explaining a video disk recording/playback method of Embodiment A1. FIG. 1A is a schematic diagram showing the data structure of coded data recorded on a video disk. Reference numeral 101 denotes a sequence header. 102 denotes a GOP. 103 denotes a GOP header. 107 denotes the start address of the sequence header 101. 108 denotes the start address of the GOP header 103. 109 denotes the start address of a B6 picture.

FIG. 1B is a schematic diagram showing an image information table recorded on the video disk. Reference numeral 110 denotes a column in which selected image numbers assigned to the respective selected images are written. 111 denotes a column in which start addresses of sequence headers concerning sequences each containing a selected image are written. 112 denotes a column in which start addresses of GOPs each containing a selected image are written. 113 denotes a column in which start addresses of coded data representing selected images are written.

Next, the operations will be described. A collection of a plurality of input images are referred to as a GOP (group of pictures). Each GOP includes the following; an I picture 104 intra-frame coded, P pictures 105 inter-frame coded by forward motion compensation, and B pictures 106 inter-frame coded by forward and backward motion compensation. Input image information composed of a succession of GOPs 102 is high-efficiency coded. A GOP header 103 representing information required for decoding the GOP 102 is appended to the coded data representing the GOP. A collection of the GOPs 102 is referred to as a sequence. A sequence header 101 describing information representing, for example, a screen size of the sequence may be appended to the start of the sequence. Coded data consisting of these data items is recorded on a video disk on which addresses are assigned to areas.

For playback, the inverse of the foregoing recording procedure is carried out. Thus, a video signal recorded on the video disk is reproduced and displayed.

Assuming that a B6 picture 106 is a selected image, a I1 picture 104 and P4 picture 105 must be decoded first in order to decode the B6 picture 106. For decoding the P4 picture 105, the I1 picture 104 must be decoded first. Since information required for decoding the I1 picture 104 is described in the GOP header 103, the information residing in the GOP header 103 is necessary. Normally, each GOP 102 contains only one I picture, at a position succeeding the GOP header 103. Consequently, for displaying the B6 picture 106 as a selected image, the GOP 102 containing the B6 picture 106 should be read starting from the GOP header 103. The I1 picture, B2 picture, B3 picture, etc. are then decoded in that order, until the B6 picture 106 is decoded. The pictures are then displayed. Therefore, the start address (which in the illustrated example is "0070") 109 on the disk at which the coded data representing the B6 picture 106 is recorded, and the start address (which in the illustrated example is "0035") 108 of the GOP header of the GOP 102 containing the B6 picture 106 are necessary.

The address information is stored, for example, in a memory in the device. A user, for instance, may record the address information in the image information table set up on the video disk at a desired time instant.

At this time, since information residing in the sequence header 101, which is required for decoding the B6 picture 106, may also become necessary, the start address 107 of the sequence header 101 is recorded together with the address information in the table. FIG. 1B shows the image information table thus recorded on the video disk.

For retrieving the B6 picture 106 from the video disk on which data is recorded according to the aforesaid procedure, the operations described below are carried out. First, when a retrieval instruction is issued, access is gained to the image information table on the disk. The image information table is then referenced to read the start address 109 on the disk at which the coded data representing the B6 picture 106 is recorded, the start address 108 of the GOP header of the GOP 102 containing the B6 picture 106, and, if necessary, the start address 107 of the sequence header. A jump is then made to the sequence header 101, or GOP header 103, whereby information written in the header is acquired. Decoding is performed sequentially starting from the I1 picture 104. When decoding of the B6 picture 106 is completed, the decoded screen of the B6 picture 106 is displayed. Thus, retrieval is terminated.

In this example, the B6 picture 106 is specified as a selected image. Even when any other picture is specified, the aforesaid procedure is repeated.

The leading B pictures of a GOP; that is, B2 and B3 pictures must be decoded using the I picture or P picture at the tail of the preceding GOP. The independence of each GOP is therefore impaired. For preventing the impairment, information indicating that such B pictures shall be decoded through backward compensation must be appended to the GOP header. In Embodiment A2, therefore, the B pictures are predicted using the I1 picture 104 alone.

Embodiment A2

Figure 2:
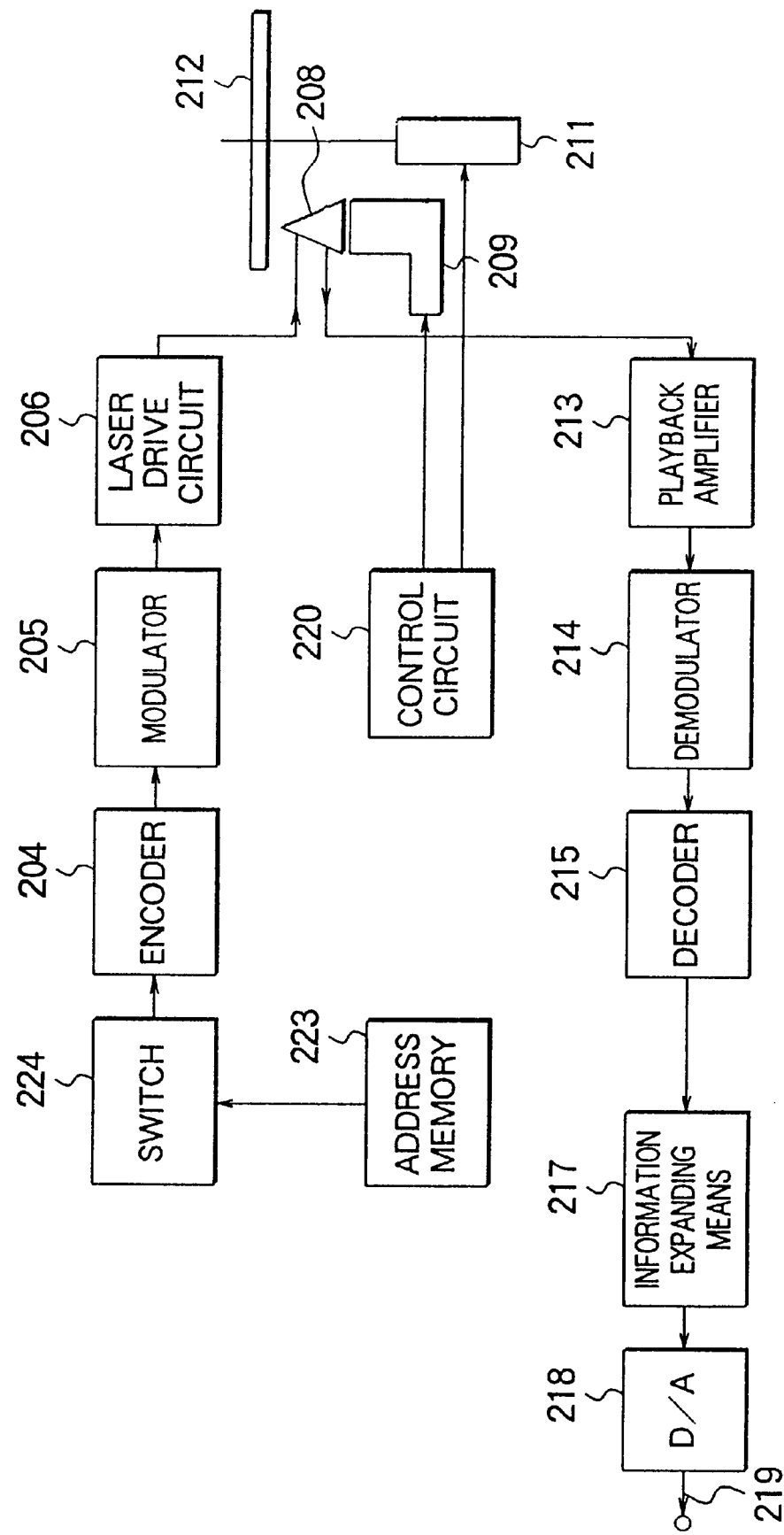
FIG. 2 is a block circuit diagram showing a video disk recording/playback device in accordance with Embodiment A2.

FIG. 2 is a block circuit diagram showing a video disk recording/playback device of Embodiment A2. As illustrated, it comprises an encoder 204, a modulator 205, a laser drive circuit 206, a control circuit 220, an optical head 208, an actuator 209, a disk motor 211, an optical disk 212, an address memory 223 for storing the start addresses of coded data representing selected images such as images to be retrieved and the start addresses of data including information required for decoding the coded data, and a switch 224 to be manipulated for recording the contents of the address memory 223 into the optical disk 212 at a user's desired time instant.

The device further comprises a playback amplifier 213, a demodulator 214, a decoder 215, an information expanding means 217, and a D/A converter 218 which outputs an output image signal 219.

Next, the operations will be described. High-efficiency coded data representing an image and having the GOP structure described in conjunction with Embodiment A1 is recorded on the optical disk 212. A GOP header 103 containing information required for decoding each GOP 102 is appended to the start of each GOP 102. A sequence header 101 containing information concerning a sequence composed of a plurality of GOPs 102 may be appended to the start of the sequence.

For reproducing data from the optical disk 212, a compressed video signal that has been recorded on the optical disk 212 is reproduced by the optical head 208, and amplified by the playback amplifier 213, and digital data is restored by the demodulator 214 and decoder 215. A digital video signal is then restored by the information expanding means 217 adopting, for example, the MPEG decoding technique. An analog output image signal 219 or the like is produced by the D/A converter 218 and then displayed on a monitor or the like.

Stored in the address memory 223 are, for example, the start addresses on the optical disk of the coded data representing selected images such as images to be retrieved or the like, the start addresses of data containing information required for reproducing the coded data, i.e., the start addresses of GOP headers of GOPs containing the coded data, and the start addresses of sequence headers of sequences containing the GOPs.

The contents of the address memory 223 are recorded into an image information table set up on the optical disk 212 at, for example, a user's desired time instant by manipulating the switch 224.

The image information table thus set up on the optical disk 212 is used to retrieve and display any selected image recorded on the optical disk 212. The underlying idea has been described in conjunction with Embodiment A1.

For retrieving and displaying a selected image, the recording/playback device carries out the operations described below. When retrieval is started, access is then gained to the image information table set up on the optical disk 212, and the start address of coded data representing the selected image, the start address of a GOP header of a GOP containing the selected image, and the start address of a sequence header are stored.

Figure 3:
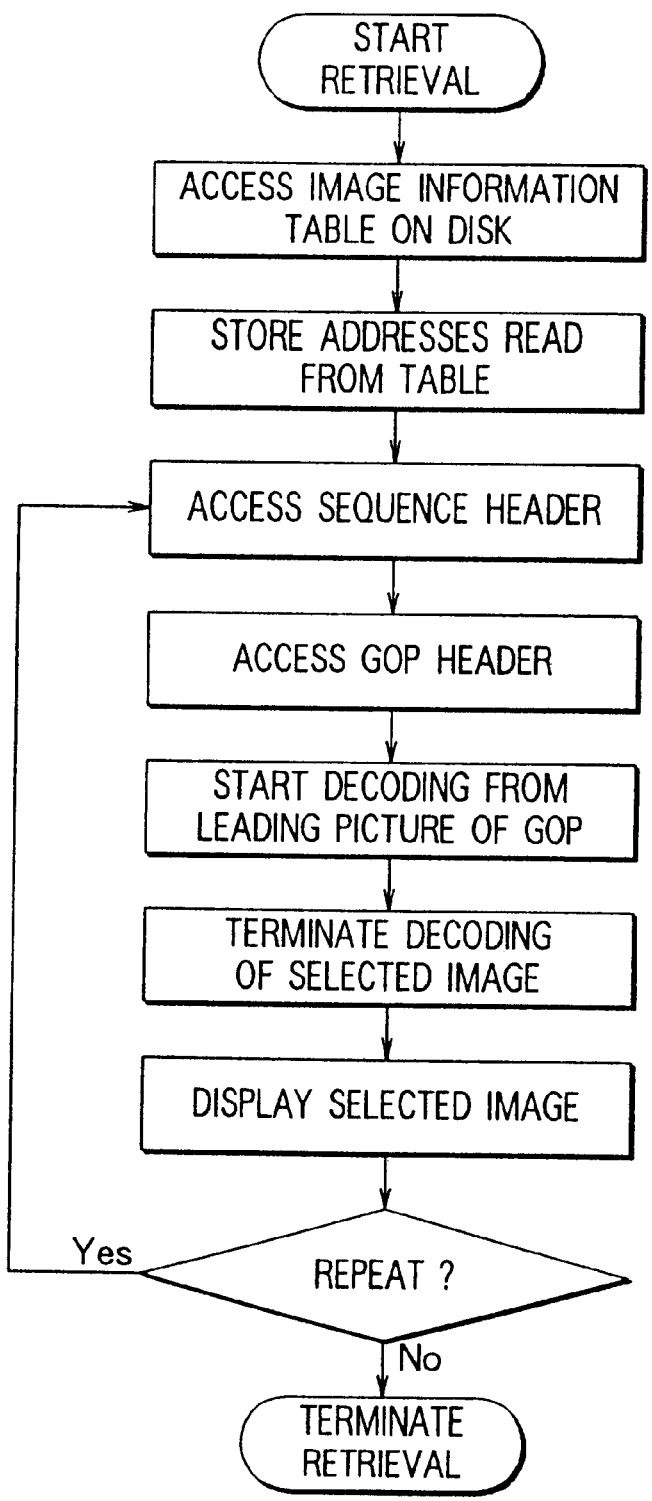
FIG. 3 is a flowchart describing the operations for image retrieval performed by the video disk recording/playback device in accordance with Embodiment A2, A3 or A4.

Based on the start addresses, the sequence header is accessed in order to acquire the sequence information. The GOP header is then accessed. Decoding is then started from the leading picture of the GOP. After decoding of a picture of the selected image is completed, the selected image is displayed. The series of operations are illustrated in the flowchart of FIG. 3.

Embodiment A3

Figure 4:
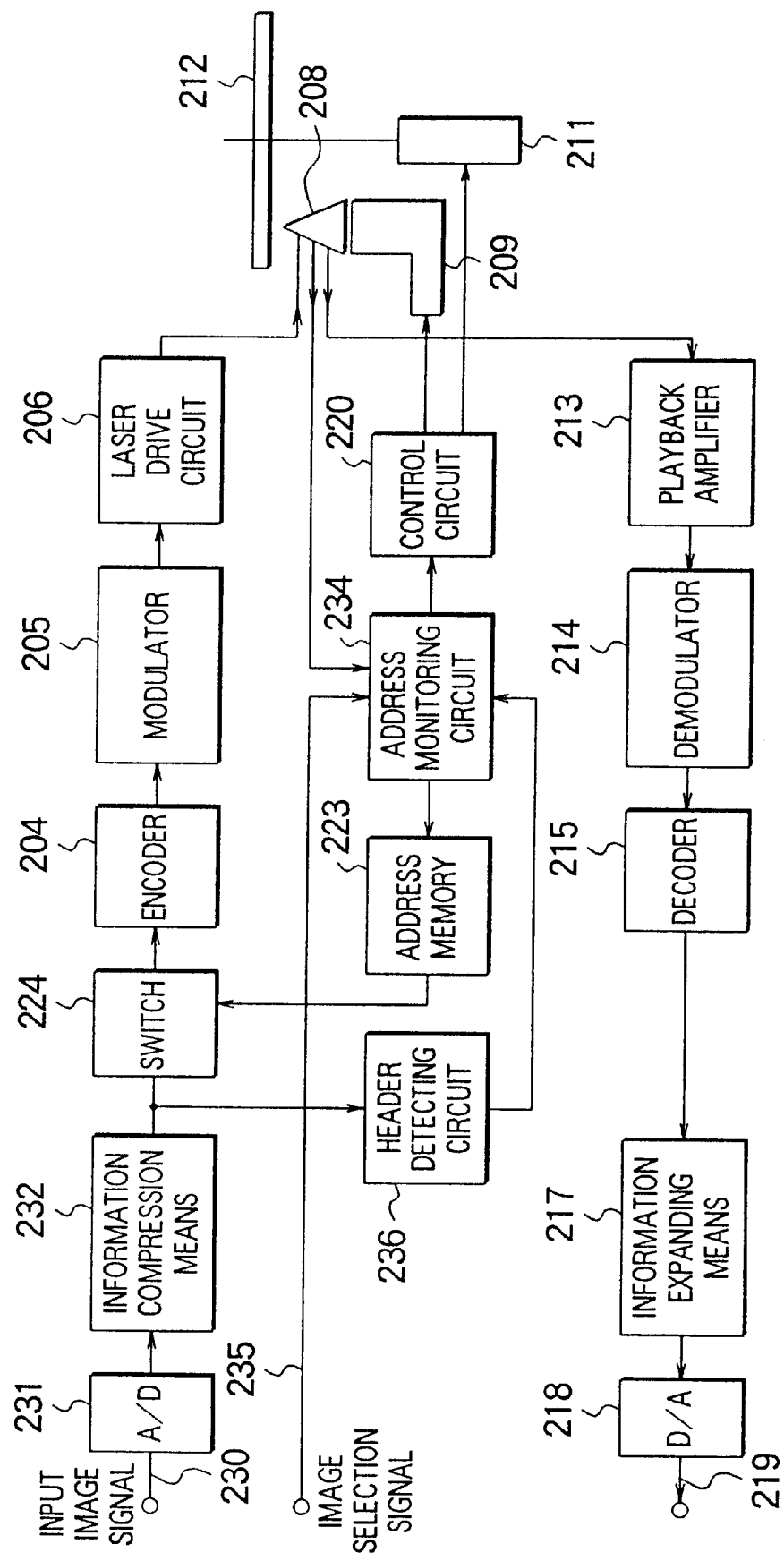
FIG. 4 is a block circuit diagram showing a video disk recording/playback device in accordance with Embodiment A3.

FIG. 4 is a block circuit diagram showing a video disk recording/playback device of Embodiment A3. The reference numerals identical to those in FIG. 2 denote identical or corresponding parts. It additionally comprises an A/D converter 231 receiving an input image signal 230, an information compressing means 232, an address monitoring circuit 234 receiving an image selection signal 235 indicating that an image has been selected, and associating coded data with an address on the video disk 212, and a header detecting circuit 236 for detecting a GOP header and sequence header in the bit stream of coded data. A switch 424 is provided for changing a signal to be recorded on the optical disk 212 from the input image signal 230 to a signal representing the contents of the address memory 223 or vice versa at, for example, a user's desired time instant.

Next, the operations will be described. The input image signal 2330 having the GOP structure that has been described in conjunction with Embodiment A1 is converted into a digital signal by the A/D converter 231, and then transformed into an image information signal that represents high-efficiency coded data by the information compressing means 232 adopting, for example, the MPEG technique that is now becoming an international standard for high-efficiency compression of motion pictures. At this time, a GOP header containing information required for decoding each GOP is appended to the start of each GOP. A sequence header containing information concerning a sequence composed of a plurality of GOPs is appended to the start of the sequence.

The information is encoded so that it can be recorded on the optical disk 212. The encoded information is modulated on the disk in order to minimize influence of inter-code interference, and then recorded on the optical disk 212 using a laser beam.

For playback, a compressed video signal recorded on the optical disk 212 is reproduced by the optical head 208, and amplified by the playback amplifier 213, and digital data is then restored by the demodulator 214 and decoder 215. A digital video signal is then restored by the information expanding means 217 adopting, for example, the MPEG decoding technique. An analog output image signal 219 or the like is produced by the D/A converter 218, and then displayed on the monitor or the like.

The aforesaid various headers contain "unique words" serving as information for identification. Various headers can be detected and determined by detecting the words. The header detecting circuit 236 uses this procedure to detect a GOP header and sequence header.

Addresses for specifying locations are assigned in advance on the optical disk 212. The address monitoring circuit 234 monitors the addresses to determine at which address on the optical disk 212 coded data representing an image is recorded.

Owing to the address monitoring circuit 234 and header detecting circuit 236, the addresses at which the latest GOP header and sequence header are recorded can be obtained. The addresses are stored in the address memory 223.

When a selected image, such as one to be retrieved is selected from images represented by the input image signal 230, the image selection signal 235 indicating that an image has been selected and a signal sent from the address monitoring circuit 234 are used to learn an address at which coded data representing the selected image is recorded. The address is then stored in the address memory 223.

The addresses stored in the address memory 223 are recorded into the image information table set up on the optical disk 212 by manipulating the switch 224 at a user's desired time instant.

Using the image information table set up on the optical disk 212 in this way, any selected image can be retrieved from the optical disk 212 and then displayed. The underlying idea has been described in detail in conjunction with Embodiment A1.

For retrieving and displaying a selected image, the recording/playback device carries out the operations described below. When retrieval is started, access is then gained to the image information table set up on the optical disk 212, and the start address of coded data representing a selected image, the address of a GOP header of a GOP containing the selected image, and the address of a sequence header are stored.

Based on the addresses, the sequence header is accessed in order to acquire sequence information. The GOP header is then accessed. Decoding is then performed starting with the leading picture of the GOP. After decoding of the picture of the selected image is completed, the selected image is displayed. The series of operations is identical to the one described in the flowchart of FIG. 3.

Embodiment A4

Figure 5:
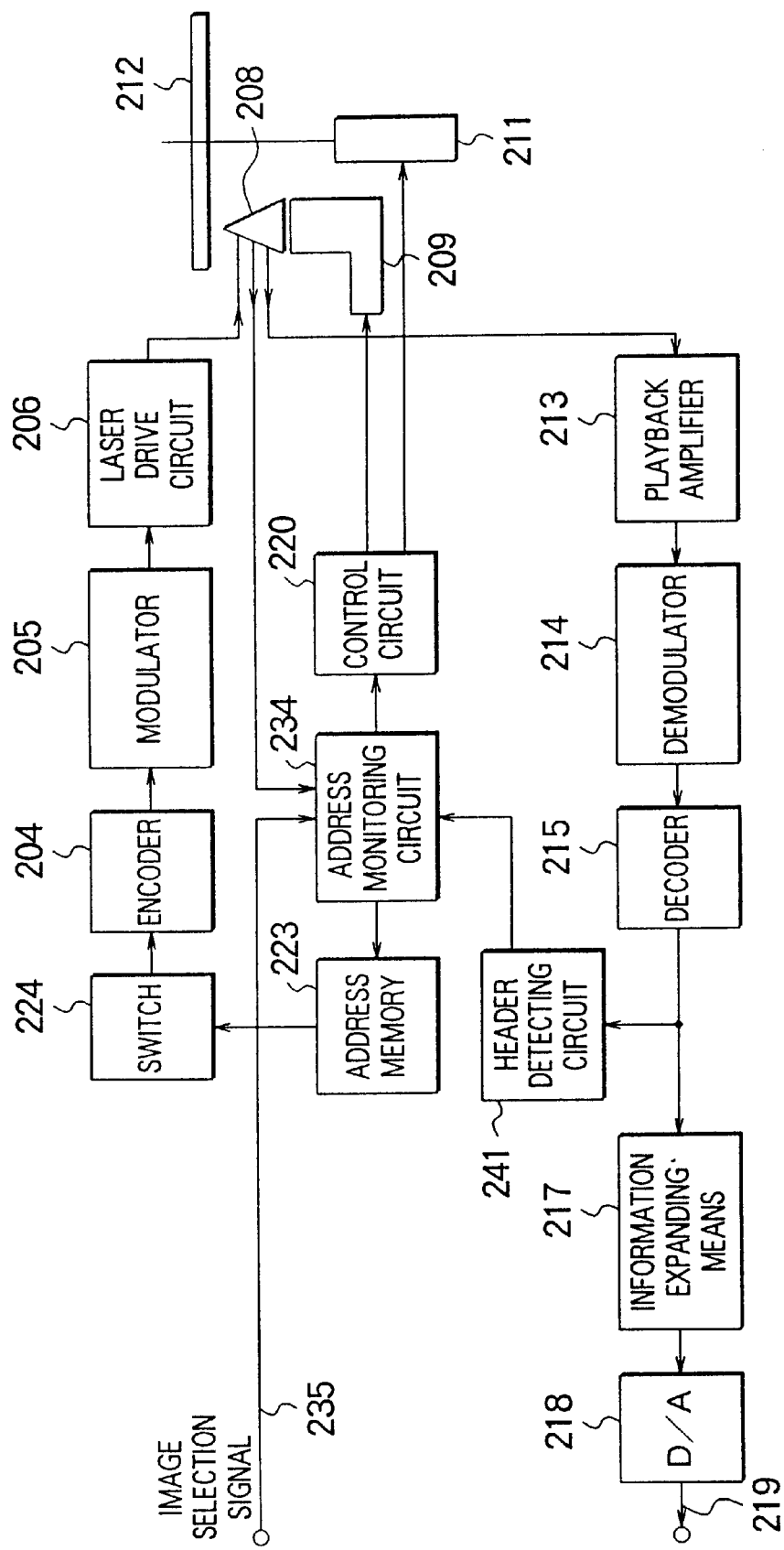
FIG. 5 is a block circuit diagram showing a video disk recording/playback device in accordance with Embodiment A4.

FIG. 5 is a block circuit diagram showing a video disk recording/playback device of Embodiment A4. Reference numerals identical to those in FIG. 4 denote identical or corresponding elements or parts. A header detecting circuit 241 of this embodiment is provided for detecting a GOP header and sequence header in a bit stream of coded data output from the decoder 215. A switch 224 is manipulated for recording the contents of the address memory 223 onto the optical disk 212 at a user's desired time instant.

Next, the operations will be described. High-efficiency coded data representing an image having the GOP structure described in conjunction with Embodiment A1 is recorded on the optical disk 212. A GOP header containing information required for decoding each GOP is appended to the start of each GOP. A sequence header containing information concerning a sequence composed of a plurality of GOPs is appended to the start of the sequence.

For reproducing data from the optical disk 212, a compressed video signal recorded on the optical disk 212 is reproduced by the, optical head 208, and amplified by the playback amplifier 213, and digital data is then restored by the demodulator 214 and decoder 215. A digital video signal is then restored by the information expanding means 217 adopting, for example, the MPEG decoding technique. An analog output image signal 219 or the like is produced by the D/A converter 218, and then displayed on a monitor or the like.

The foregoing various headers contain "unique words" serving as information for identification. The various headers can be detected and determined by detecting the words. The header detecting circuit 241 uses this procedure to detect a GOP header and sequence header.

Addresses for specifying locations are assigned in advance on the optical disk 212. The address monitoring circuit 234 monitors the addresses to determine at which address on the optical disk 212 coded data representing an image is recorded.

Owing to the address monitoring circuit 234 and header detecting circuit 241, addresses at which the latest GOP header and sequence header are recorded can be obtained. The addresses are stored in the address memory 223.

When a selected image to be retrieved is selected from images represented by the output image signal 219, the image selection signal 235 indicating that an image has been selected and a signal provided by the address monitoring circuit 234 are used to obtain an address at which coded data representing the selected image is recorded. The address is then stored in the address memory 223.

The contents of the address memory 223 are recorded into the image information table set up on the optical disk 212 at, for example, a user's desired time instant by manipulating the switch 224.

Using the image information table set up on the optical disk 212, any selected image can be retrieved from the optical disk 212 and then displayed. The underlying idea has been described in conjunction with Embodiment A1.

For retrieving and displaying a selected image, the recording/playback device carries out the operations described below. When retrieval is started, access is then gained to the image information table set up on the optical disk 212, and the start address of coded data representing the selected image, the address of a GOP header of a GOP containing the selected image, and the address of a sequence header are stored.

Based on the addresses, the sequence header is accessed in order to acquire sequence information. The GOP header is then accessed. Decoding is then performed starting with the leading picture of the GOP. After decoding of the picture of the selected image is completed, the selected image is displayed. The series of operations is identical to the one described in the flowchart of FIG. 3.

Embodiment A5

Figure 6:
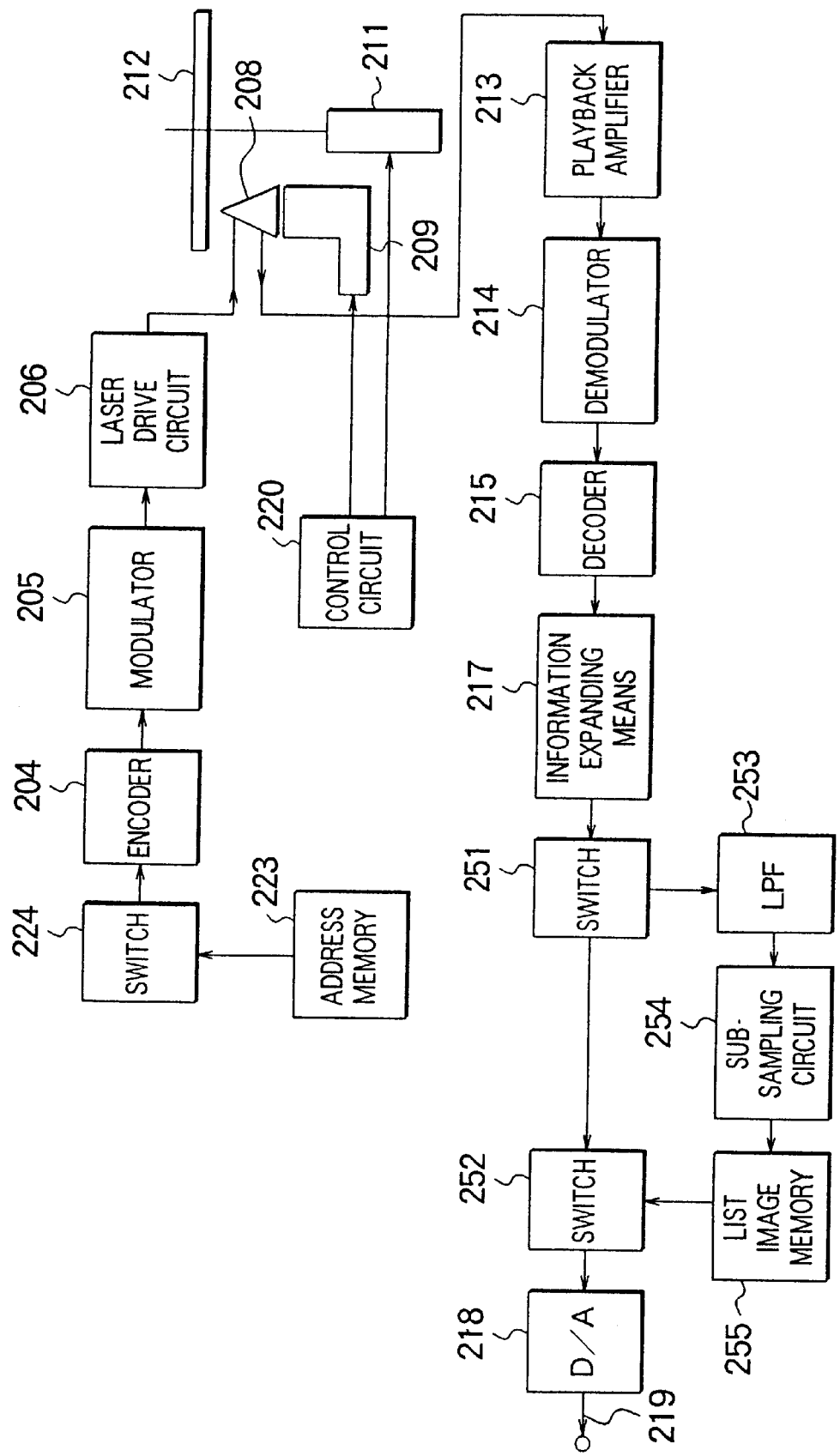
FIG. 6 is a block circuit diagram showing a video disk recording/playback device in accordance with Embodiment A5.

FIG. 6 is a block circuit diagram showing a video disk recording/playback device of Embodiment A5. Reference numeral identical to those in FIG. 5 denote identical or corresponding elements. A switch 224 is be manipulated for recording the contents of the address memory 223 onto the optical disk 212 at, for example, a user's desired time instant.

A switch 251 is provided for changing processing from normal reproduction to list display or vice versa. A low-pass filter (LPF) 253 is provided for contracting (reducing the size of) the screen or picture of expanded image data. A sub-sampling circuit 254 is provided to perform one-Nth sub-sampling so as to obtain the contracted image of 1/N. A list image memory 255 is provided for storing a list display screen. A switch 252 is manipulated for displaying a list display image recorded on the list image memory 630.

Next, the operations will be described. High-efficiency coded data representing an image having the GOP structure described in conjunction with Embodiment A1 is recorded on the optical disk 212. A GOP header containing information required for decoding each GOP is appended to the start of each GOP. A sequence header containing information concerning a sequence composed of a plurality of GOPs is appended to the start of the sequence.

For reproducing data from the optical disk 212, a compressed video signal recorded on the optical disk 212 is reproduced by the optical head 208 and amplified by the playback amplifier 213, and digital data is then restored by the demodulator 214 and decoder 215. A digital video signal is then restored by the information expanding means 217 adopting, for example, the MPEG decoding technique. An analog output image signal 219 or the like is produced by the D/A converter 218 and then displayed on a monitor or the like.

Stored in the address memory 223 are the start addresses on the optical disk of coded data representing selected images such as images to be retrieved, the start addresses of data containing information required for reproducing the coded data, the start addresses of GOP headers of GOPs containing the coded data, and the start addresses of sequence headers concerning sequences containing the GOPs.

The contents of the address memory 223 are recorded into the image information table set up on the optical disk 212 at, for example, a user's desired time instant by manipulating the switch 224.

Using the image information table set up on the optical disk 212, any selected images recorded on the optical disk 212 can be displayed in the form of a list. Thus, the recorded contents of the optical disk 212 can be learned promptly. For displaying selected images in the form of a list, the recording/playback device carries out the operations described below. When list display is started, access is then gained to the image information table set up on the optical video disk 212, and the start address of coded data representing a selected image, the address of a GOP header of a GOP containing the selected image, and the address of a sequence header are stored.

Based on the addresses, the sequence header is accessed in order to acquire sequence information. The GOP header is then accessed. Decoding is then started with the leading picture of the GOP. After decoding of the picture of the selected image is completed, the switch is manipulated to transform the selected image into a contracted image. This can be implemented by removing high-frequency components by means of the low-pass filter 628, and performing one-Nth sub-sampling, by means of the sub-sampling circuit 629, so as to obtain the contracted image of 1/N. The contracted image is stored in the list image memory 255.

Figure 7:
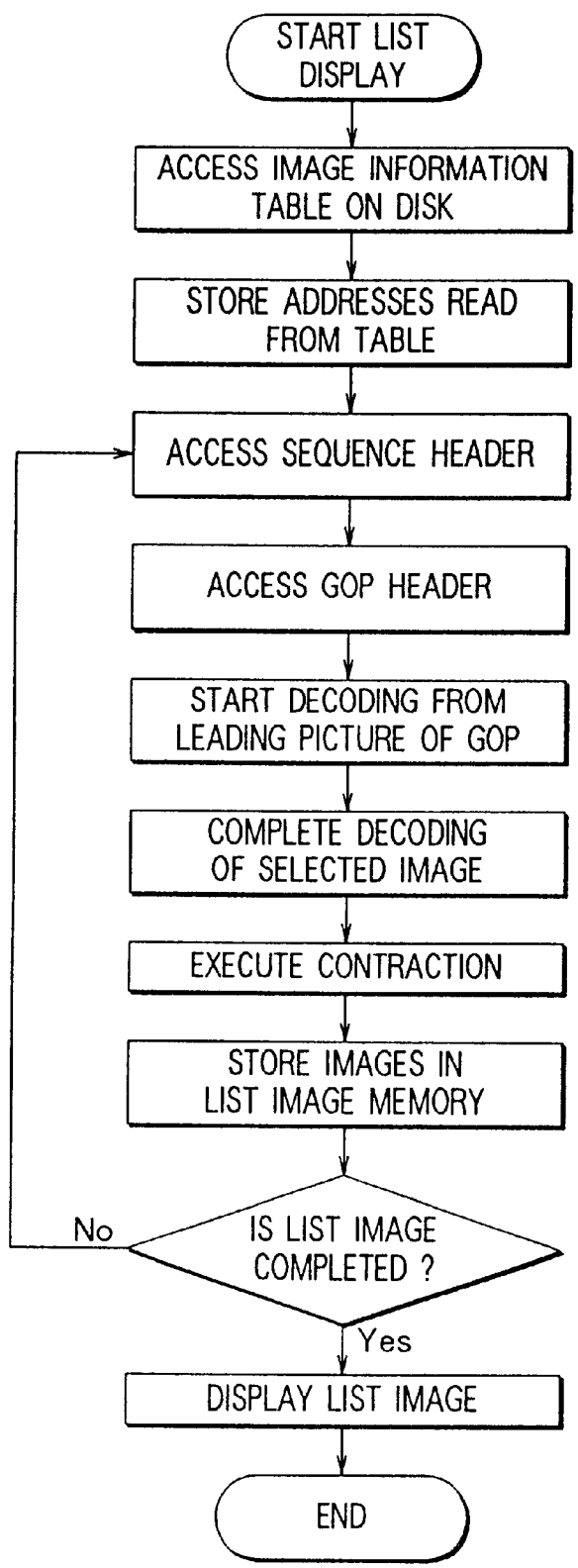
FIG. 7 is a flowchart describing the operations for list image display performed by the video disk recording/playback device in accordance with Embodiment A5.

By repeating the foregoing series of operations, a list image composed of N contracted screens of selected images recorded on the disk is stored in the list image memory 255. The series of operations is illustrated in the flowchart of FIG. 7. FIG. 8 shows a list image stored in the list image memory. When the list image is displayed by manipulating the switch 252, the contents of the optical disk 212 can be learned readily.

Embodiment A6

Figure 9:
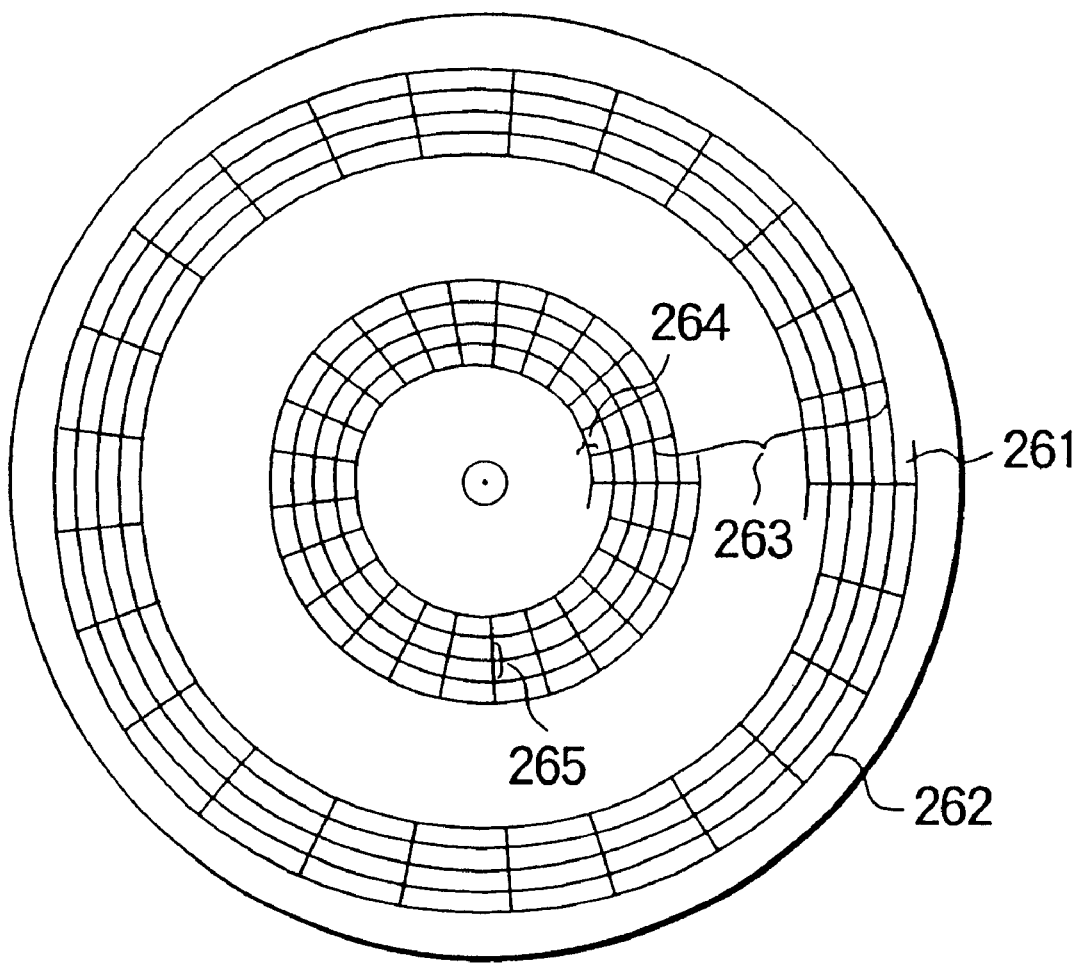
FIG. 9 shows a disk format for a video disk in accordance with Embodiment A6.

FIG. 9 shows a disk format of a video disk in accordance with Embodiment A6. In FIG. 9, reference numeral 261 denotes a track. 262 denotes a sector. 263 denotes a data area. 264 denotes a file management area in which basic data representing a disk type and others is recorded. 265 denotes an image information table area.

Next, a coding scheme will be described using FIG. 1 showing the coding scheme employed in Embodiment A1. Reference numerals identical to those in FIG. 1 denote the same components. A collection of a plurality of input images is referred to as a GOP (group of pictures). The GOP includes an I picture 104 encoded within a frame, P pictures 105 inter-frame encoded by forward motion compensation, and B pictures 106 inter-frame encoded by forward and backward motion compensation. Input image information composed of a succession of GOPs is high-efficiency coded. The GOP header 103 describing information required for decoding each GOP is appended to the coded data representing each GOP. A combination of GOPs is referred to as a sequence. The sequence header 101 describing information representing, for example, a screen size of the pictures of the sequence may be appended to the start of the sequence. The coded data composed of these data items is recorded in the data area 263 on the video disk on which addresses are assigned to areas.

For reproduction, the inverse of the foregoing recording procedure is carried out. A video signal recorded on the video disk is thus reproduced and displayed.

Assuming that the B6 picture 106 is specified as a selected image such as an image to be retrieved, the I1 picture 104 and P4 picture 105 must be decoded first, in order to decode the B6 picture 106. For decoding the P4 picture 105, the I1 picture 104 must be decoded. Since information required for decoding the I1 picture 104 is described in the GOP header 103, the information residing in the GOP header 103 is necessary. Normally, only one I picture resides in each GOP 102, and the I picture follows the GOP header 103. For displaying the B6 picture 106 as a select screen, therefore, information concerning the GOP 102 containing the B6 picture 106 should be read from the GOP header 103. The I1, B2, B3, . . . pictures are then decoded in that order, until the B6 picture 106 is decoded and then displayed. Therefore, the start address 109 on the disk in the area in which the coded data representing the B6 picture 106 is recorded and the start address 108 of a GOP header of the GOP 102 containing the B6 picture 106 is necessary. Since information in the sequence header 101, which is needed for decoding the B6 picture 106, may become necessary, the start address 107 of the sequence header is required in addition to the above addresses.

The address information is stored in, for example, a memory in the recording device, and then recorded into the image information table residing in the image information table area 265 on the video disk at, for example, a user's desired time instant. The image information table thus recorded on the video disk is as shown in FIG. 1B.

For retrieving the B6 picture 106 from the video disk on which data is recorded as mentioned above, the operations described below are carried out. First, when a retrieval instruction is issued, access is gained to the image information table set up on the disk. The start address 109 on the disk at which coded data representing the B6 picture 106 is recorded, the start address 108 of a GOP header of the GOP 102 containing the B6 picture 106, and, if necessary, the start address 107 of a sequence header are read from the image information table. A jump is then made to the sequence header 101 and GOP header 103. Information in the headers is then acquired. Decoding is performed sequentially, starting with the I1 picture 104. When decoding of the B6 picture 106 is completed, a decoded screen of the B6 picture 106 is displayed. Retrieval is then terminated.

In this example, the B6 picture 106 is specified as a selected image. Even when any other picture is selected, the aforesaid procedure is repeated.

In the aforesaid embodiments, a selected image is an image to be retrieved. The inventive concepts described in connection with the above embodiments can apply to an image showing the start of a program or an image at which previous reproduction has been suspended.

Embodiment B1

Figure 10:
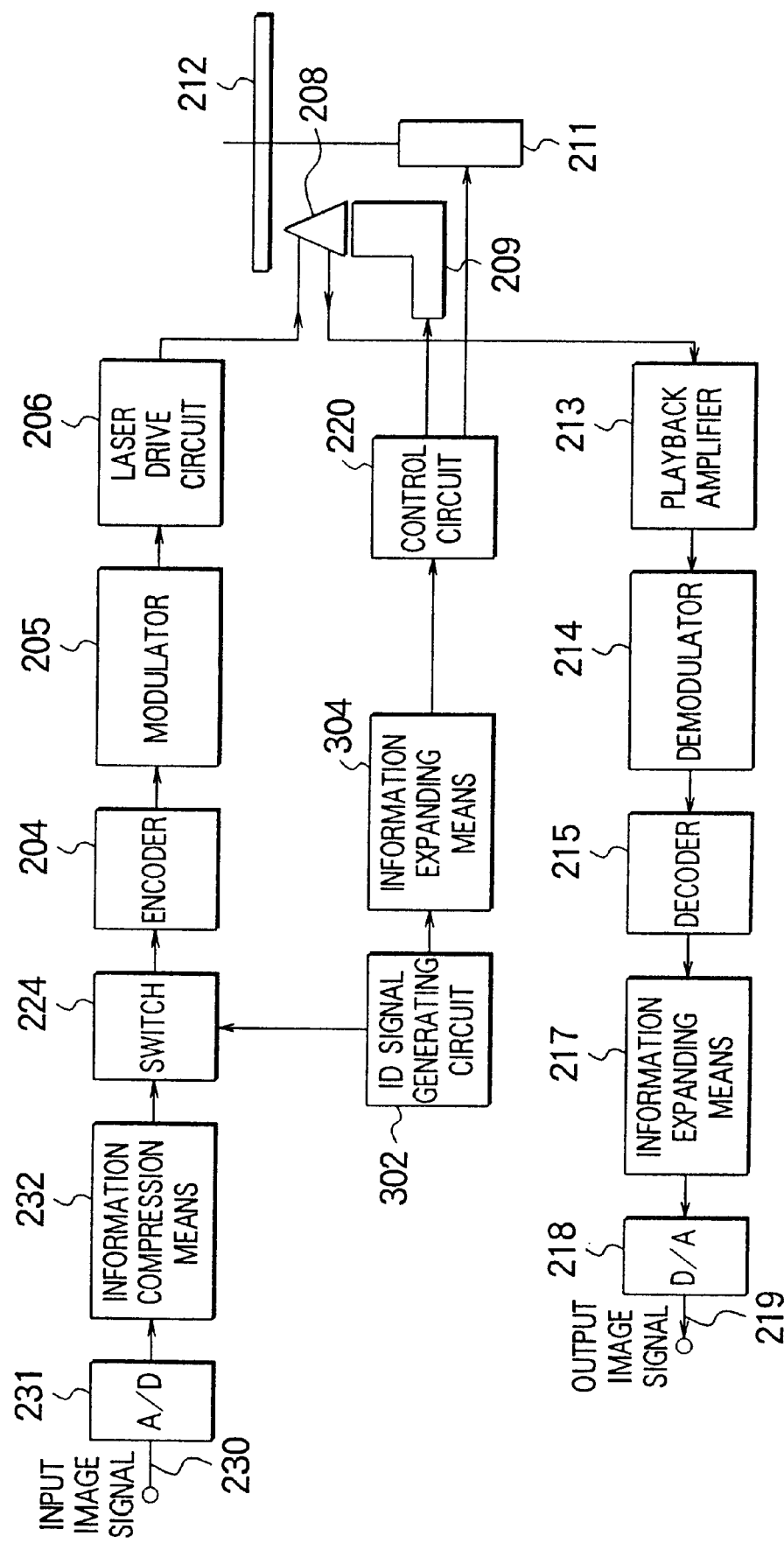
FIG. 10 is a block circuit diagram showing a video disk recording/playback device of Embodiment B1.

FIG. 10 is a block diagram showing a video disk recording/playback device of Embodiment B1. The reference numerals identical to those in FIG. 2 and FIG. 4 denote identical or corresponding parts. An ID signal generating circuit 302 generates ID signals for identifying the optical disk 212. An information table memory 304 stores the start addresses of coded data of the selected images such as the images to be retrieved, the start addresses of data containing information required for decoding the coded data, and the ID signals output by the ID signal generating circuit 302. A switch 224 is for inputting the ID signal generated by the ID signal generating circuit 302, on the optical disk 212 at a user's desired time instant.

The operations will next be described. Recorded on the optical disk 212 are high-efficiency coded data having images of a GOP structure. The structure of the recorded coded data structure is as shown in FIG. 1A. Appended to the start of each GOP is a GOP header 103 containing information required for decoding the GOP. Appended to the start of a sequence composed of a plurality of GOPs may be a sequence header 101 containing information concerning the sequence.

For reproducing from the optical disk 212, the compressed video signal recorded on the optical disk 212 is reproduced by the optical head 208, amplified by the playback amplifier 213, and digital data is restored by the demodulator 214 and the decoder 215. A digital video signal is then restored by an information expanding means 217 adopting the MPEG decoding method, for example, and an analog output image signal 219 or the like is obtained by the D/A converter 218, and is displayed on the monitor or the like.

Stored in the information table memory 304 are the ID signal generated by the ID signal generating circuit 302 for identifying the optical disk 212, and the start address of data containing information required for reproducing the coded data, i.e., the start address of the GOP header containing the coded data, the start address of the sequence header concerning the sequence containing the GOP and the like header. Data concerning selected images of a plurality of optical disks may also be stored. In this case, the ID signals of the data are different.

The table stored in the information table memory is schematically shown in FIG. 11B.

The ID signal generated by the ID signal generating circuit 302 is recorded in a specific area on the optical disk 212, by manipulating the switch 224 at the user's desired instance.

By utilizing the ID signal recorded in the specific area of the optical disk 212, and the information table memory 304, any selected image on the optical disk 212 may be retrieved and displayed. The reason will be described in detail with reference to FIG. 1A and FIG. 11.

FIG. 11 is a schematic representation of the table recorded in the information table memory 304 in the device. The reference numerals identical to those in FIG. 1B denote identical or corresponding parts. Reference numeral 114 denotes a column in which ID signals for identifying the video disk 212 are written.

The structure of the GOP, and the operations during retrieval and fast playback are identical to those described with reference to Embodiment A1, except as described below. That is, ID signals for identifying the optical disks 212 are also stored in the information table memory 304.

The ID signal is recorded in the specific area on the optical disk 212 by manipulating the switch 224 at a user's desired time instance.

Data concerning the different ID signals may also be stored in the information table memory 304.

By means of the video disk recording/playback device configured as described above, any selected image can be retrieved and displayed, depending on the individual optical disk. This is implemented through operations illustrated in the flowchart of FIG. 12.

When retrieval operation is started by input of a retrieval command by the user, the ID signal recorded in the specific area on the optical disk 212 is read (step S1). The sequence header address, the GOP header address, the selected image start address and the like are read from the information table memory 304 in the device (step S2), and a jump is made to the sequence header and the GOP header, and information written therein is obtained (step S3, step S4). Decoding is made starting with the picture at the start of the GOP (step S5). When the decoding of the selected image is completed (step S6), the decoded screen of the selected image is displayed (step S7). The steps S3 to S7 are repeated until the retrieval termination command is found to have been issued at the step S8.

Embodiment B2

Figure 13:
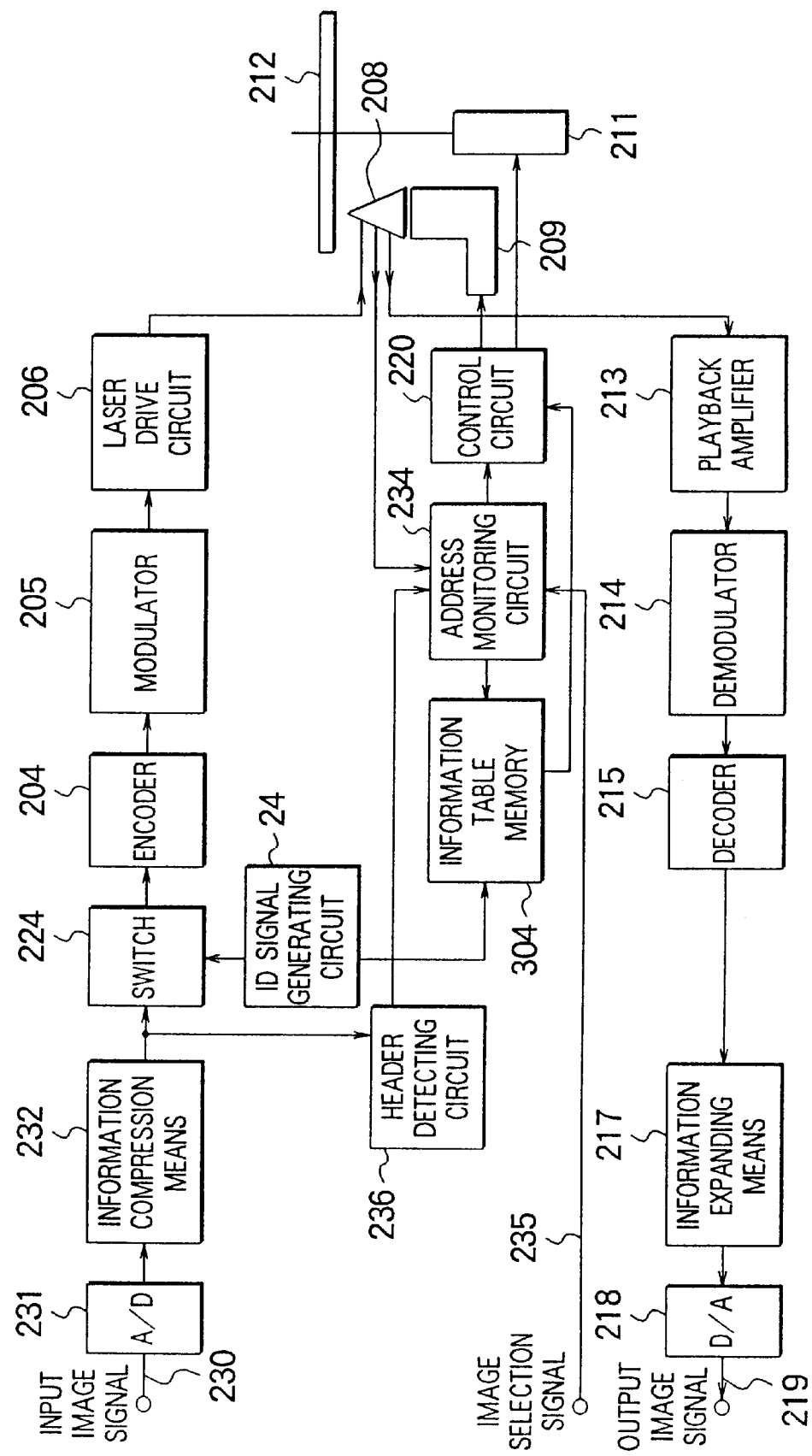
FIG. 13 is a block circuit diagram showing the video disk recording/playback device of Embodiment B2.

FIG. 13 is a block circuit diagram showing a video disk recording/playback device of Embodiment B2. Reference numerals identical to those in FIG. 4 and FIG. 10 denote identical or corresponding parts. An image selection signal 235 indicates that the selected image such as the image to be retrieved has been selected.

The difference of this embodiment from Embodiment B1 will next be described. The input image signal 230 having the GOP structure described above is converted at the A/D converter 231 into a digital signal, and is converted at the information compression means 232 into a high-efficiency coded image information signal. During such time, a GOP header containing information required for decoding the GOP is appended to the start of each GOP, and a sequence header containing information concerning the sequence is appended to the start of the sequence consisting of a plurality of GOPs.

The image information is then encoded for recording on the optical disk 212, and modulated so as to reduce the effects of inter-code interferences on the optical disk, and is then recorded on the optical disk 212, using a laser.

The GOP header and sequence header contain a "unique word" which is information for identifying them, and the header detecting circuit 236 detects the unique word to detect and judge each header.

The address monitoring circuit 234 monitors which address on the optical disk 212 the coded data corresponding to the image is recorded, and it is possible to know the address where the latest GOP header and sequence header are recorded, on the basis of the address monitored by the address monitoring circuit 234 and the header detected by the header detecting circuit 236. The address is stored in the information table memory 304.

When the selected image is selected from among the input image signal 230, the address at which the coded data corresponding to the selected image is recorded is known, by using the image selection signal 235 indicating that this image has been selected, and the signal from the address monitoring circuit 234. This address is stored in the information table memory 304.

The ID signal generating circuit 302 generates an ID signal for identifying the optical disk 212, and stores the ID signal in the information table memory 304. A schematic drawing of the table is given in FIG. 11.

The ID signal is recorded in a specific part on the optical disk 212, by manipulating the switch 224 at a user's desired time instant, for example.

By using the ID signal recorded on the optical disk 212, and the address of the selected image stored in the information table memory 304 within the device, arbitrary selected image can be retrieved and displayed in a procedure similar to that described in connection with Embodiment B1.

Figure 12:
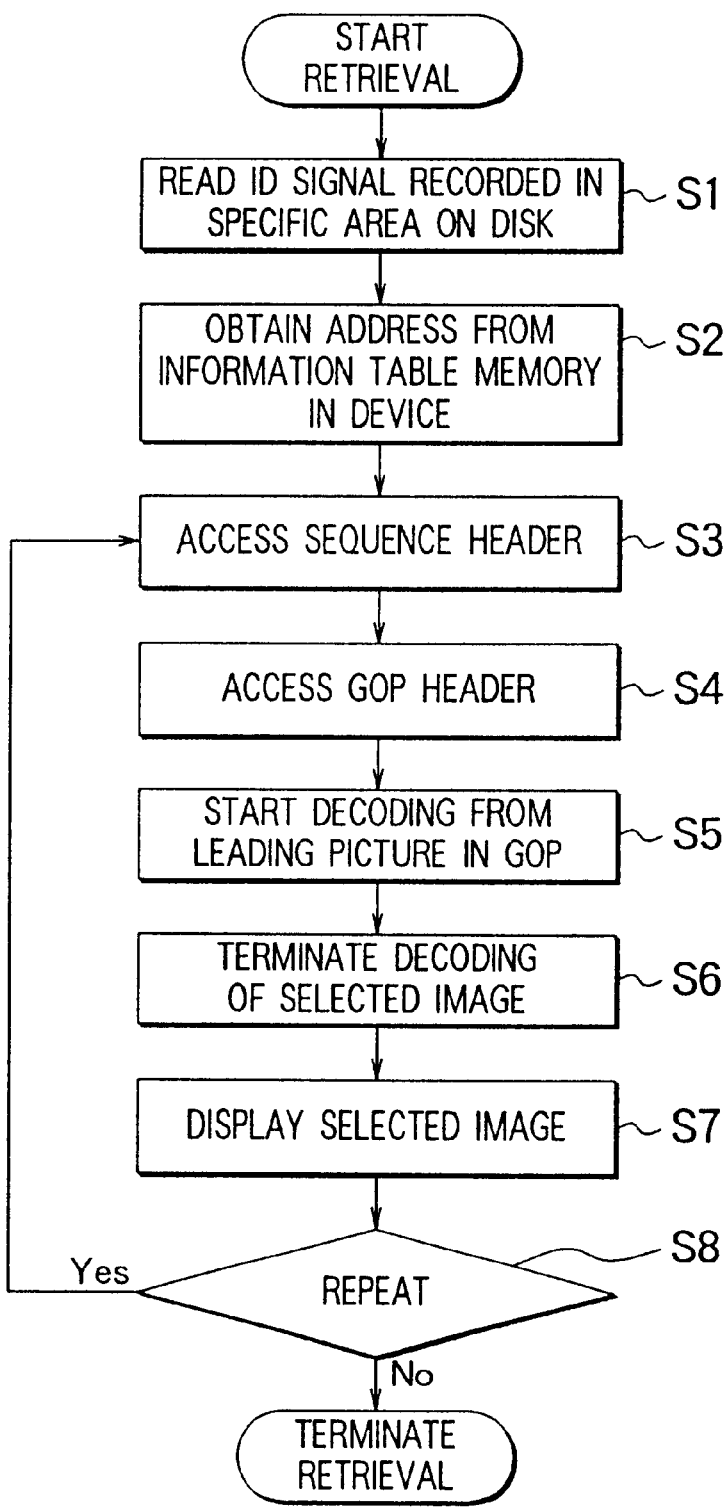
FIG. 12 is a flowchart showing the operation of during image retrieval of Embodiment B1, Embodiment B2 and Embodiment B3.

The operations for retrieving and displaying the selected image are similar to that shown in FIG. 12, and their description is omitted.

Embodiment B3

Figure 14:
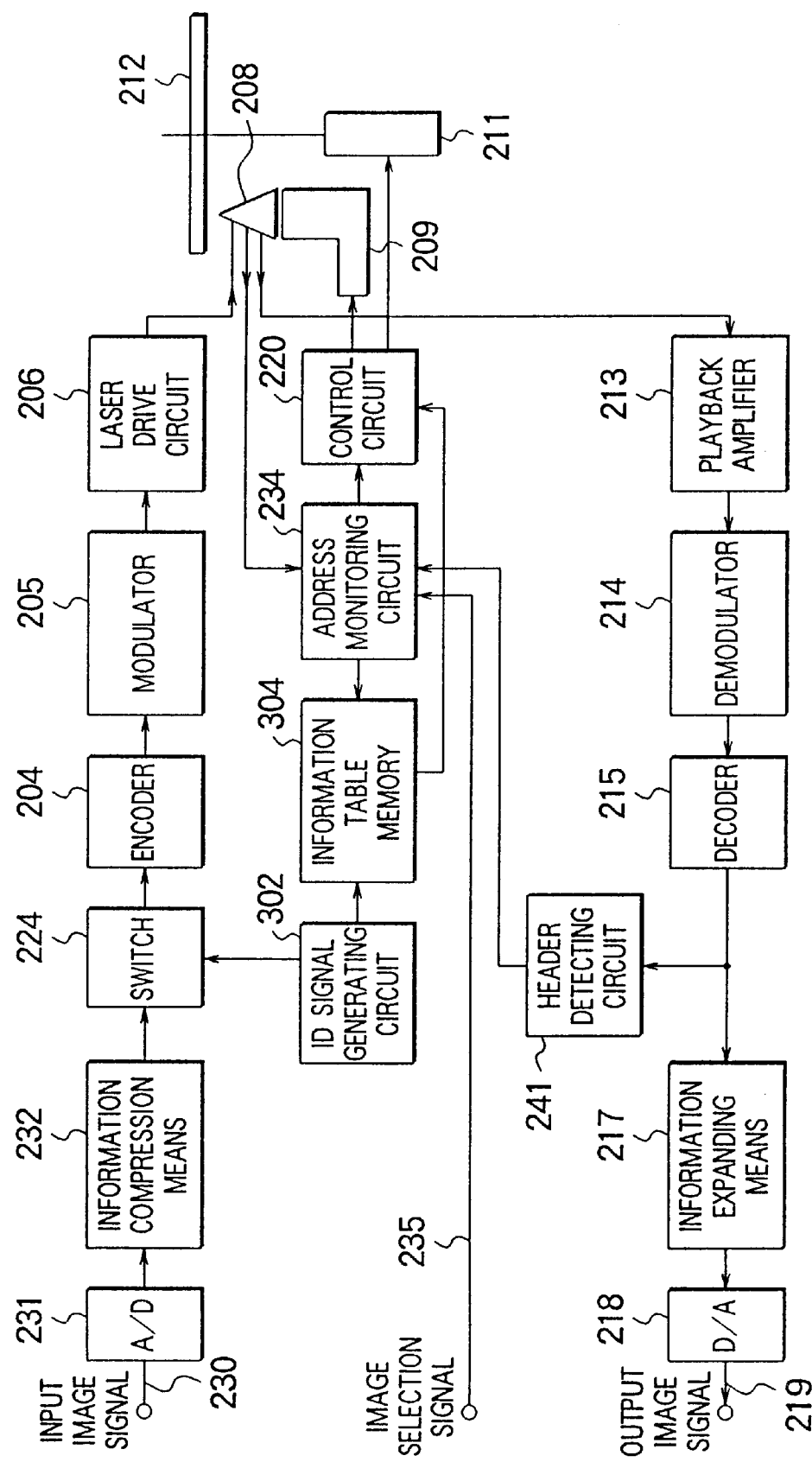
FIG. 14 is a block circuit diagram showing the video disk recording/playback device of Embodiment B3.

FIG. 14 is a block circuit diagram showing a video disk recording/playback device of Embodiment B3. Reference numerals identical to those in FIG. 13 denote identical or corresponding parts. A difference from Embodiment B2 is that a header detecting circuit 241 of this embodiment detects GOP headers and sequence headers in the bit stream of the coded data reproduced from the optical disk 212.

The operations of this embodiment will be described with regard to the aspects different from those of Embodiment B2.

The header detecting circuit 241 detects the GOP headers and sequence headers in the image data decoded by the decoder 215, and the address monitoring circuit 234 monitors at which address on the optical disk 212 the coded data corresponding to the image is recorded.

By utilizing the address monitoring circuit 234 and the header detecting circuit 241, it is possible to know the address where the latest GOP header and sequence header are recorded, and this address is stored in the information table memory 304.

When a desired image is selected from among the output image signals 219, the image selection signal 235 indicating that the image has been selected is input to the address monitoring circuit 234, and it is possible to know the address where the coded data of the selected image is recorded, and this address is stored in the information table memory 304.

The table thus stored in the information table memory 304 is as illustrated in FIG. 11.

The above-mentioned ID signal is recorded in a specific part of the optical disk 212 by manipulating the switch 224 at a user's desired time instant, for example.

By utilizing the ID signal recorded in the optical disk 212 and the address of the selected image stored in the information table memory 304 in the device, it is possible to retrieve and display any selected image from the optical disk 212, by the procedure similar to that described in connection with Embodiment B1.

The operations for retrieving and displaying the selected image are similar to those of the flowchart of FIG. 12, and their description will be omitted.

Embodiment B4

Figure 15:
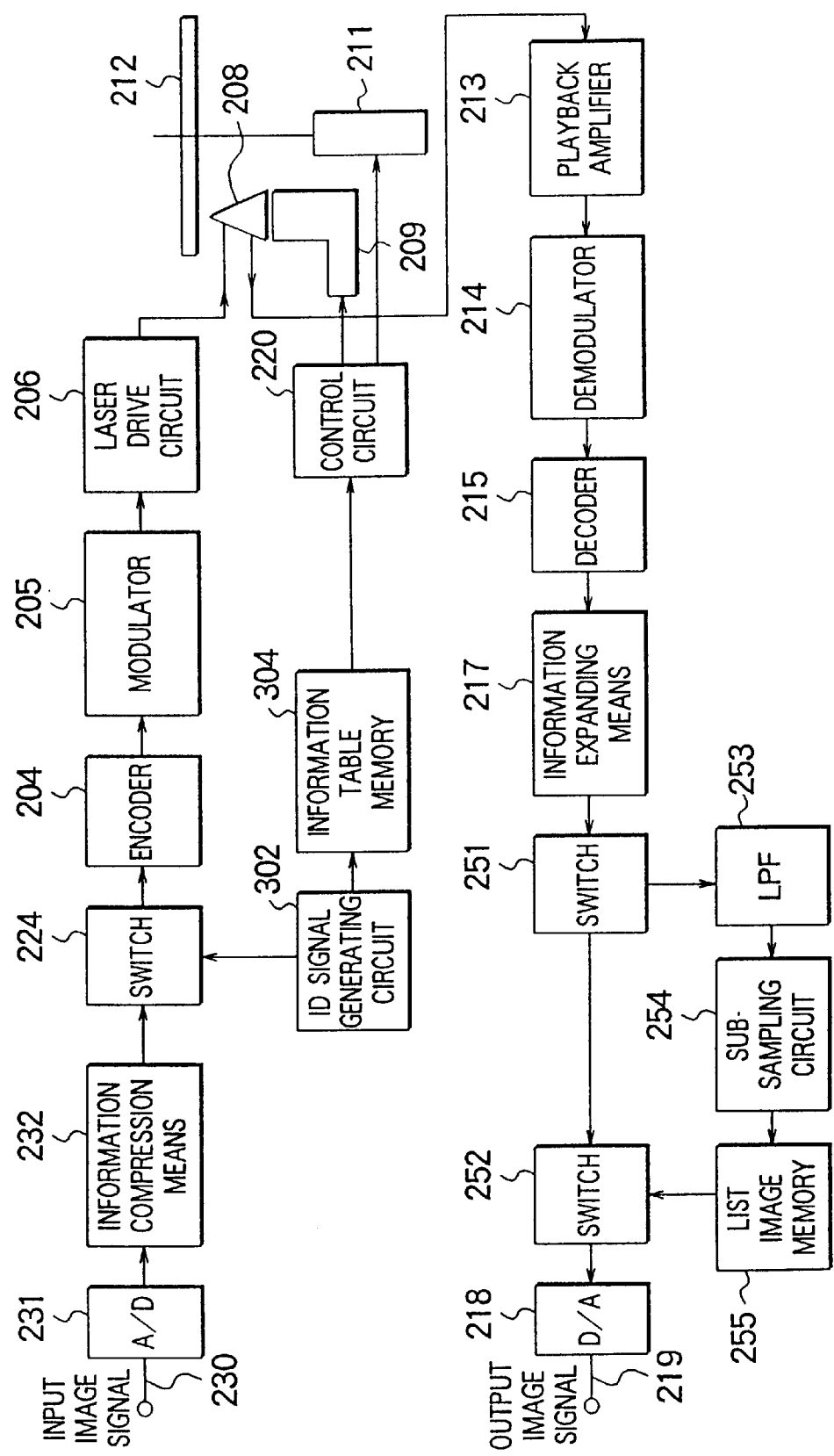
FIG. 15 is a block circuit diagram showing the video disk recording/playback device of Embodiment B4.

FIG. 15 is a block circuit diagram showing a video disk recording/playback device of Embodiment B4. Reference numerals identical to those in FIG. 6 and FIG. 10 denote identical or corresponding parts.

The operations of the parts different from Embodiment B1 will next be described. The operations during recording are identical to those of Embodiment B1.

During playback, the ID signal recorded in the optical disk 212 and the information table memory 304 in the device are utilized for list display of any selected image recorded in the optical disk 212, and the contents of recording on the optical, disk 212 can be known promptly.

Figure 16:
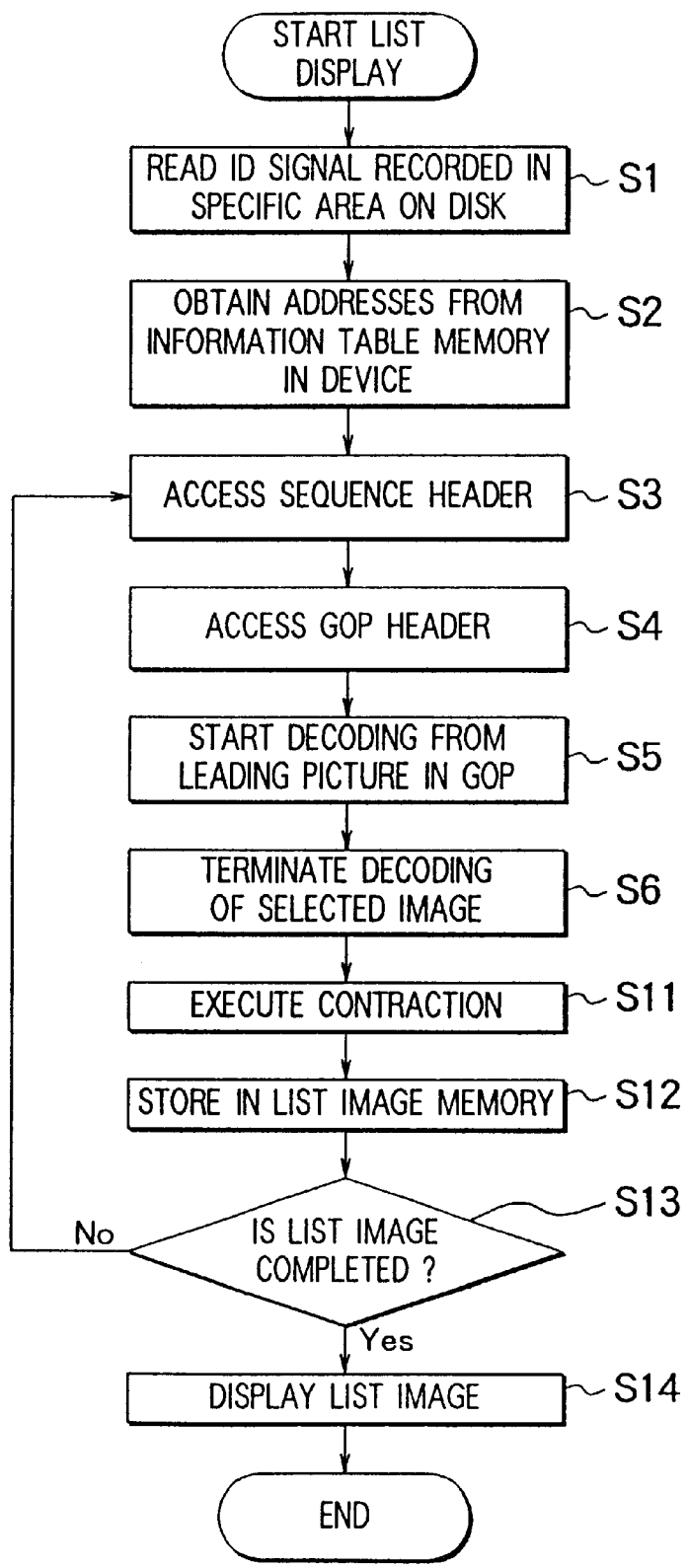
FIG. 16 is a flowchart showing the operation during list image display according to Embodiment B4.

The operations for list display of the selected image will next be described with reference to the flowchart of FIG. 16.

When the list display is commanded, and the list display operation is started, and the operations similar to those from the steps S1 to S6 described with reference to FIG. 12 are performed. Then, at the step S11, the switch 251 is switched to the side of the LPF 253, so that the high-frequency components are removed in preparation for the subsequent processing. Then, subsampling to 1/N is conducted at the sub-sampling circuit 254, for conversion into contracted image of 1/N. The contracted image is then stored in the list image memory 255 (step S12).

By repeating the above described sequence of operations (step S12), a list image formed of contracted screens of N selected images recorded in the disk, in the list image memory 255. By manipulating the switch 252 at the step S14, the list image stored in the list image memory 255 can be displayed as shown in FIG. 8, and the contents recorded on the optical disk 212 can be readily known.

Embodiment B5

Figure 17:
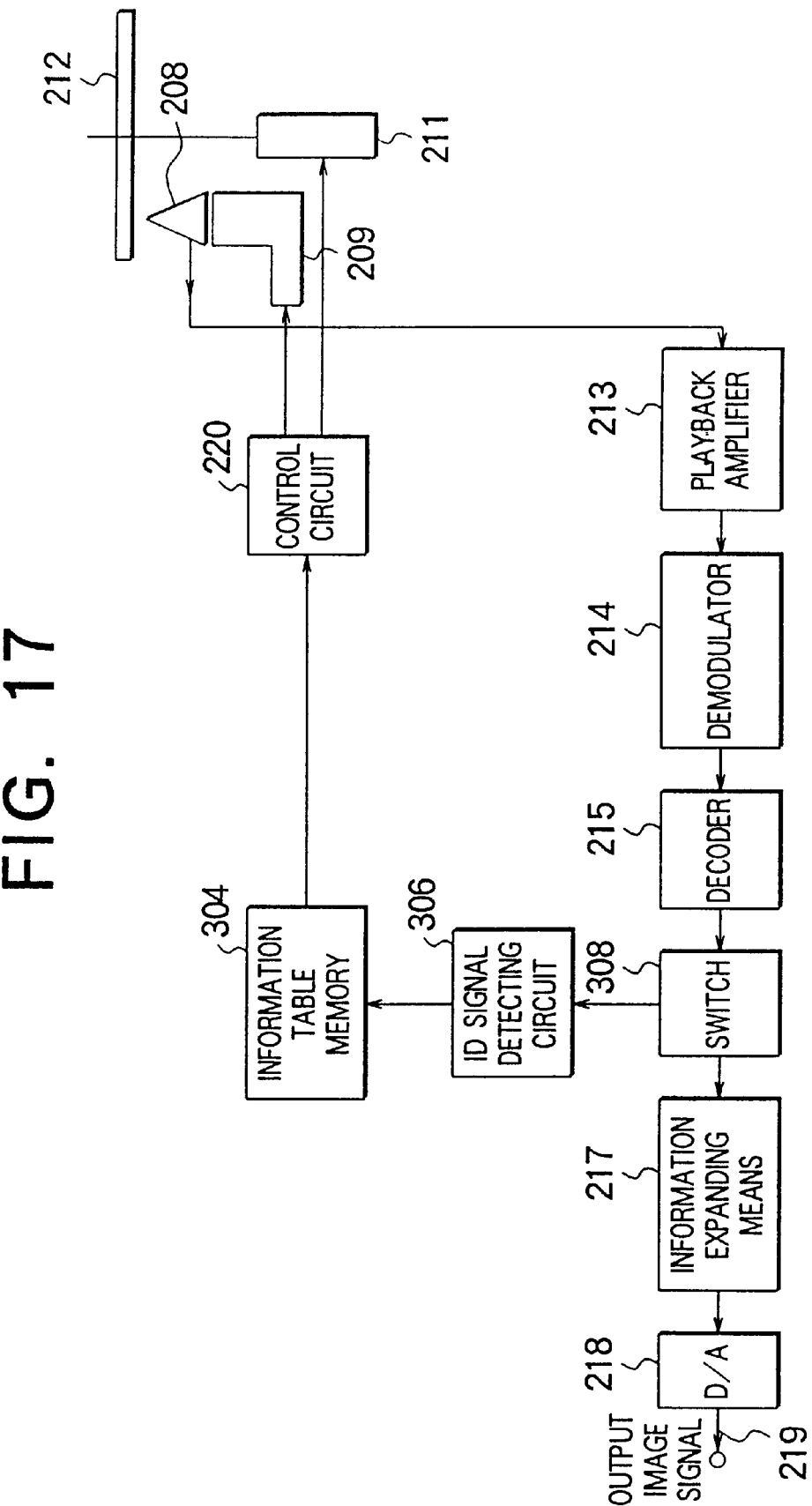
FIG. 17 is a block circuit diagram showing the video disk playback device of Embodiment B5.

FIG. 17 is a block circuit diagram showing a video disk playback device of Embodiment B5. Reference numerals identical to those in FIG. 10 denote identical or corresponding parts. An ID signal detecting circuit 306 is provided for detecting and utilizing the bit sequence of image signal or the like recorded in the specific part on the optical disk 212, and generating an ID signal. A switch 308 is switched between normal playback and generation of an ID signal from the bit sequence from the specific part on the video disk 212.

The operations of Embodiment B5 will next be described with regard to the parts different from those during playback of Embodiment B1. Because the image signal and the like recorded on each optical disk is different, the bit sequence recorded in the specific part of the optical disk is different from one disk to another. The ID signal detecting circuit 306 generates an ID signal for identifying the optical disk from the bit sequence of the image signal or the like recorded in the specific part of the optical disk.

The operations for retrieving and display any selected image from the images recorded in the individual optical disks will next be described.

Figure 18:
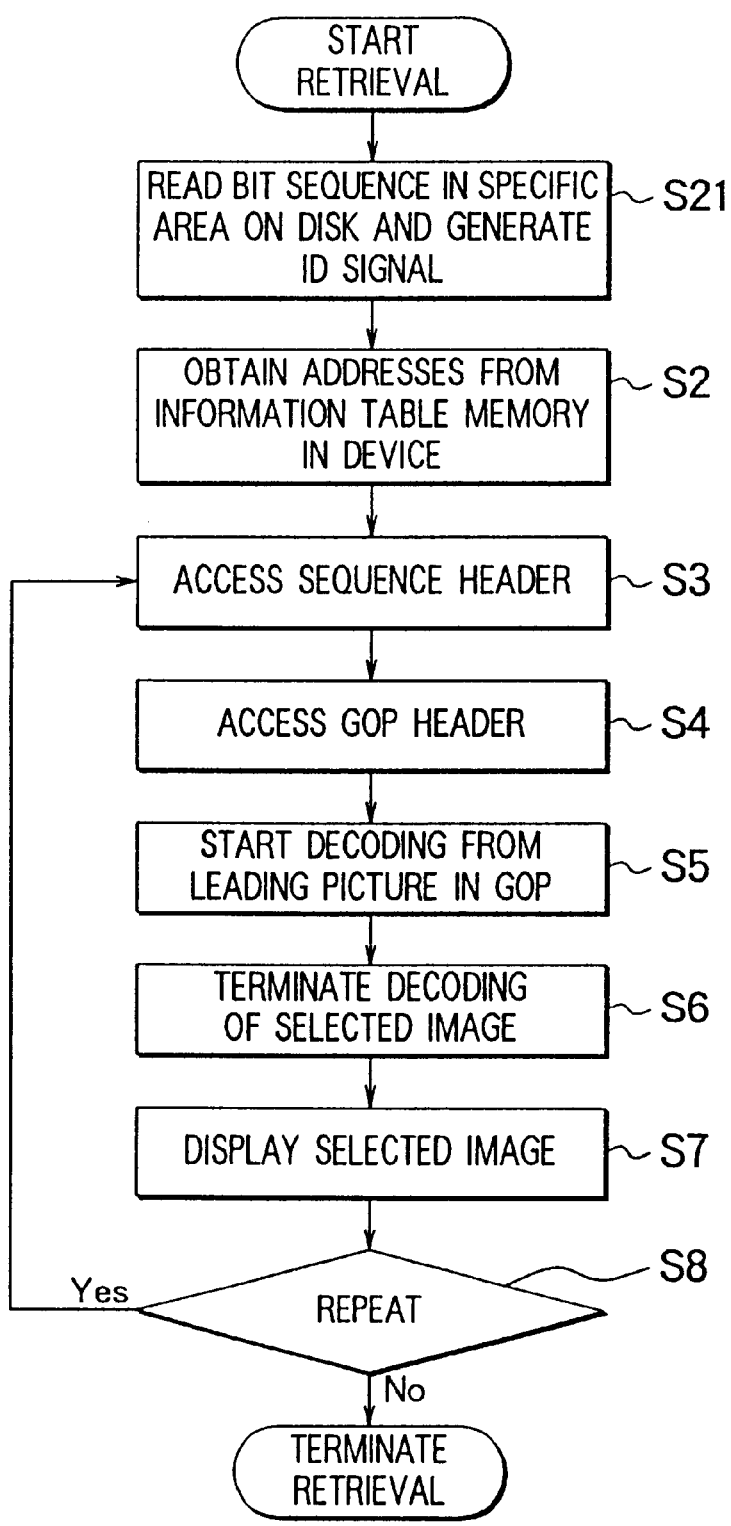
FIG. 18 is a flowchart showing the operation of during image retrieval of Embodiment B5 and Embodiment B6.

FIG. 18 is a flowchart showing the operation. When the retrieval is commanded, the switch 308 is switched to the side of the ID signal detecting circuit 306 at the step S21. The ID signal detecting circuit 306 detects and utilizes the bit sequence recorded in the specific part of the optical disk 212 to generate an ID signal. At the step S2, the sequence header address, the GOP header address, the selected image start address and the like corresponding to the ID signal generated at the step S21 are read from the information table memory 304 in the device, and at the step S3 the sequence header is accessed, and at the step S4 the GOP header is accessed, and the information written there is obtained. At the step S5, the switch 308 is switched to the side of the information expanding means 217, and decoding is started from the start picture in the GOP, and when the decoding of the selected images is over at the step S6, the decoded screen of the selected images is displayed at the step S7, and the step S3 to step S7 are repeated and when it is found, at the step S8, that the retrieval is over, the operation is terminated.

Embodiment B6

Figure 19:
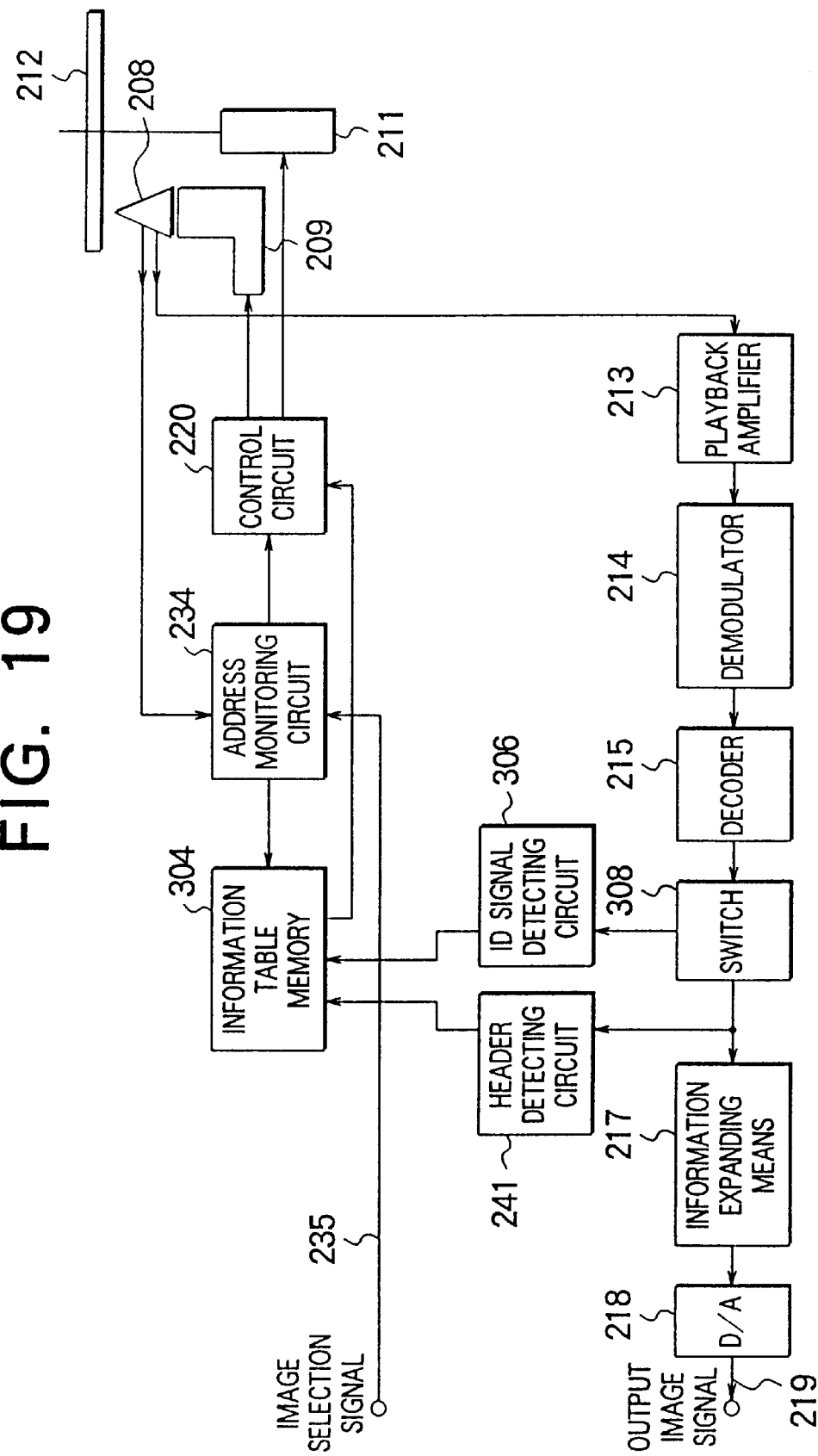
FIG. 19 is a block circuit diagram showing the video disk playback device of Embodiment B6.

FIG. 19 is a block circuit diagram showing a video disk playback device of Embodiment B6. Reference numerals identical to those in FIG. 13 and FIG. 17 denote identical or corresponding parts.

The operations of Embodiment B6 will next be described with regard to the parts different from those during playback of Embodiment B1. The various headers described above contain a "unique word" which is information for identifying them. By detecting the unique word, each header is detected and identified. The header detecting circuit 241 utilizes this method to detect the GOP header and the sequence header.

The addresses are allocated for specifying the locations on the optical disk 212, and the address monitoring circuit 234 monitors which addresses on the optical disk the coded data corresponding to the image is recorded in.

Utilizing the address monitoring circuit 234 and the header detecting circuit 241, it is possible to know the address where the latest GOP header and sequence header are recorded, and the address is stored in the information table memory 304.

When the selected image is selected from among the output image signals 219, the address where the coded data of the selected image is recorded can be known from an image selection signal 235 indicating that the image has been selected, and the signal from the address monitoring circuit 234, and the address is stored in the information table memory 304.

When the switch 308 is manipulated, the ID signal detecting circuit 306 generates an ID signal for identifying the optical disk 212, from the bit sequence recorded in the specific part of the optical disk 212, and this ID signal is also stored in the information table memory 304.

In this way, the table stored in the information table memory is schematically shown in FIG. 11.

When the video disk playback device having the configuration described above is utilized for retrieving and displaying an arbitrary selected image recorded on the optical disk 212, the following operations are performed. When retrieval is started, the switch 308 is manipulated, and the bit sequence recorded in the specific part of the optical disk 212 is detected, and the ID signal is then generated using the detected bit sequence. The sequence header address, GOP header address, selected image start address and the like corresponding to the generated ID signal is read from the information table memory 304 in the device, and jump is made to the sequence header and the GOP header, and the information written there is obtained. Then, decoding is started at the start picture of the GOP, and when the decoding of the selected image is completed, the decoded screen of the selected image is displayed. The flowchart for this sequence of operations is similar to that of FIG. 18.

Embodiment B7

Figure 20:
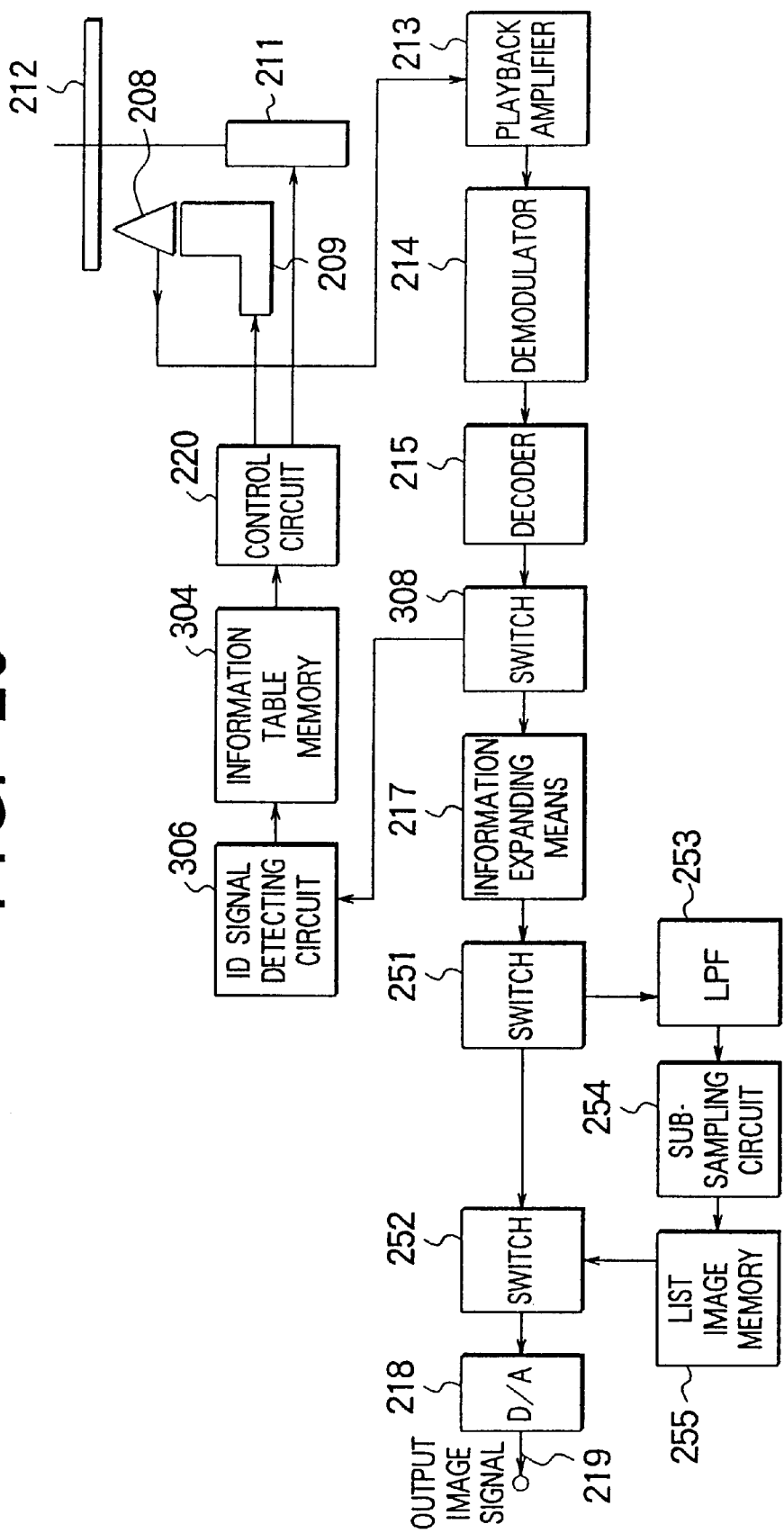
FIG. 20 is a block circuit diagram showing the video disk playback device of Embodiment B7.

FIG. 20 is a block circuit diagram showing a video disk recording/playback device of Embodiment B7. Reference numerals identical to those in FIG. 15 and FIG. 17 denote identical or corresponding parts.

The operations will next be described. High-efficiency coded data of the image having a GOP structure is described in the optical disk 212. Appended to the start of each GOP is a GOP header containing information required for decoding the GOP. A sequence header containing information concerning the sequence may be appended to the start of the sequence consisting of a plurality of GOPs.

To reproduce the optical disk 212, the compressed image signal recorded in the optical disk 212 is amplified at the playback amplifier 213, and decoded by the demodulator 214 and the decoder 215 into digital data. Then, the information expanding means 217, for instance, decodes the digital image signal, and by means of the D/A converter 218 an analog output image signal 219 or the like is obtained, and displayed by a monitor or the like.

The image signal or the like recorded in each optical disk differs from one disk to another, so that the bit sequence recorded in the specific part of the optical disk differs from one disk to another. Utilizing this fact, the ID signal detecting circuit 306 generates an ID signal for identifying the optical disk 212, from the bit sequence of the image signal or the like recorded in the specific part.

Stored in the information table memory 304 are an ID signal generated by the ID signal detecting circuit 306 for identifying the optical disk 212, the start address on the disk of the coded data of the selected image, such as the image to be retrieved, on the optical disk 212, and the start address of the data containing information required for reproducing the coded data, i.e., the start address of the GOP header of the GOP containing the coded data and the start address of the sequence header concerning the sequence containing the GOP and the like.

Data concerning the selected image on an optical disk different from the optical disk 212 may also be stored in the information table. In such a case, the ID signal of the data differs depending on the optical disk 212.

The table thus stored in the information table memory is schematically shown in FIG. 11.

Figure 21:
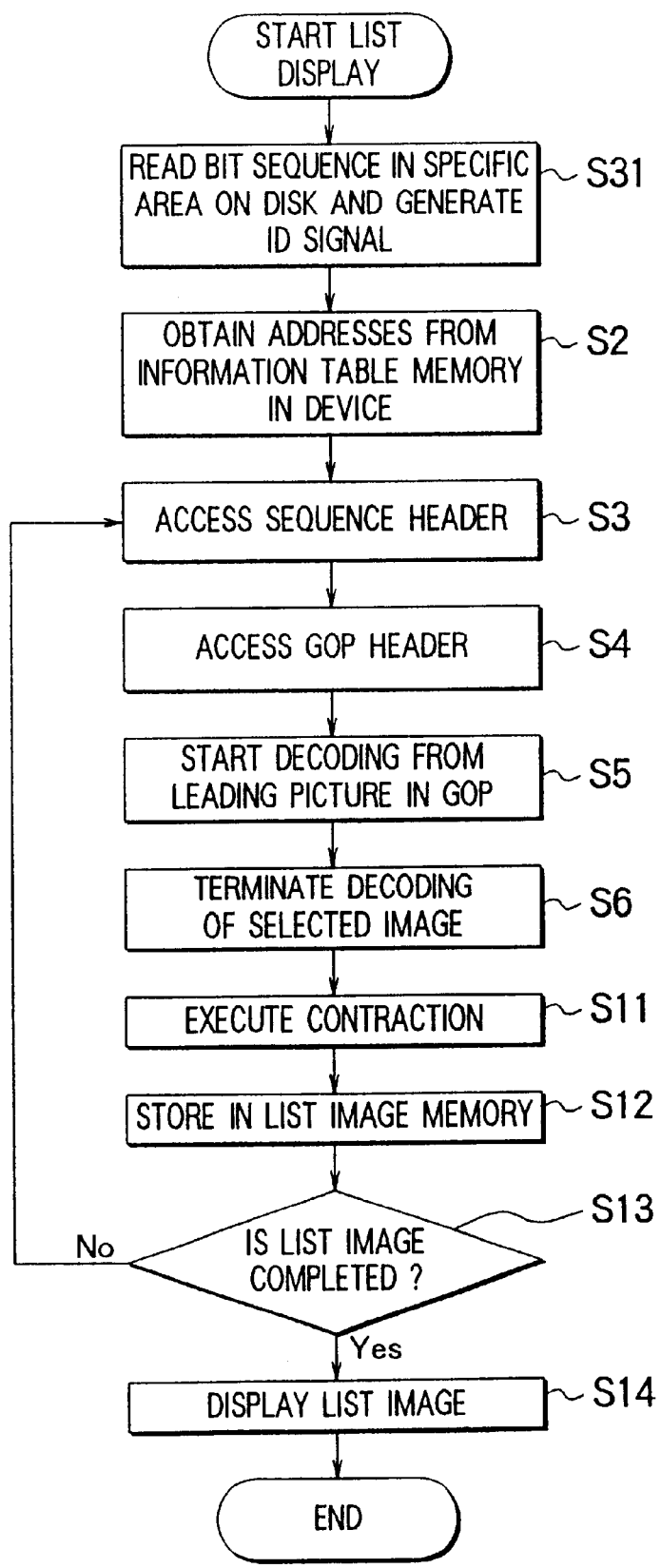
FIG. 21 is a flowchart showing the operation during list image display according to Embodiment B7.

By utilizing these, any selected images recorded in the optical disk 212 can be list-displayed, and the contents of recording in the optical disk 212 may be known promptly. The operation for the list display of the selected images is shown by the flowchart of FIG. 21.

First, the list display operation is started. When the user manipulates the switch 308, then at the step S31, the ID signal detecting circuit 306 generates an ID signal utilizing the bit sequence recorded in the specific part of the optical disk 212. At the step S2, the sequence header address, GOP address, the selected image start address and the like corresponding to the ID signal generated at the step S31 are read from the information table memory 304 in the device.

On the basis of these, at the step S3, the sequence header is accessed to obtain the sequence information, and the step S4, the GOP header is accessed. At the step S5, the decoding is started from the picture at the start of the GOP, and at the step S6, after decoding of the picture of the selected image is completed, the switch 251 is manipulated, and at the step S11, a processing for conversion into contracted images is applied. For this purpose, high-frequency components are removed by the low-pass filter 253 for the subsequent processing. After that, contracted images of 1/N are obtained by 1/N sub-sampling by means of the sub-sampling circuit 254. The resultant contracted images are stored in the list image memory 255.

By repeating the sequence of operations, the list image memory 255 stores the list image formed of contracted images of the N selected screens recorded in the disk (step S13). A list image stored in the list image memory is as shown in FIG. 8. At the step S14, the switch 252 is manipulated and the list image is displayed, and the contents recorded in the optical disk 212 can be readily known.

In above description of each of the embodiments, the selected images are mainly assumed to be images to be retrieved. However, the inventive concepts described in connection with the above embodiments can be applied to images for head-of-program finding, images at which the interruption took place in the preceding playback, and the like.

Embodiment C1

Figure 22:
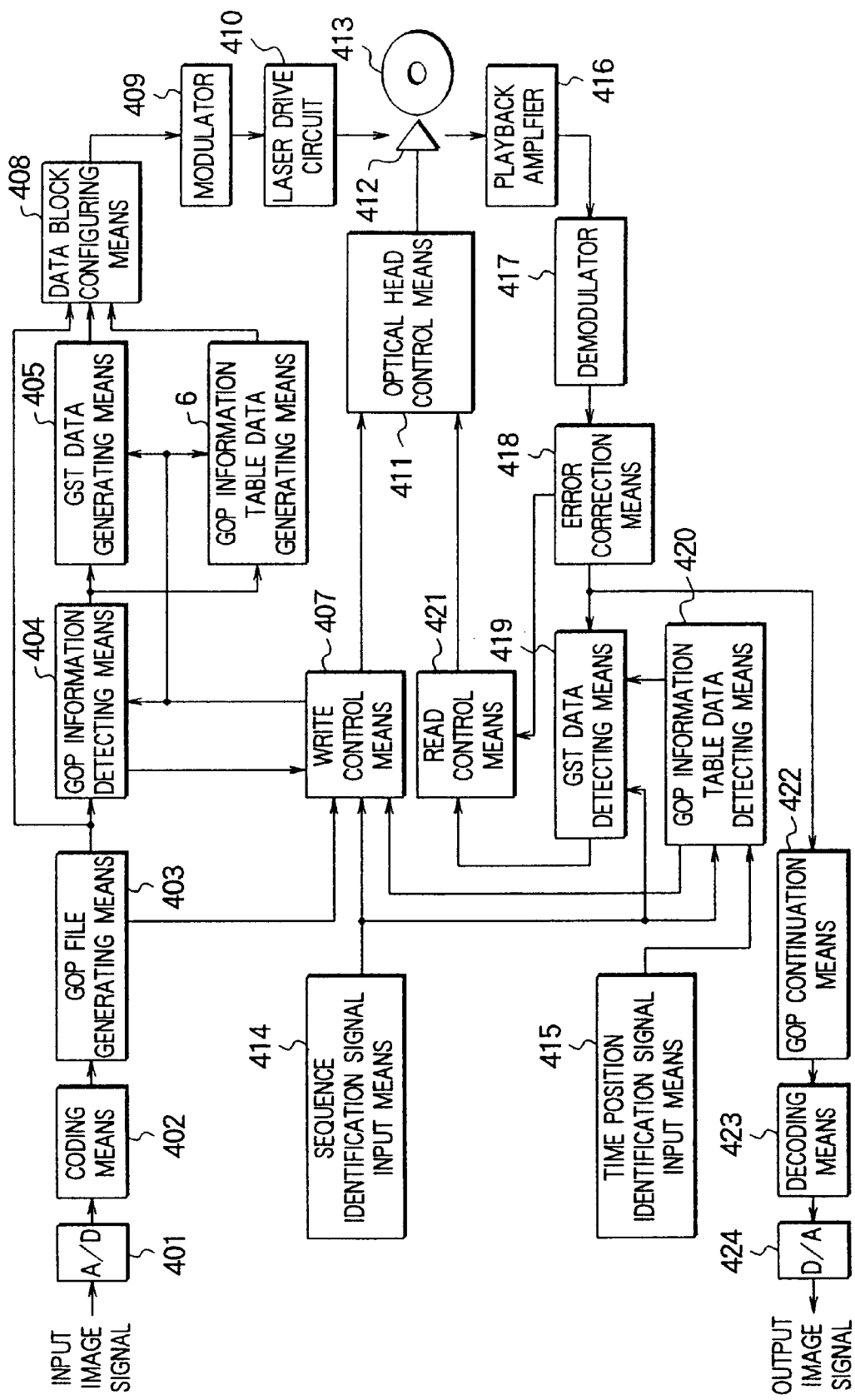
FIG. 22 is a block diagram showing the configuration of the image signal recording device and image signal playback device according to Embodiment C1.
Figure 23:
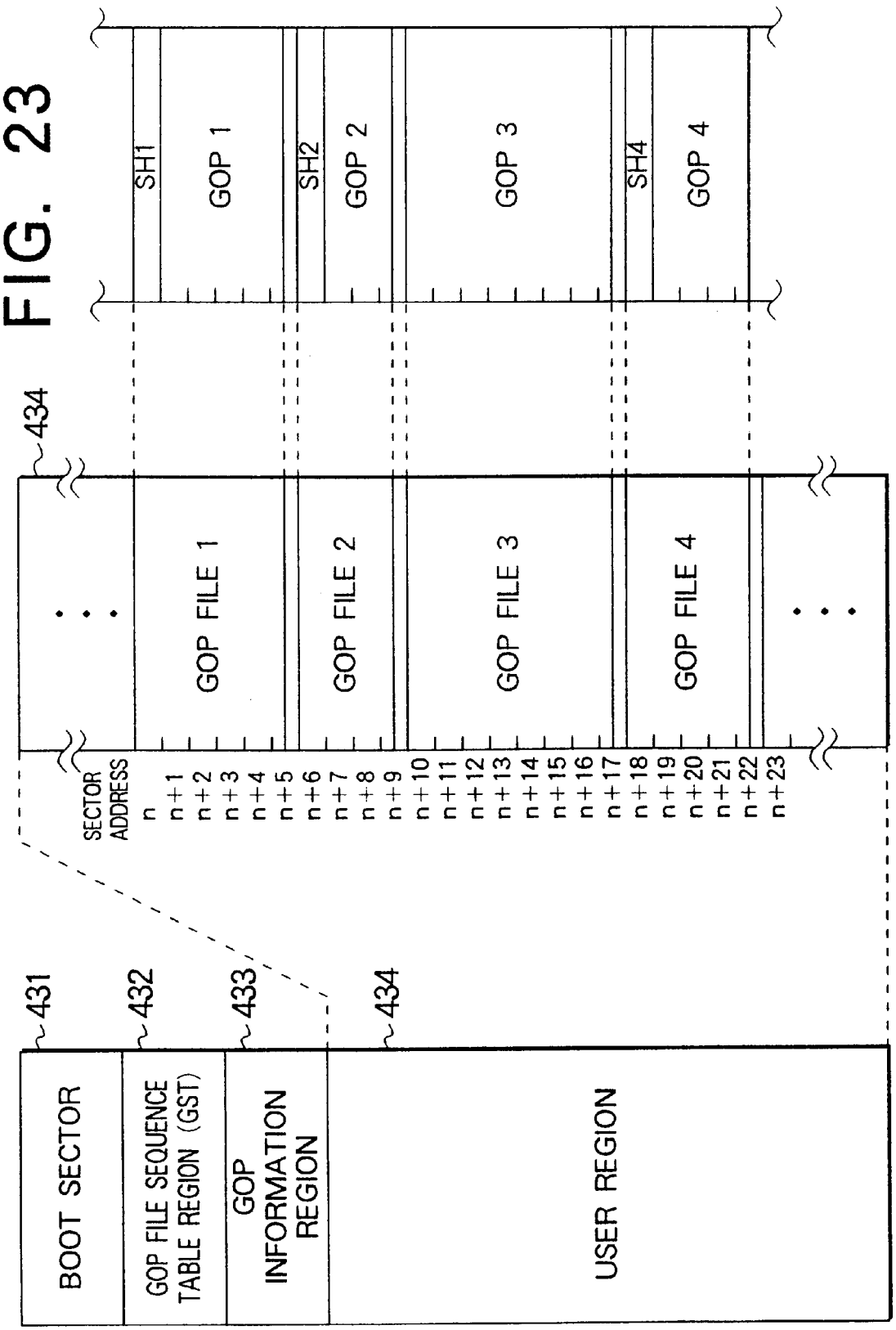
FIG. 23 is a sector map diagram showing the arrangement of the regions on the optical disk according to Embodiment C1.

FIG. 22 is a block diagram showing the configuration of an optical disk recording/playback device of Embodiment C1. FIG. 23 is a sector map diagram showing the data arrangement on the optical disk according to Embodiment C1.

As illustrated in FIG. 22, the optical disk recording/playback device of this embodiment comprises an A/D converter 401, a coding means 402, a GOP file forming means 403, a GOP information detecting means 404, a GOP file sequence table (GST) data forming means 405, a GOP information table data forming means 406, a write control means 407, a data block configuring means 408, a modulator 409, a laser drive circuit 410, an optical head control means 411, and an optical head 412 for writing data on or reading data from an optical disk 413. The optical disk recording/playback device further comprises a sequence identifying signal input means 414, a time position identifying signal input means 415, a playback amplifier 416, a demodulator 417, an error correcting means 418, a GOP file sequence table (GST) data detecting means 419, a GOP information table data detecting means 420, a read control means 421, a GOP continuation means 422, a decoding means 423, and a D/A converter 424.

In FIG. 23, reference numeral 431 denotes a boot sector for storing a boot code, 432 denotes a GOP file sequence table (GST) region for storing information concerning the arrangement of the GOP files (to be described later), 433 denotes GOP information region, and 434 denotes user region.

In the present embodiment, the sector addresses are arranged in the ascending order from the inside of the disk, and the optical disk is for recording image signals obtained by compression coding by MPEG method. The image data coding method according to the MPEG method does not necessarily require a sequence header (SH) at the start of each GOP. In this example, it is assumed that no sequence header is appended to the GOP 3. It is also assumed that GOP is recorded by variable-data rate, as was described above. Identical reference numerals denote identical or corresponding parts.

Figure 41:
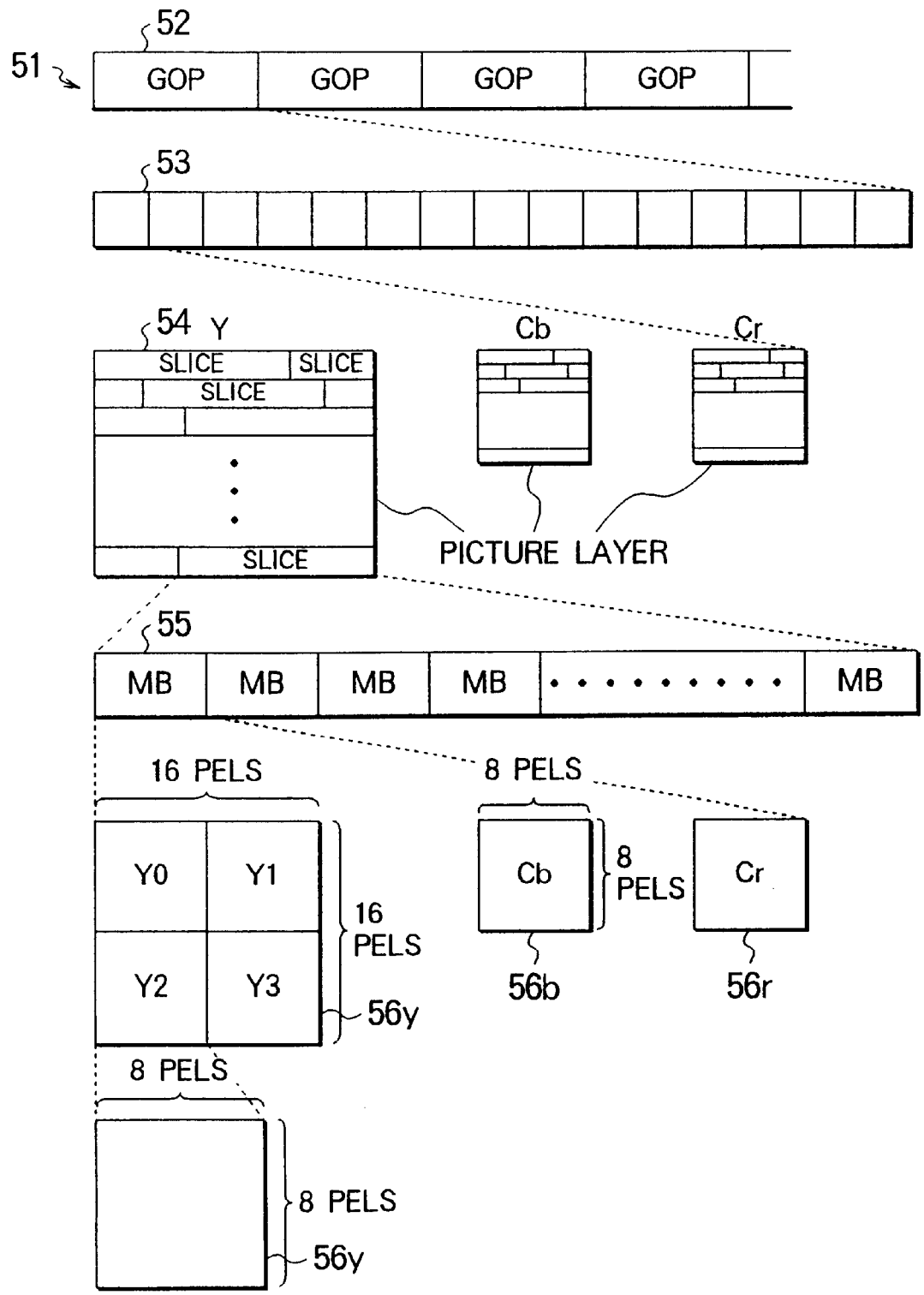
FIG. 41 shows data arrangement of a video signal conformable to the MPEG system.
Figure 42:
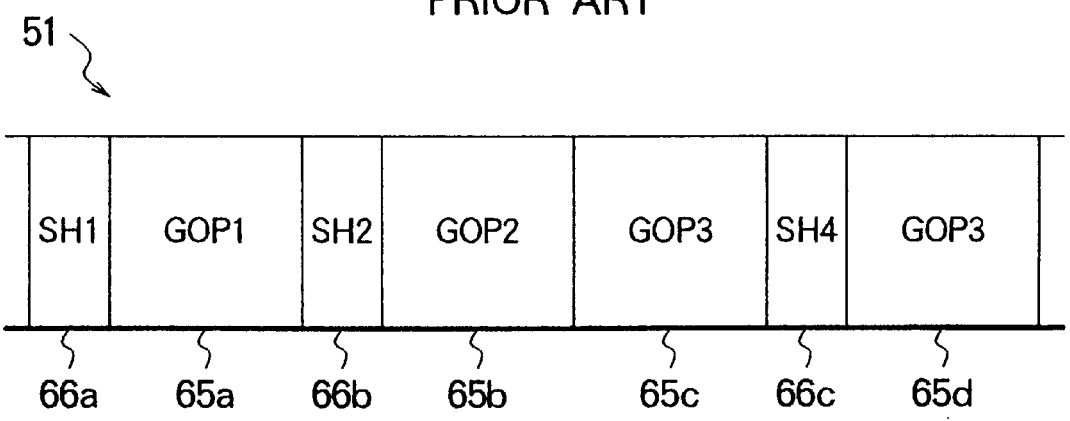
FIG. 42 is a data configuration diagram showing the sequence layer according to the coding method according to the MPEG system.
Figure 43:
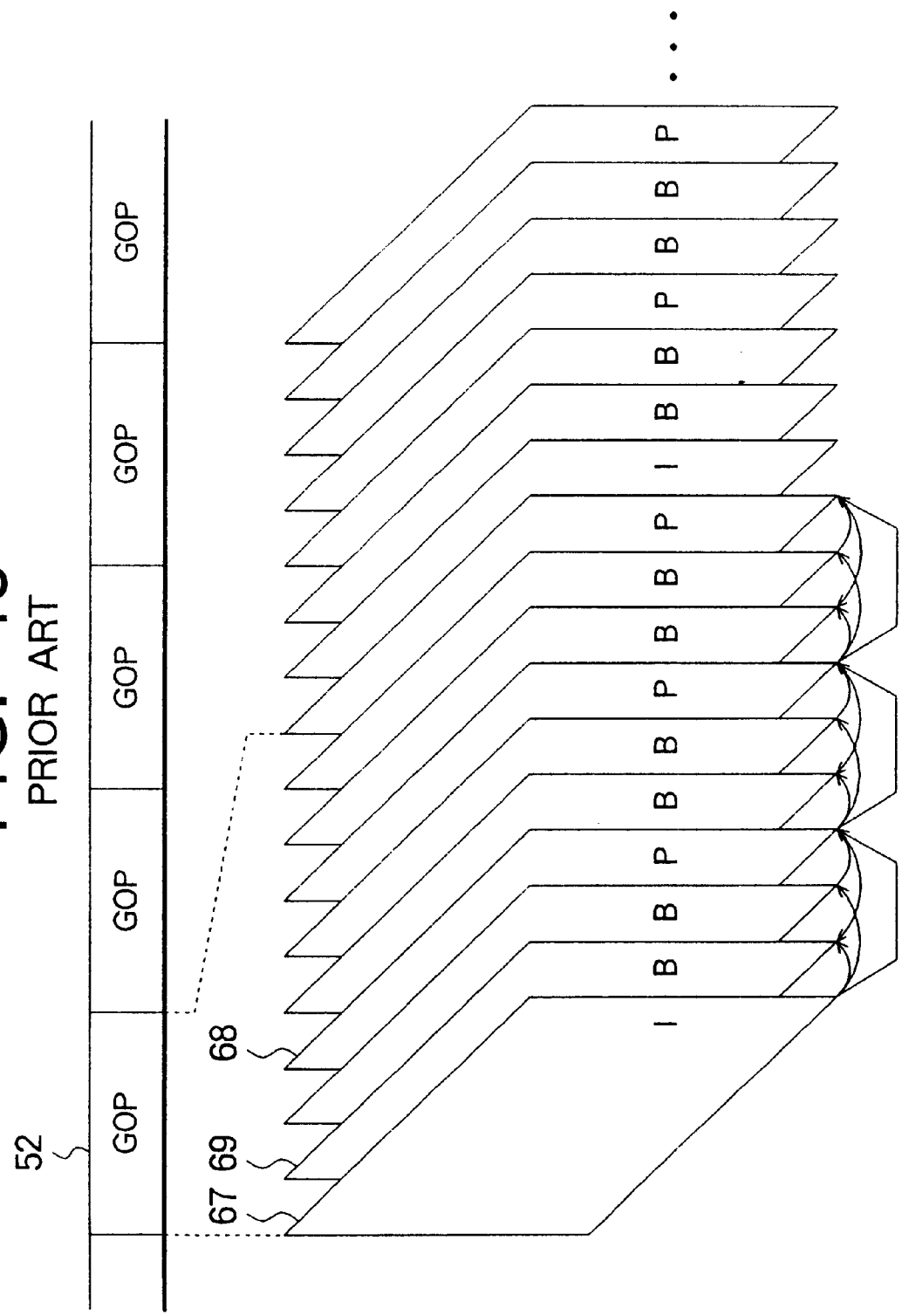
FIG. 43 is a structure diagram showing the configuration of the GOP according to the coding method according the MPEG system.
Figure 44A:
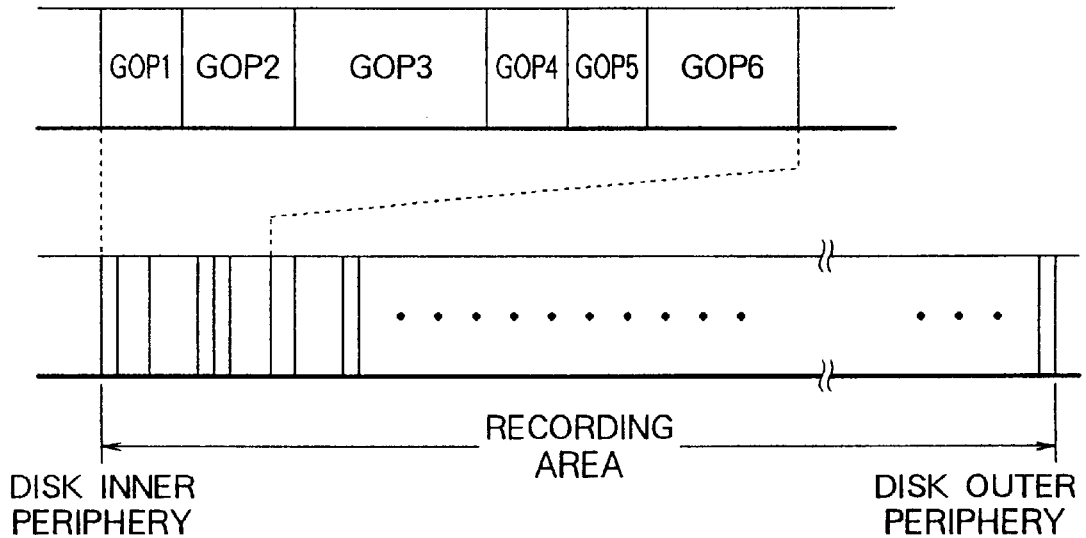
FIG. 44A is a schematic diagram showing a method of recording, with a variable rate, GOPs coded by the MPEG system.
Figure 44B:
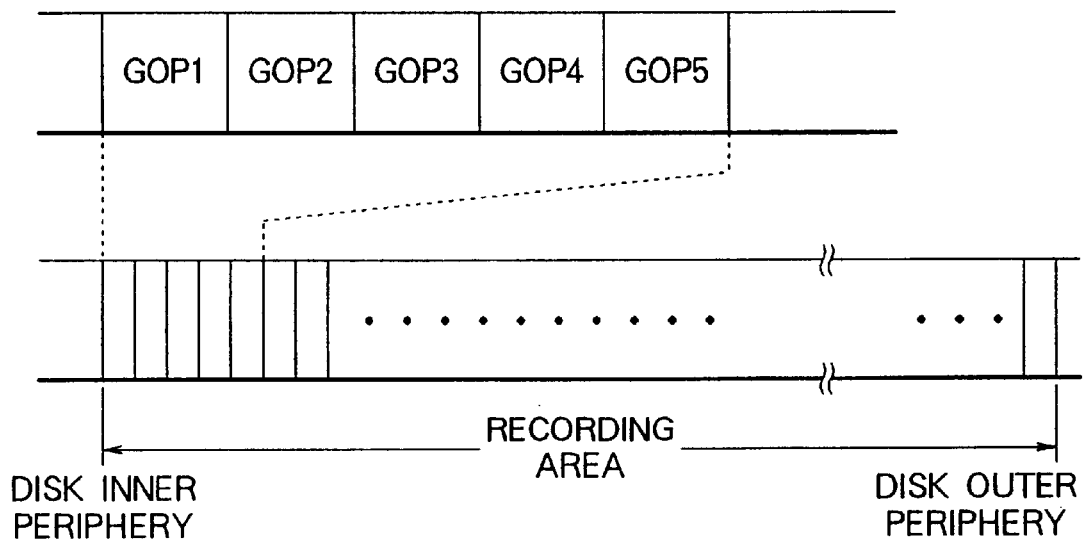
FIG. 44B is a schematic diagram showing a method of recording, with a fixed rate, GOPs coded by the MPEG system.
Figure 45A:
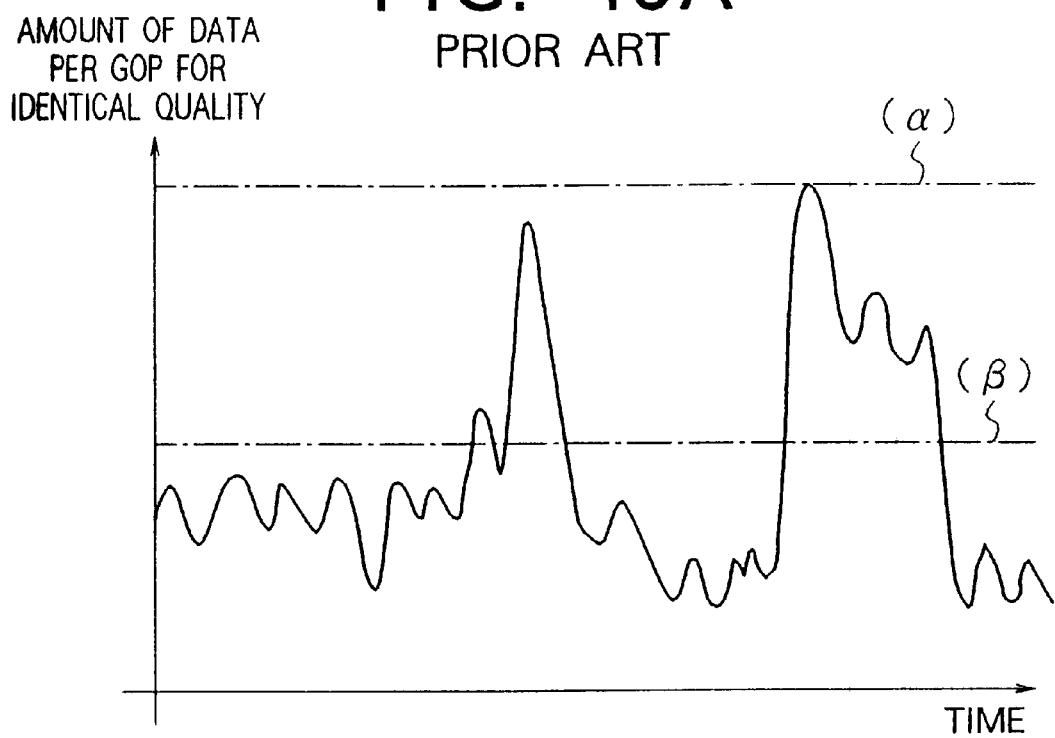
FIG. 45A a diagram showing an example of timewise variation of the amount of data per GOP according the method of recording according to the MPEG system.
Figure 45B:
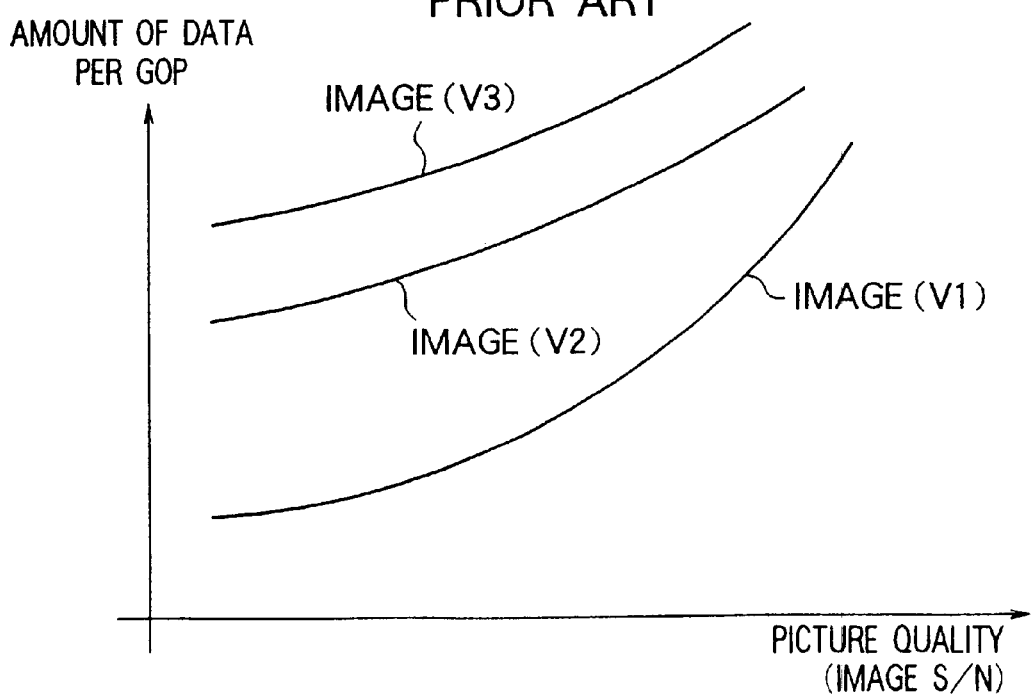
FIG. 45B is a diagram showing the relationships between the amount of data per GOP and the picture quality.
Figure 46:
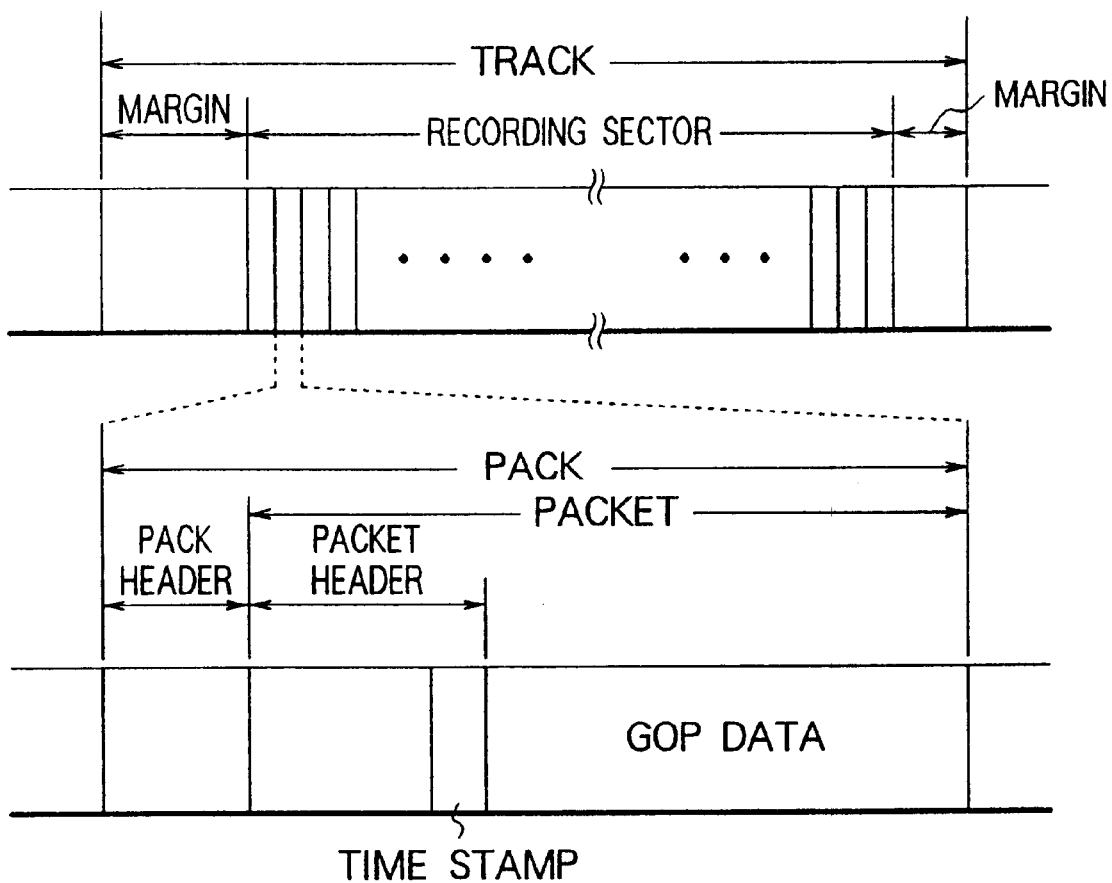
FIG. 46 is a diagram showing an example of the relationship between the picture quality after the decoding of the image signal coded according to the MPEG system and the amount of data per GOP.

The operations during recording will next be described. The input image signal is input to and converted to a digital image signal at the A/D converter 401, and is then coded at the coding means 402 by the MPEG method, to be data-compressed. The coding by the MPEG method is made taking each GOP as a unit, each GOP consisting of image signal for a predefined number of frames. The coded image signal has a layered structure as shown in FIG. 41. The sequence layer, which is the upper-most layer, is configured of GOPs (some of which have a SH, while other do not, as described above), and each GOP contains, at the start thereof, a GOP start code, not indicated.

The GOP file forming means 403 detects the GOP start code contained in each GOP, and thereby separates each GOP. It also detects the sequence start code in the SH for each GOP. It also forms a GOP file, which is a data file, from one GOP that has been separated. The GOP file is input to the data block configuring means 408, and to the GOP information detecting means 404. The GOP file forming means 403 forms a GOP start timing signal in accordance with the detected GOP start codes, and input it to the write control means 407.

The sequence identifying signal is supplied from the sequence identifying signal input means 414, for inputting the sequence identifying signal, to the write control means 407, and a sequence start sector address indicating the sector from which the data for each sector is to be recorded. In accordance with the sequence start sector address and the GOP start timing signal, a GOP start sector address indicating the sector from which each GOP file is to be recorded. Here, it is assumed that GOP file is recorded in sectors of addresses consecutive from the sequence start sector address. The situation where vacant sectors on the disk which permit recording will be described later. It is also assumed that the No. 1, No. 2, . . . , indicate the contents of the sequence identifying signals.

The GOP having been coded by the MPEG method at the coding means 402 has, at the start thereof, data (time code) indicating the time from the starting time instant of the sequence to which the GOP belongs. The GOP information detecting means 404 detects the information concerning the GOP, such as the time code, from the GOP in each input GOP file, and also detects the file size, the coding rate, and the like, from the input GOP file.

Figures 24, 25, 26:
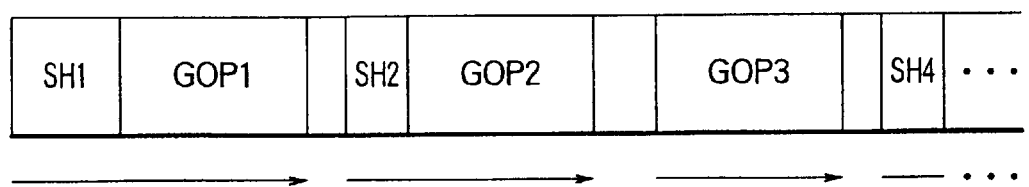
FIG. 24 is a diagram showing the configuration of the GOP information table data according to Embodiment C1.
FIG. 25 is a diagram showing the configuration of the GOP file sequence table data according to Embodiment C1.
FIG. 26 is a schematic diagram showing the state of access of the optical disk during playback according to Embodiment C1.

The GST data forming means 405 forms, for each sequence (title, program) shown in FIG. 25, GST table data storing the sector addresses for determining the order of playback of the GOP files of each GOP forming the sequence, from the sequence identifying signal input from the write control signal and the GOP start sector address formed for each GOP, and output it to the data block configuring means 408.

The GOP information table data forming means 406 generates, for each GOP file, a file name, and generates GOP information table data, shown for example in FIG. 24, for each file name, in accordance with the GOP start sector address for each GOP input from the write control means, the time code indicative of the time from the start of the sequence, detected by the GOP information table data forming means 406, the size of the GOP and the coding rate, and outputs it to them to the data block configuring means 408. The file name of each GOP is capable of identifying the sequence to which the GOP belongs.

The data block configuring means 408 performs processing, such as appending error correction codes to the input GOP file, and configures, for each GOP file, a data block (hereinafter referred to as a GOP file data block) of a predefined format. An end detecting identifying code is provided at the end of each GOP file data block.

Similarly, the data block configuring means 408 configures, from the input GST data and GOP information table data, data blocks (hereinafter referred to as GST data block and GOP information table data block, respectively).

The GOP file data block is subjected to a predefined modulation at the modulator 409, and sent to the laser drive circuit 410, from which a laser modulated in accordance with the modulated signal is output, and applied via the optical head 412 to the optical disk 413 for recording.

The recording is made such that each Each GOP file data block is recorded in the user region 434 in the sector map shown in FIG. 23, such that each GOP file is arranged from the start of the sector.

In the same way as the GOP file data block, the data of the GST data block and GOP information table data block are also modulated by the modulator 409, and recorded on the optical disk 413 by means of the optical head 412. They are recorded in the sectors in the GST region 432 and GOP information region 433 in the sector map shown in FIG. 23.

The write control means 407 manages the sector addresses in which the GOP files, GST data and GOP information table data are recorded. That is, the sector address (hereinafter referred to as GOP recording sector address) for recording each GOP file is generated by sequential increment, starting with the GOP start sector address generated as described above. Each time the GOP file data is over, sequential increment starting with the next GOP start sector address is conducted, to generate the GOP recording sector address. The GOP recording sector addresses thus generated are input to the optical head control means 411.

The optical head control means 411 performs control such that access on the optical disk 412 is conducted to the sector on the optical disk according to the GOP recording sector address, while tracking is maintained.

In this way, each GOP file data block is recorded, such that each GOP file is arranged from the starting part of the GOP start sector addresses.

Similarly, the write control means 407 generates recording sector addresses for recording the GST data and GOP information table data in accordance with the sector address corresponding to the sector at the start of the GST region and the sector address corresponding to the start of the GOP information region 433. The GOP recording sector addresses thus generated are input to the optical head control means 411, which performs control such that access is made to the sector on the optical disk corresponding to the recording sector address.

In this way, GST data blocks and the GOP information table data blocks are recorded in the sectors in the GST region 432 and GOP information region 433.

As was described above, one GOP (with or without a sequence header) is treated as one GOP file, and each GOP file is recorded starting from the the start of the sector of the sector indicated by the GOP start sector address in the user region 434, as shown in FIG. 23. For instance, SH1 and GOP1 are recorded as one GOP file 1 from the start of the sector of the sector address n. Even if the data of the GOP file 1 ends in the middle of a sector (the sector of the sector address (n+5), in the illustrated example), SH2 and GOP2, which follow, are recorded as one GOP file 2 from the start of the sector of the next sector address (n+6). Similarly, the GOP3 is recorded as one GOP file from the start of the sector of the sector address (n+10), and SH4 and GOP4 are recorded as one GOP file from the start of the sector of the sector address (n+18). Subsequent GOP files are similarly recorded in sequence.

The GOP start sector addresses of the GOP 1 file, GOP2 file, GOP3 file and GOP4 file are n, (n+5), (n+10) and (n+18), respectively.

GOP file sequence table (GST) data for storing the data determining the order of playback of the GOP files of the respective GOPs forming each sequence, for each sequence (title, program), is recorded in the GOP file sequence table (GST) recording region 32 shown in FIG. 23, as described above. FIG. 25 shows the configuration of the GST data recorded in the GST recording region 432. With regard to the GST data in the drawing, the GOP files forming the sequence with a sequence name No. 1, for example (title names and program names), are successively recorded, with the GOP start sector addresses being the sectors of the address 1, address 2, address 3, address 4, . . .

For playing back the sequence with the sequence title No. 1 (title), the GOP files forming the sequence should be successively read, from the sectors, taking address 1, address 2, address 3, address 4, . . . as the GOP start sector addresses, and reproduced.

The GOP information table data storing, for each GOP file, the file name indicating the GOP, the time from the start of the sequence of the GOP, the start sector address, file size, the coding rate, and other attribute data is recorded in the GOP information region 433 shown in FIG. 23. FIG. 24 shows the table data recorded in the GOP information region 433. For instance, for the GOP file for the GOP 1, i.e., the file with the file name "GOP1", the time from the start of the sequence is "00:12:00", the sector address at which the GOP is started (GOP start sector address) is "500000" and the file size is "300000" and the coding rate is "4.5". Similarly, for GOP2, GOP3, GOP3 and the like, the file name indicating the GOP, the time from the start of the sequence of the GOP, the start sector address, the file size, the coding rate and other attribute data are recorded in the GOP information region 433.

The operations for the normal playback will next be described. To read GST data, the read control means 421 generates the read sector address, and controls the optical head 412 via the optical head control means 411 such that the optical head 412 accesses the GST recording region 432 on the optical disk 413 shown in FIG. 23. The GST data block read from the GST recording region 432 is amplified by the playback amplifier 416, and sent to the error correction means 418, where processings such as error detection by means of the error detection codes appended to the GST data block is performed, and the resultant data is sent to the GST data detection means 419.

Similarly, the GOP information table data recorded in the GOP information region 433 on the optical disk 412 is read, and sent to the GOP information table data detecting means 420.

The GST data and the GOP information table data having been read are stored in the GST data detecting means 419 and the GOP information table data detecting means 420.

The above operations are performed immediately after the optical disk 413 is set in the device, or immediately after the recording and playback operations are started.

The sequence identifying signal for identifying the sequence is supplied from the sequence identifying signal input means 14 to the GST data detecting means 420, which refers to the stored GST data to identify the start sector address of each GOP file indicating the order of playback of the GOP files corresponding to the sequence identifying signal.

For instance, where the GST data shown in FIG. 25 is read and stored, and the content of the sequence identifying signal is "No. 1", it is found that the GOP files forming the sequence are successively recorded in the sectors, taking the address 1, address 2, address 3, address 4, . . . as start sector addresses, and the start sector addresses of the GOP files having been identified are output to the read control means 421.

The read control means 421 generates GOP read sector addresses through sequential increment from address 1 which is the start sector address of the GOP file played back first, from among the input start sector addresses.

When the end is detected by the end detection signal, of the data block of the GOP file input from the error correction means 418, GOP playback sector addresses are next generated through sequential increment from the start sector address of the GOP file played back next.

The GOP read sector addresses thus generated are successively sent to the optical head control means 411, to cause the optical head to access the sector of the GOP read sector address.

If the GOP files are successively recorded in consecutive sectors in the order of playback, GOP files can be successively read, during playback, by identifying the sequence start sector address without referring the GST data, and making a jump to the start of the next sector, as shown in FIG. 26 when one GOP file is over.

The GOP file data blocks successively read by the optical head 412 from the sectors in the user's region 434 are amplified by the playback amplifier 416, and demodulated by the demodulator 417, and input to the error correction means 418. The error correction means 418 performs error correction and the like, and the resultant data is input as the GOP file data to the GOP continuation means 422. The error correction means 418 also detects the end identifying signal for detecting the end of the GOP file data block and supplies it to the read control means 421.

The GOP continuation means 422 receives the GOP files in the separated state, and restores the GOP data in the bit stream (serial transmit signal) state, in the continuous form and having a predefined structure coded by the MPEG method shown in FIG. 8, and supplies it to the decoding means 423. The continuous GOP data is expanded and decoded by the decoding means 423 to become a digital image signal, and is converted by the D/A converter 424 into an analog signal, and is output as an output image signal.

Playback of a GOP positioned in the middle of a sequence (title, program) will next be described. In the same way as normal playback described above, it is assumed that the start sector address of each GOP file indicating the order of playback of the GOP files corresponding to the sequence to be played back is identified and the GOP file corresponding to the GOP positioned in the middle of the sequence is the GOP file 2 in FIG. 23.

The read control means 421 sends the start sector address of the GOP file 2 which is the GOP file corresponding to the GOP positioned in the middle of the sequence to the optical head control means 411, and causes the optical head 412 to access the sector of the start sector address (n+6). In the same way as the normal playback, the sectors are successively accessed from the sector of the start sector address (n+6), and GOP file data blocks read from the sectors are supplied via the playback amplifier 416, the demodulator 417, the error correction means 418 to the GOP continuation means 422, as the GOP file data.

The GOP continuation means 422 receives the GOP file 2 having been recorded in the sector addresses (n+6) to (n+9) in the separated state, and restores GOP data in the form of a continuous bit stream (serial transmit signal), and having a predefined structure coded by the MPEG method shown in FIG. 8, and supplies it to the decoding means 423. Since the GOP file 2 is recorded from the start of the sector of the sector address (n+6) accessed first, it is ensured that data of the immediately preceding GOP1 will not be read first. For this reason, the GOP data can be restored from the data read first, decoded by the decoding means 423, converted at the D/A converter 424 into an analog signal, and output as the output image signal.

In this way, when a GOP positioned in the middle of a sequence (title, program) is played back, the sector accessed first does not contain any part of the preceding GOP, and it is thus ensured that part of the preceding GOP is not read from the sector accessed first, and the GOP can be read from the start of the accessed sector, so that the time required for playing back the image signal and displaying the picture can be shortened.

Figure 27:
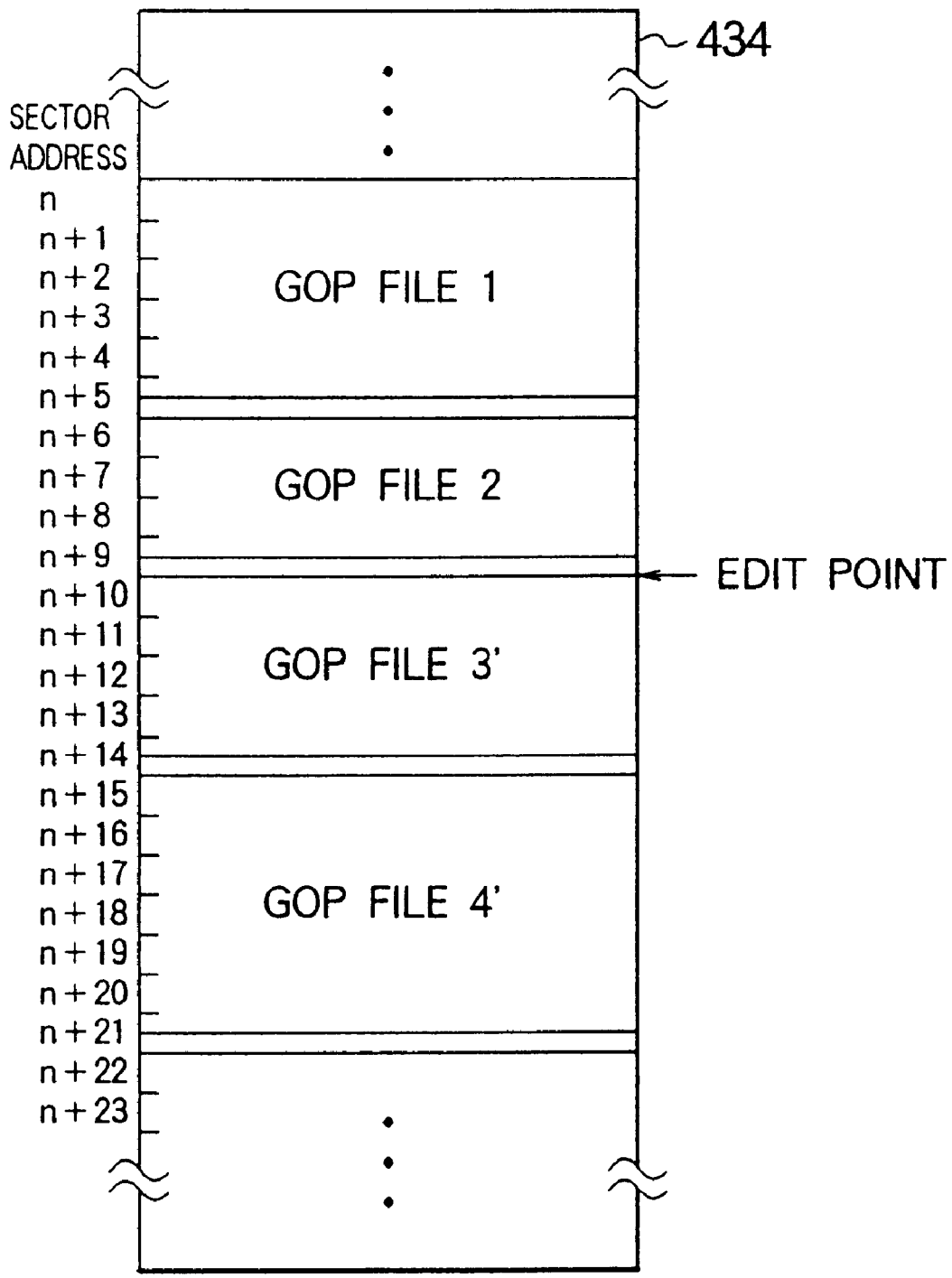
FIG. 27 is a schematic diagram showing the state of recording of the GOP files for which editing in GOP units according Embodiment C1.

Editing, such as overwriting and tag recording, taking each GOP as a unit, will next be described. As was described, the recording state before the editing is such that each GOP is recorded from the start of the sector, as shown in FIG. 23. Description will be made of the situation where GOP files of GOP3 and subsequent GOP files are overwritten by new GOP files. In such a case, new GOP files, such as GOP3', GOP4', . . . are successively recorded from the start of the sector of the sector address (n+10) from which GOP3 is recorded, as shown in FIG. 27.

In the disk having been overwritten, the GOP2 having been recorded is not affected by the overwriting, since it is maintained in the state before the editing, so that during reproduction through the edit point, failure of playback of GOP2 which is the GOP before the editing, or occurrence of unnatural images can be avoided.

Recording on a media of a write-once type, in vacant sectors which permit recording and which are distributed over the disk, and playback therefrom will next be described. In the same way as the normal playback, vacant sectors are identified by the GOP information table data detecting means 420, from the start sector address and file size of the respective GOP files in the GOP information table data read from the GOP information region 433 on the disk, and the sector addresses of the vacant sectors are supplied to the write control means 407.

The write control means 407 finds the vacant sector region where the GOP files of the sequence to be tag-recorded, from the file size extracted by the GOP information detecting means 404, and controls the access of the optical head 412 in the same way as in recording, such that the GOP files of the sequence to be tag-recorded are recorded in the consecutive vacant sector region, consecutively from the start of the sector.

In accordance with the sequence to be additionally recorded as shown in FIG. 25, the GST data generating means 405 additionally generates GSTs indicating the start sector addresses of the GOP files forming the respective sequences. The GOP information table data forming means 406 generates table data consisting of GOP file names to be recorded and information concerning them. The table data is recorded in the GST region 432 and GOP information region 433 on the optical disk 413.

When the sequence recorded in sectors distributed over the disk are to be reproduced, for instance in a situation where the GOP file of the sequence No. 2 is recorded in sectors being distributed over the user's region 434, during reproduction, by reading and referring to the GST, from the start sector addresses indicating the order of playback of the sequence No. 2, it is possible to identify the order of playback of the distributed GOP files.

In the same way as the normal playback described above, the read control means 421 generates GOP read sector addresses by sequential increment from address A which is the start sector address of the GOP file reproduced first, from among the input start sector addresses.

When the end of the data block of the GOP file is detected, the GOP is detected, the GOP playback sector addresses are generated through sequential increment from the start sector address B of the GOP file to be reproduced next.

The GOP read sector addresses thus generated are successively sent to the optical head control means 11, and the optical head 412 is made to access the sector of the GOP read sector address, and the read data is decoded to produce an image signal, which is then output.

Recording, taking each GOP file as a unit, can thus be made in the vacant sectors distributed over the disk, and the vacant sectors can thus be utilized effectively.

Playback of a GOP positioned at a desired time instant from the start of a certain sequence (title, program) will next be described. First, sequence identifying signal for identifying the sequence and the time position identifying signal indicating the desired time instant to be reproduced are supplied from the sequence identifying signal input means 414 and the time position identifying signal input means 415 to the GOP information table data detecting means 420.

In the same way as was described above, the GST data and GOP information table data are read from the GST region 432 and the GOP region 433, and sent to and stored in the GST data detecting means 427 and the GOP information table data detecting means 420. As shown in FIG. 24, the GOP information table data stores the time from the sequence start corresponding to the file name of each GOP, the start sector address, size, coding rate, and the like of the GOP file. The file name is recorded for identification of the sequence to which the GOP belongs.

When, for instance, the contents of the sequence identifying signal is No. 1, and and the GOP at a time instant 00 min. 13 sec. 00 from the start of the sequence is to be reproduced, the GOP information table data detecting means 420 refers to the GOP information table data stored in advance, and identifies the GOP file group which belong to the sequence indicated by the content No. 1 of the sequence identifying signal from the GOP file name. By referring to the time from the sequence start corresponding to the GOP file group of the GOP information table data, the GOP file whose file name is "GOP 3" is identified as the GOP file of which the time from the start of the sequence is 00 min. 13 sec. 00, and the start sector address is found to be "500580". In this way, the GOP file at a desired time instant from the start of the sequence is identified, and the start sector address of the GOP file is identified (retrieve). The start sector address having thus been identified (retrieved) is output to the GST data detecting means 419.

The GST data detecting means 419 refers to the GST data stored in advance, and successively outputs the start sector address from the start sector address of the GOP file specified by the GOP information table data detecting means 20, to the read control means 421.

The GOP read sector addresses are thereafter generated, in the same way as the normal playback described above, through sequential increment from the GOP start sector address supplied from the GOP file data detecting means 420, until one GOP is over.

When the end of the data block of the GOP file is detected, the GOP playback sector addresses are then generated through sequential increment of the start sector address of the GOP file to be reproduced next. In this way, the subsequent GOP read sector addresses are generated.

The generated sector addresses are input to the optical head control means 411, and the optical head 412 is made to access the sector of the input sector address, and the data is read. The data having been read is passed through the playback amplifier 416, the decoder 417, the error correction means 418 and the GOP continuation means 422, and decoded at the decoding means 423, and output via the D/A converter 424, as the output image signal.

As was described above, the GOP data is recorded from the start of the sector, so that it is not necessary to search for the GOP identified within the sector, and it is sufficient if the reproduction is made successively from the GOP recorded at the start of the sector of the GOP file start sector address.

As has been described, when it is desired to reproduced from a GOP at a desired time from the start of a certain sequence (title, program), it is possible to readily and promptly identify the sector in which the desired GOP is recorded. It is not necessary to search for the GOP having been identified in the sector, and is possible to shorten the time until the desired image signal is reproduced.

In the above description, the MPEG method is used as the method for compression coding of the image signal. The inventive concepts described in connection with the above embodiments is applicable to any other compression coding method in which a predefined number of images are taken as a unit of coding.

The file name of the GOP file of the GOP information table data has been described as one capable of identifying the sequence to which the corresponding GOP belongs. But the arrangement may be such that, for each file name, data permitting identification of the sequence to which the corresponding GOP belongs is disposed in the GOP information table.

In the above description, the GOP information table data includes the time from the start of the sequence as information indicating the position of the GOP in the sequence (title, program). However, other information, such as information indicating the number of the GOP as counted from the start of the sequence may be used. In such a case, the arrangement may be such that a signal indicating the number of the GOP as counted from the start of the sequence is input, and the GOP is search for, and reproduced.

Embodiment D1

Figure 28:
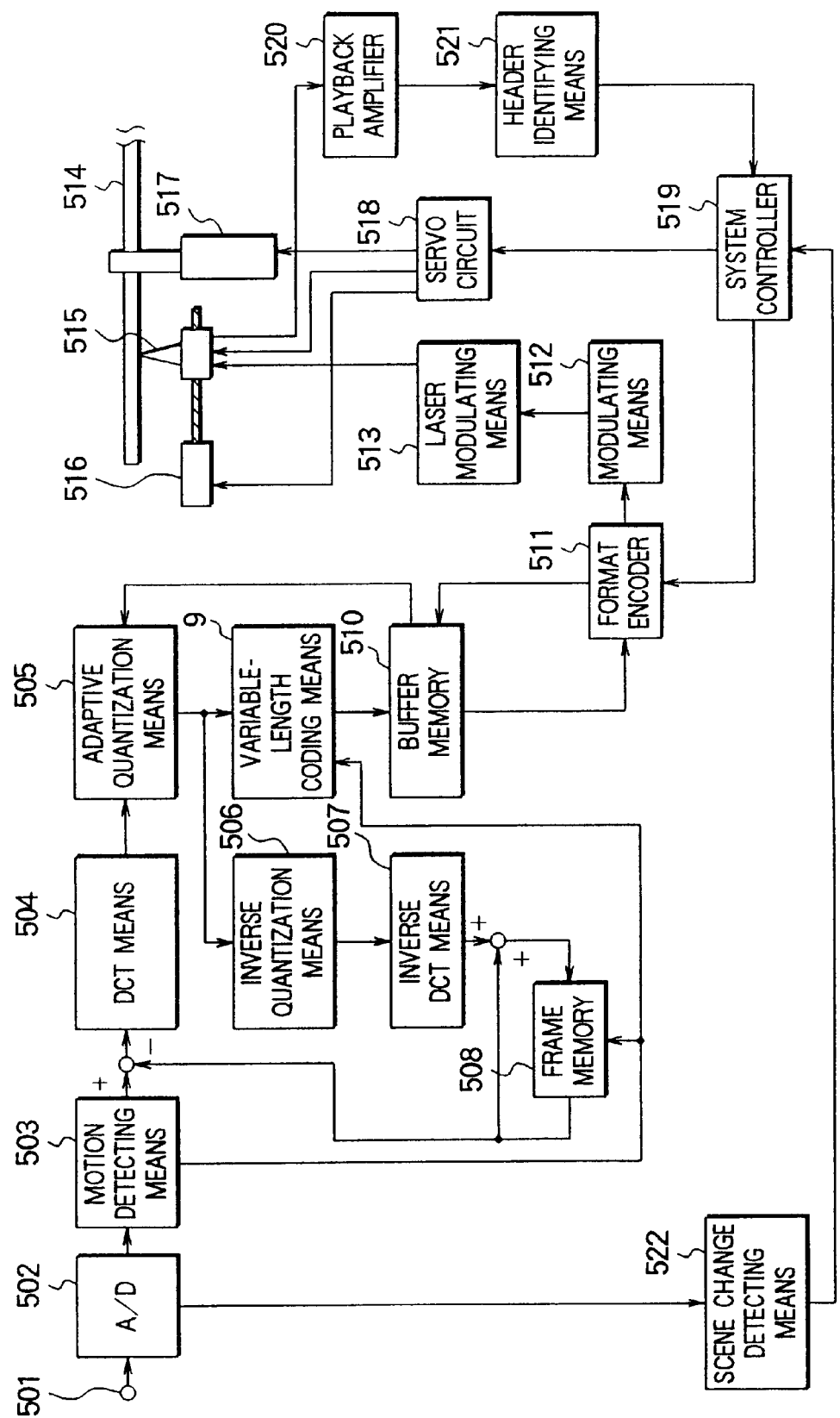
FIG. 28 is a block diagram showing the configuration of a recording system of an optical disk recording/playback device according to Embodiment D1.

FIG. 28 schematically shows the configuration of a recording system in an optical disk recording/playback device of Embodiment D1.

As illustrated, the optical disk recording/playback device of Embodiment D1 comprises an input terminal 501 through which an analog video signal is received, an A/D conversion means 502 for sampling an input analog video signal at a certain frame rate and converting it into a digital signal, a motion detecting means 503 for detecting a motion vector between frames, a DCT means 504 for performing discrete cosine transform (DCT) which is a method of bandwidth compression in which a digital video signal is transformed into vertical and horizontal spatial frequencies for data compression, an adaptive quantization means 505 for quantizing the transformed digital video signal, an inverse quantization means 506, an inverse DCT (IDCT) means 507 for restoring an original digital video signal from the spatial frequency components, a frame memory 508 for storing a reference image according to a motion vector sent from the motion detecting means 503, a variable-length coding means 509 for coding the quantized, digital video signal, a buffer memory 510, and a format encoder 511 for formatting a data structure of the coded a digital video signal. The above components from the A/D conversion means 502 to format encoder 511 serve to perform image information compression.

A modulating means 512 is for modulating the formatted digital video signal for the purpose of preventing inter-code interference on an optical disk. A laser modulating means 513 is for modulating a recording laser beam according to information sent from the modulating means 512. An optical disk 514 is for recording information by magneto-optical recording, phase change recording, or the like. An optical head 515 is for recording information on the optical disk 514 according to the recording laser beam that has been modulated by the laser modulating means 513. A feed motor 516 is for causing the optical head 515 to move in a radial direction of the optical disk 514. A disk motor 517 is for rotating the optical disk 514 at a given frequency. A servo circuit 518 is for performing focus/tracking control of the optical head 515, control over the feed motor 516, and control over the disk motor 517. A system controller 519 is for producing control signals destined for the servo circuit 518, format encoder 511 and the like, and for controlling the whole device. A playback amplifier 520 is for reproducing header information of the image data recorded on the optical disk 514. A header identifying means 521 is for identifying a recording position on the optical disk on the basis of reproduced header information. Reference numeral 522 denotes a scene change detecting means.

Figure 29:
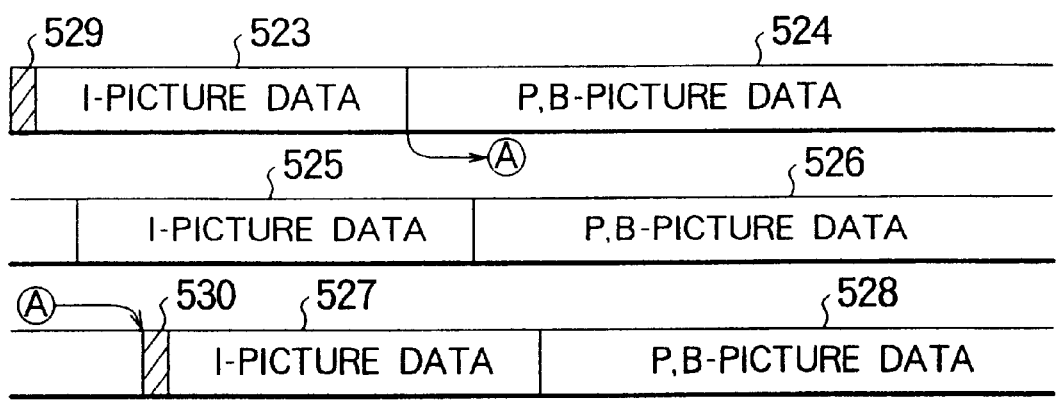
FIG. 29 shows data structures on data tracks which are recorded by an optical disk recording/playback device in accordance with Embodiment D1.

FIG. 29 shows recording tracks shown to extend linearly, on which image information blocks are recorded by the device of Embodiment D1. In the drawing, reference numeral 523 denotes I-picture data of a GOP 1 that is an image information block at a certain time instant. 524 denotes P- and B-picture data of the GOP 1. 525 denotes I-picture data of a GOP 2 that is an image information block temporally contiguous to the GOP 1. 526 denotes P- and B-picture data of the GOP 2. 527 denotes I-picture data of a GOP 3 that is an image information block temporally contiguous to the GOP 2. 528 denotes P- and B-picture data of the GOP 3.

Reference numeral 529 denotes an address area defined in a header appended to the start of the I-picture data 523 of the GOP 1. Stored in the address area 529 are the start position (hereinafter referred to as address information) of I-picture data of, for example, a GOP −1 that is an image information block temporally preceding the GOP 1 and having a scene change detected, and the address information of the I-picture data 527 of the GOP 3 that is an image information block temporally succeeding the GOP 1 and having a scene change detected. 530 denotes an address area defined in a header appended to the start of the I-picture data 527 of the GOP 3. Stored in the address area 530 are the address information of the I-picture data 523 of the GOP 1 that is an image information block temporally preceding the GOP 3 and having a scene change detected, and the address information of the I-picture data of, for example, a GOP 7 that is an image information block temporally succeeding the GOP 3 and having a scene change detected.

Figure 30:
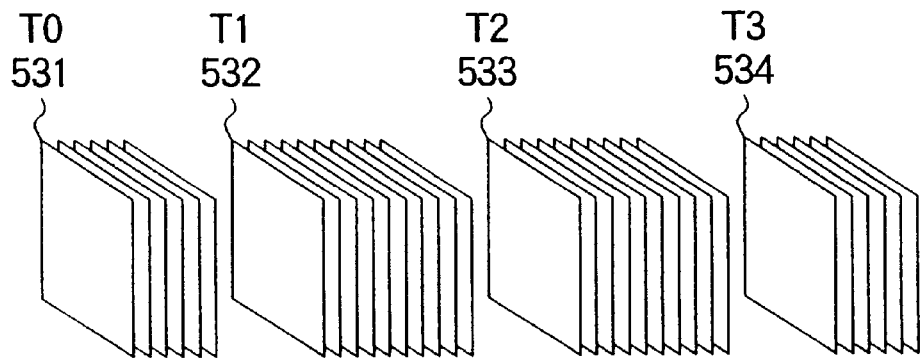
FIG. 30 is a schematic diagram showing a frame structure attained when original images are sampled at a certain frame rate.

FIG. 30 is a schematic representation of the image information obtained by sampling input original image information sampled by means of the A/D conversion means 502 at a certain frame rate. In the drawing, reference numerals 531 to 534 denote frames (screens) at time instants T0 to T3.

Figure 31:
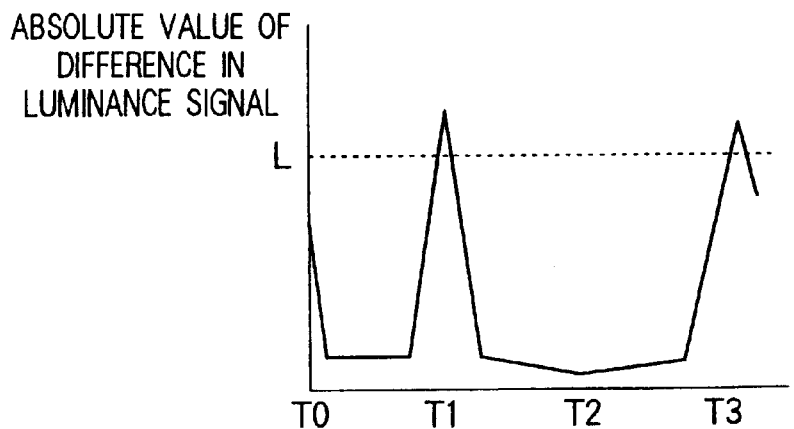
FIG. 31 shows the relationship between the distribution of absolute values of differences in luminance signal level between adjoining frames and the threshold which is used for scene change detection.

FIG. 31 shows the distribution of absolute values of differences in luminance signal level between adjoining frames obtained by sampling the original images at the time instants T0 to T3 in FIG. 30. In the drawing, L denotes a threshold used for scene change detection. When an absolute value of a difference in luminance signal level between adjoining frames exceeds the L level, occurrence of a scene change is recognized.

The operations of this embodiment will be described below. Referring to FIG. 28, an input video signal is sampled at a certain frame rate by the A/D conversion means 502. The amount of motion of the image is detected in the form of a motion vector for each frame by the motion detecting means 503, and is transformed into vertical and horizontal spatial frequencies by the DCT means 504, and subjected to adaptive quantization by the adaptive quantization means 505.

Also in the present embodiment, information is recorded, in the units of one image information block (equivalent to a GOP) composed of several frames to several tens of frames. As described in conjunction with the prior art, each image information block contains a two-dimensionally compressed image (I picture) that can be compressed by itself, and three-dimensionally compressed images (P and B pictures) each of which is compressed using a reference image, with the motion relative to a temporally preceding or succeeding image being represented by a motion vector.

As shown in FIG. 28, a reference image necessary for producing a three-dimensionally compressed image is formed by restoring image data from the adaptive quantization means 505, by means of the inverse quantization means 506 and IDCT means 507, and then modifying the restored image data according to a motion vector provided by the motion detecting means 503 in the frame memory 508.

Next, the compressed digital image data that has been subjected to adaptive quantization is variable-length coded according to the magnitude of the motion vector by means of the variable-length coding means 509, and then temporarily stored in the buffer memory 510.

The data structure of GOPs of the compressed digital image data thus stored in the buffer memory 510 are reformatted by the format encoder 511 in response to an instructions from the system controller 519. Thereafter, a header and other information are appended to the image data. Resultant data is then supplied from the format encoder 511.

The thus formatted digital image information is modulated by the modulating means 512 in such a way that inter-code interference will not occur on the optical disk 514. The resultant information is recorded on the optical disk 514 by the optical head 515 via the laser modulating means 513.

In this embodiment, a total sum, for each frame, of absolute values of differences in the original image luminance signal level and color-difference signal level of each pixel between frames of the image sampled by the A/D conversion means 502 is used for scene change detection.

Assuming that the distribution of absolute values of differences in the luminance signal level between adjoining frames at the time instants T0 to T3 in FIG. 30 is plotted as, for example, shown in FIG. 31, a scene change is found to have occurred at each of the time instants T1 and T3.

When information representing the frame at the time instant T1 or T3 at which the scene change is detected is compressed to form an I picture of a GOP, the address information of the I picture is recorded at a position preceding or succeeding the GOP and at the start (address area 529, 530 in FIG. 29) of the I picture of the GOP at which the scene change has been found. When information representing the frame at the time instant T1 or T3 at which the scene change is detected is compressed to form a P or B picture of a GOP, the address information of the I picture of the next GOP is recorded at a position preceding or succeeding the GOP and at the start (address area 529, 530 in FIG. 29) of the I picture of the GOP at which the scene change has been found. This is because even if the address information were recorded in the P or B picture, preceding or succeeding I or P picture is required for reproducing the P or B picture, and the playback requires time.

During playback, I-picture data is consecutively reproduced on the basis of the information recorded in the address areas. This enables fast forward playback or retrieval, or fast reverse playback or retrieval in which only the pictures preceding and succeeding the scene changes are extracted. Consequently, fast playback or retrieval can be realized efficiently in harmony with human visual characteristics.

An optical disk where MPEG-conformable compressed image information is recorded on an optical disk at an average rate of 4 megabits per second for 135 minutes has image information areas of about four gigabytes long on one disk surface. If a sector size is 1024 bytes, the address information for the image information areas can be represented by a length of three bytes. When address information indicating a position at which a scene change is detected is represented by four bytes, 256 positions of scene changes can be recorded per sector. Assuming that fast playback or retrieval is carried out at a 100-times speed, for the case of the image signal of 30 frames per second, such a fat playback or retrieval can be achieved with registration of 2430 scene changes. Fast playback or retrieval is achieved by sequential reproduction on the basis of address information indicating registered positions of scene changes.

Embodiment D2

Next, the Embodiment D2 will be described with reference to FIG. 32 and FIG. 33.

Figure 32:
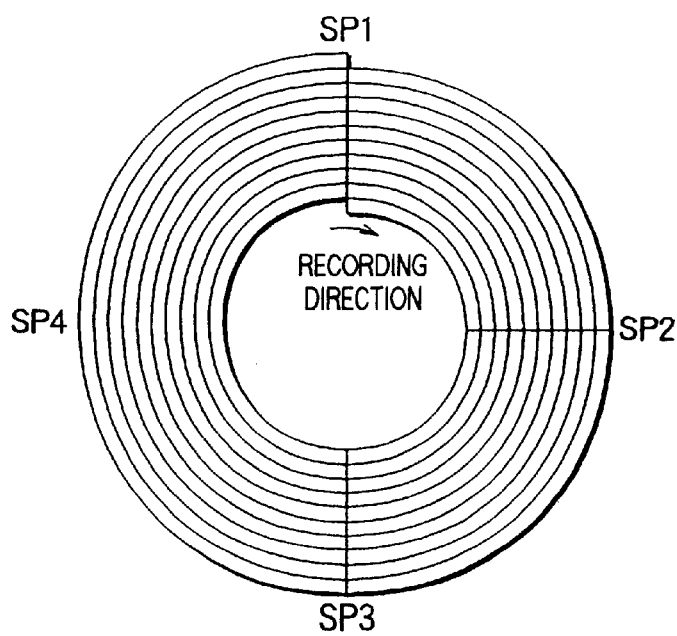
FIG. 32 shows the arrangement of data tracks on an optical disk.

FIG. 32 shows the arrangement on recording tracks on the optical disk 514. In the drawing, reference numerals SP1 to SP4 denote start positions of four areas (blocks) into which each recording track is divided equally.

Figure 33:
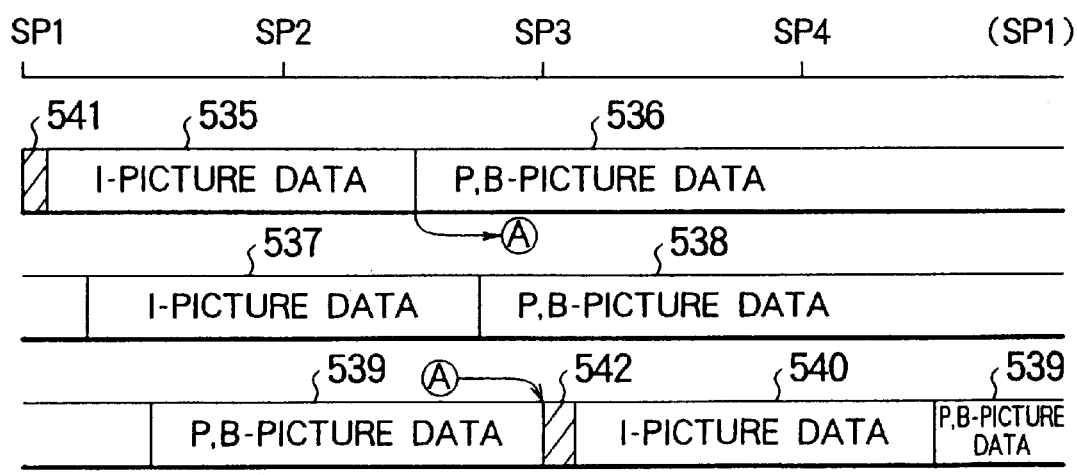
FIG. 33 shows arrangement of data on data tracks which is recorded by an optical disk recording/playback device in accordance with Embodiment D2.

FIG. 33 shows image information blocks illustrated to extend linearly, on the recording tracks shown in FIG. 32. Also in this embodiment, as in Embodiment D1, a scene change is supposed to occur at each of the time instants T1 and T3. In the drawing, reference numeral 535 denotes I-picture data of a GOP 1 that is an image information block at a certain time instant. 536 denotes P- and B-picture data of the GOP 1. 537 denotes I-picture data of a GOP 2 that is an image information block temporally contiguous to the GOP 1. 538 denotes P- and B-picture data of the GOP 2. 539 denotes a P- and B-picture data of a GOP 3 that is an image information block temporally contiguous to the GOP 2. 540 denotes I-picture data of the GOP 3.

Reference numeral 541 denotes an address area provided in a header area at the start of the I-picture data 535 of the GOP 1. Stored in the address area 541 are the start position (address information) of I-picture data of, for example, a GOP −1 that is an image information block temporally preceding the GOP 1 and having a scene change detected, and the address information of the I-picture data 540 of the GOP 3 that is an image information block temporally succeeding the GOP 1 and having a scene change detected. 542 denotes an address area provided in a header area at start of the I-picture data 540 of the GOP 3. Stored in the address area 542 are the start position (address information) of the I-picture data 535 of the GOP 1 that is an image information block temporally preceding the GOP 3 and having a scene change detected, and the start position of I-picture data of, for example, a GOP 7 that is an image information block temporally succeeding the GOP 3 and having a scene change detected.

In Embodiment D1, the position of an I picture within each GOP is fixed. For this reason, the start position of an I picture within each GOP has no correlation to the position on a recording track, along the circumferential direction, of the track of an optical disk, i.e., to the angular position. Every time a jump is made to another track, after I-picture data at a certain time instant is reproduced, in order to access the start position of I-picture data to be reproduced next, a random optical disk rotation wait time waiting arises. It is therefore difficult to achieve smooth reproduction of consecutive I-picture data.

In this embodiment, the position of an I picture within a GOP in which a scene change is detected can be varied. After data is allocated by the format encoder 511 in such a way that the start positions of I pictures of GOPs will coincide with any of the positions SP1 to SP4 in FIG. 32, the data is recorded on the optical disk 514. Consequently, in this embodiment, after the I picture 535 of the GOP 1 at the position SP1 is reproduced, a track jump is made, after waiting for a given rotating time, to the start position SP3 of the I picture 540 of the GOP 3 which is read from the address information 541 beforehand. The I-picture data 540 of the GOP 3 can then be reproduced. Thus, smooth, consecutive playback of I-pictures taking account of the rotation wait time required for track jumps can be achieved.

For the allocation of I pictures of GOPs in which scene changes have been detected, the picture data of COPs is placed in memory at the time of recording. Based on the length of the GOP, length of the I-picture data, and the rotation wait time associated with the track jump, the start position of the I picture is readily set to any appropriate one of the positions SP1 to SP4. In this embodiment, each GOP is assumed to be of a fixed rate. Alternatively, each GOP may be of a variable rate, and yet, in this alternative, the aforesaid procedure is applicable. Furthermore, in the above embodiment, the start positions of I pictures are set to any of four angular positions on an optical disk; positions SP1 to SP4. Alternatively, any other number of positions may be specified taking account of the length of the GOP containing data, the length of the I-picture data, and the rotation wait time associated with the track jump. This alternative has substantially the same advantage as the above embodiment.

Embodiment D3

Next, Embodiment D3 will be described with reference to FIG. 34 and FIG. 35.

Figure 34:
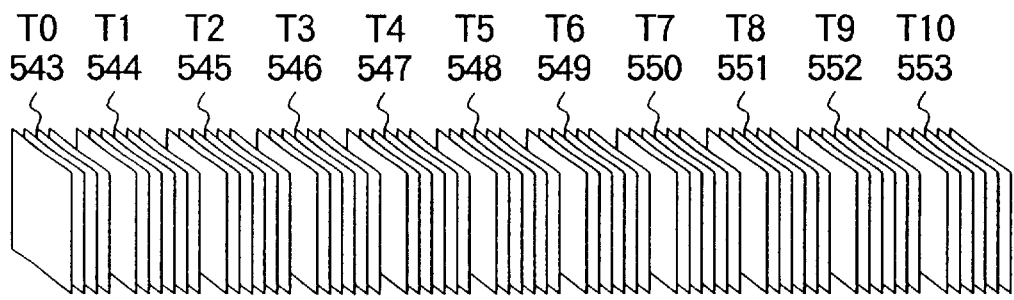
FIG. 34 is schematic diagram showing a frame structure attained when original images are sampled at a certain frame rate.

FIG. 34 schematically shows images obtained by sampling the input original image information at a certain frame rate by means of the A/D conversion means 502. In the drawing, reference numerals 543 to 553 denote frames (screens) at time instants T0 to T10.

Figure 35:
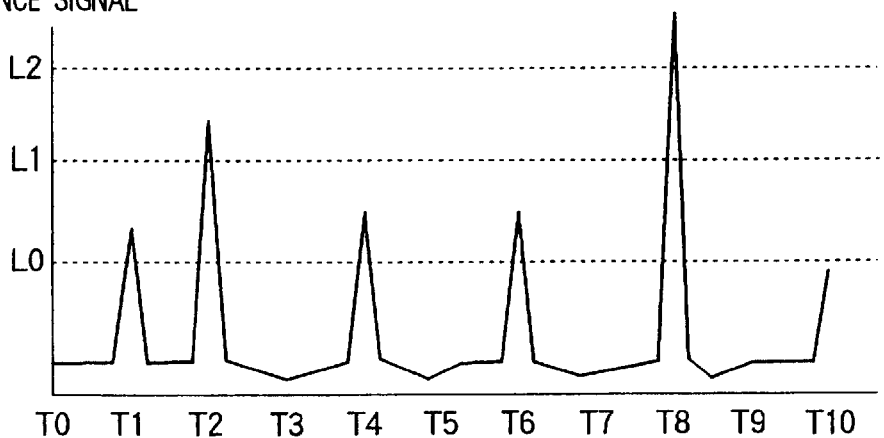
FIG. 35 shows the relationship between the distribution of absolute values of differences in luminance signal level between adjoining frames and the thresholds which are used for scene change detection.

FIG. 35 shows the distribution of absolute values of differences in luminance signal level between with respect to the adjoining frame, obtained by sampling at the time instants T0 to T10 in FIG. 34. In FIG. 35, L0 denotes a first threshold used for scene change detection. L1 denotes a second threshold used for scene change detection. L2 denotes a third threshold used for scene change detection. When an absolute value of a difference in luminance signal level exceeds the value L0, L1, or L2, occurrence of a scene change is recognized.

In this embodiment, as in Embodiment D1 described above, when I-, P-, and B-picture data having been image compressed from the original images is constructed, luminance and color-difference signals representing the original image for one frame are used to detect a scene change. Unlike Embodiment D1, this embodiment defines a plurality of thresholds for scene change detection. Scene change detection is carried out in using each of the thresholds. Assuming that the distribution of absolute values of differences in luminance signal level between adjoining frames at the time instants T0 to T10 is plotted as shown in FIG. 34, when the threshold L0 are used, scene changes are found to have occurred at the time instants T1, T2, T4, T6, and T8. When the threshold L1 are used, scene changes are found to have occurred at the time instants T2 and T8. When the threshold L2 is used, scene change are found to have occurred at the time instant T8.

In this embodiment, an address area is provided at the start of the I picture of the GOP for which a scene change has been detected, the address area being divided into sections for the respective thresholds.

By adopting the above configuration, fast playback or retrieval can be achieved at various multiple speeds using the different thresholds. By selecting the threshold, fast playback or retrieval can be achieved with every occurrence of a finer scene change or a rougher scene change. Furthermore, a higher speed can be selected freely for fast playback or retrieval.

Specifically, a higher threshold is used for a higher playback or retrieval speed, so that playback or retrieval is conducted using only the I pictures for which a rougher scene change has found to have occurred. By contrast, playback or retrieval at a lower speed is conducted using the I pictures for which a finer scene change (detected with the threshold L0) has found to have occurred.

Also in this embodiment, as in Embodiment D2, it may be so arranged that the start position of I-picture data of a GOP in which a scene change is detected may be set to any of the angular positions on each recording track on an optical disk; SP1 to SP4. In this case, this embodiment has the same advantage as Embodiment D2.

Figure 36:
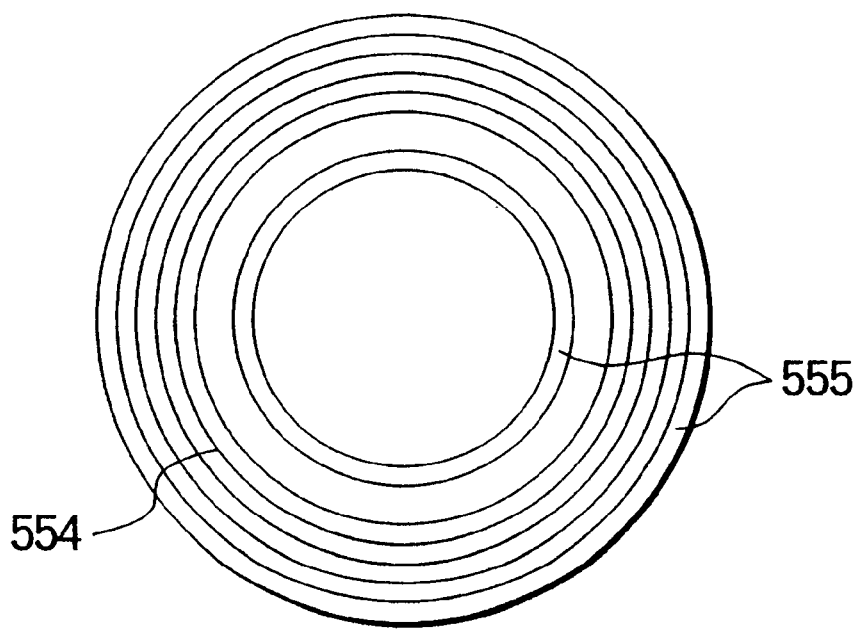
FIG. 36 shows the relationship between image information blocks on an optical disk and a scene change address area.

In Embodiments D1 to D3 described above, an address area for facilitating fast playback or retrieval is provided in a header part at the start of an I picture of a GOP for which a scene change is detected. Alternatively, as shown in FIG. 36, address information may be collectively recorded in a specific recording area defined on an optical disk 514. FIG. 36 shows an optical disk on which image information according to the present embodiment is recorded. In the drawing, reference numeral 554 denotes an image information area in which a succession of consecutive image information blocks each composed of I-, P-, and B-picture data are recorded. 555 denotes an address area defined along the innermost or outermost circumference of an optical disk and designed to store address information of I pictures of GOPs containing scene changes.

Figure 37:
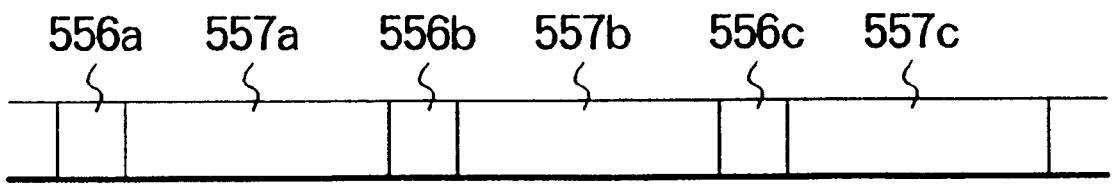
FIG. 37 shows a specific structure of the scene change address area.

The scene changes detected with a plurality of thresholds as in this embodiment, in the address area 555 can be recorded in a manner shown in FIG. 37. In the drawing, reference numerals 556a, 556b, and 556c denote values of thresholds of detection levels L0, L1, and L2 used for scene change detection. 557a, 557b, and 557c denote address information indicating the start positions on an optical disk of I pictures of GOPs for which scene changes have been detected with the respective thresholds.

Address information of the I pictures of GOPs for which scene changes have been detected are stored in advance in a memory for each of the thresholds. The information is then recorded in the address area 555. Assuming that AD0 to AD10 are I picture address information on the optical disk corresponding to the time-base information for the time instants T0 to T10, the data recorded in the address area 555 will be something like (L0, AD1), (L1, AD2), (L0, AD4), and (L2, AD8), or like (556a, 557a), (556a, 557b), and (556c, 557c) in FIG. 37.

For reproduction, the information in the address area 555 is read out beforehand. Only the I-picture data of GOPs containing scene changes associated with the threshold selected by a viewer is consecutively reproduced.

Embodiment D4

Embodiment D4 will next be described with reference to FIG. 38 and FIG. 39.

Figure 38:
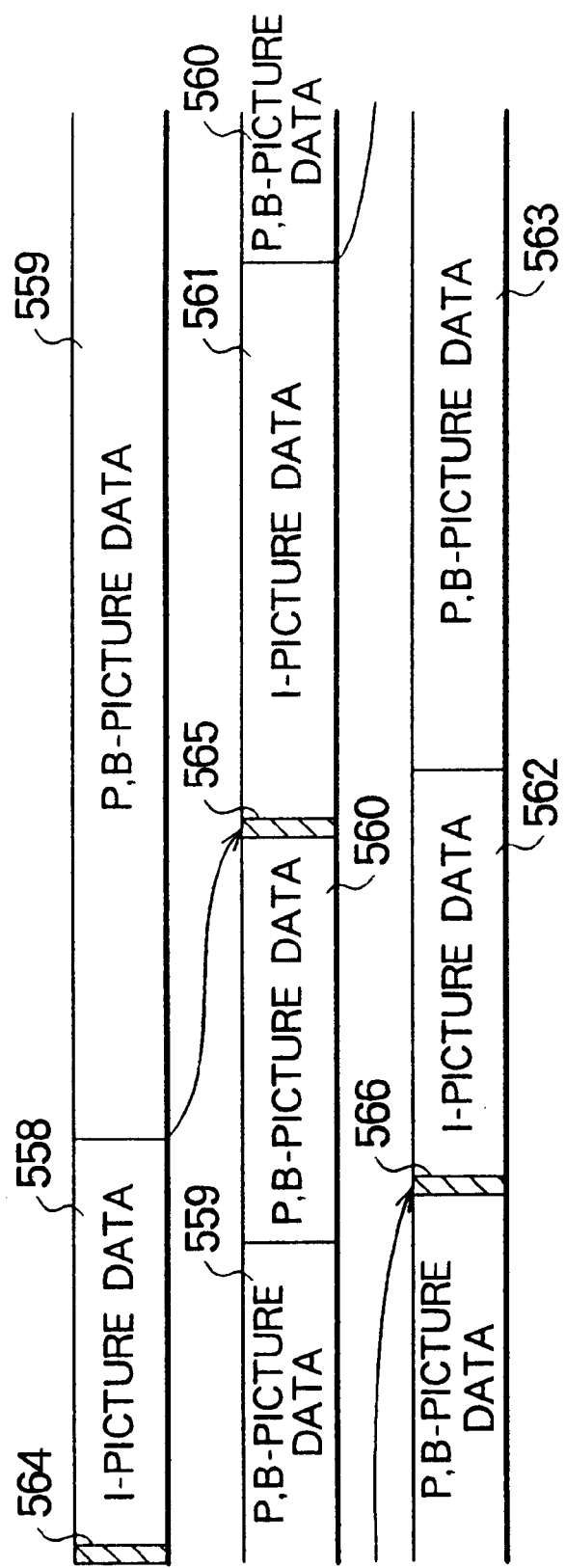
FIG. 38 shows arrangement of data on data tracks which is recorded by an optical disk recording/playback device in accordance with Embodiment D4.

FIG. 38 shows recording tracks, illustrated to extend linearly, on which image information blocks are recorded according to this embodiment. In the drawing, reference numeral 558 denotes I-picture data of a GOP 1 that is an image information block at a certain time instant. 559 denotes P- and B-picture data of the GOP 1. 560 denotes P- and B-picture data of a GOP 2 that is an image information block temporally contiguous to the GOP 1. 561 denotes I-picture data of the GOP 2. 562 denotes I-picture data of a GOP 3 that is an image information block temporally contiguous to the GOP 2. 563 denotes P- and B-picture data of the GOP 3.

Reference numeral 564 denotes an address area provided in a header part at the start of the I-picture data 558 of the GOP 1. Stored in the address area 564 are address information of I-picture data of a GOP 0 that is an image information block immediately preceding the GOP 1, and address information of the I-picture data 561 of the GOP 2 that is an image information block immediately succeeding the GOP 1. 565 denotes an address area defined in a header part at the start of the I-picture data 561 of the GOP 2. Stored in the address area 565 are address information of the I-picture data 558 of the GOP 1 that is an image information block immediately preceding the GOP 2, and address information of the I-picture data 562 of the GOP 3 that is an image information block immediately succeeding the GOP 2. 566 denotes an address area provided in a header part at the start of the I-picture data 562 of the GOP 3. Stored in the address area 566 are address information of the I-picture data 561 of the GOP 2 that is an image information block immediately preceding the GOP 3, and address information of the I-picture data of a GOP 4 that is an image information block immediately succeeding the GOP 3.

In this embodiment, each GOP is structured as shown in FIG. 38. Address information of the I pictures of GOPs for which scene changes have been detected is recorded in the address area 555 (See FIG. 36) on an optical disk, as described in conjunction with FIG. 36. This allows a viewer to freely select the mode of fast playback or retrieval using scene changes or the mode of playback or retrieval using adjoining GOPs. For unwanted parts, fast playback retrieval may be executed in scene change-dependent mode. For wanted parts, fast playback or retrieval may be executed in adjoining GOP-based mode in which adjoining GOPs are reproduced or retrieved consecutively. Thus, fast playback or retrieval can be achieved at a suitable speed.

Figure 39:
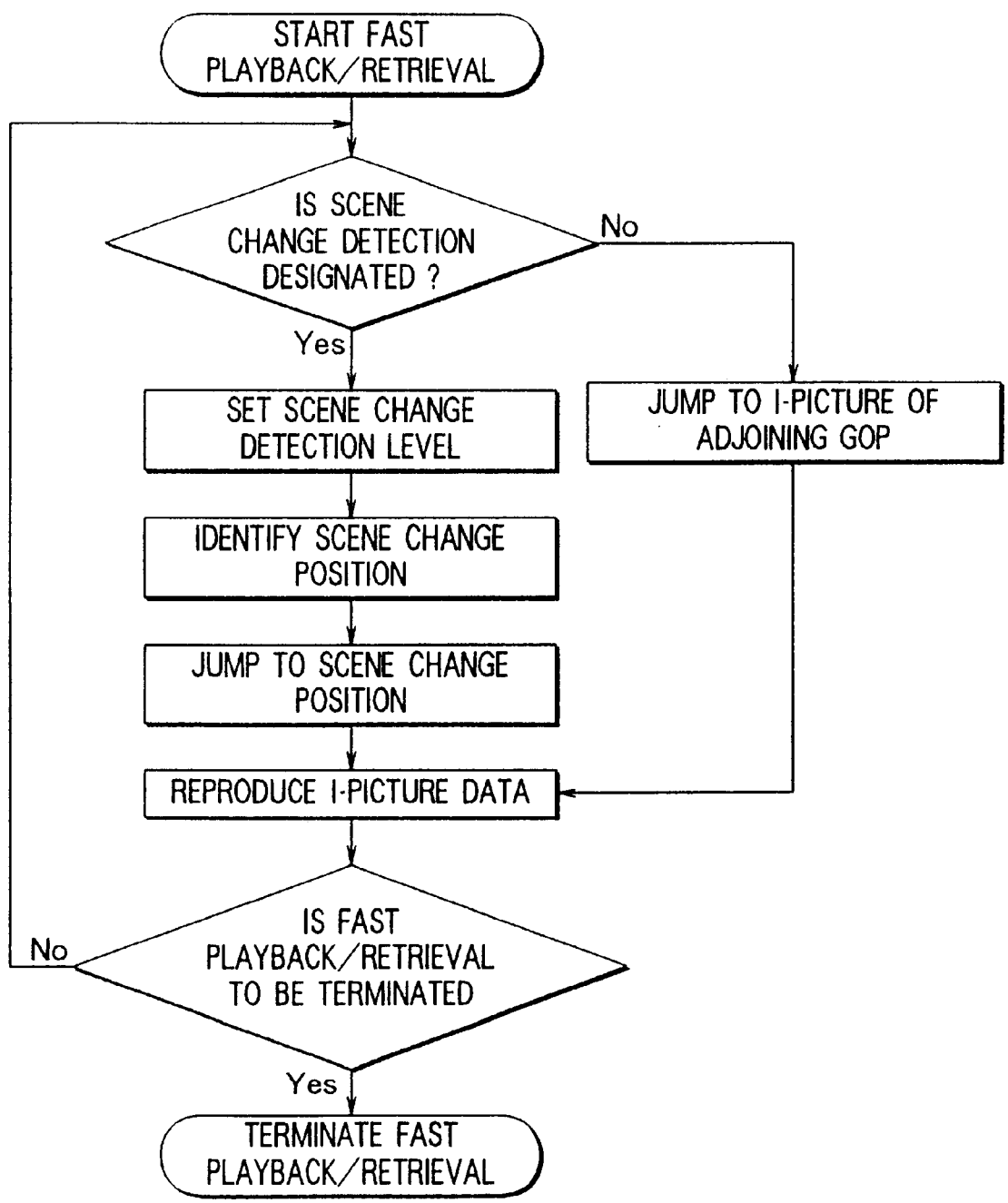
FIG. 39 is a flowchart showing specific operations of Embodiment D4.
Figure 40:
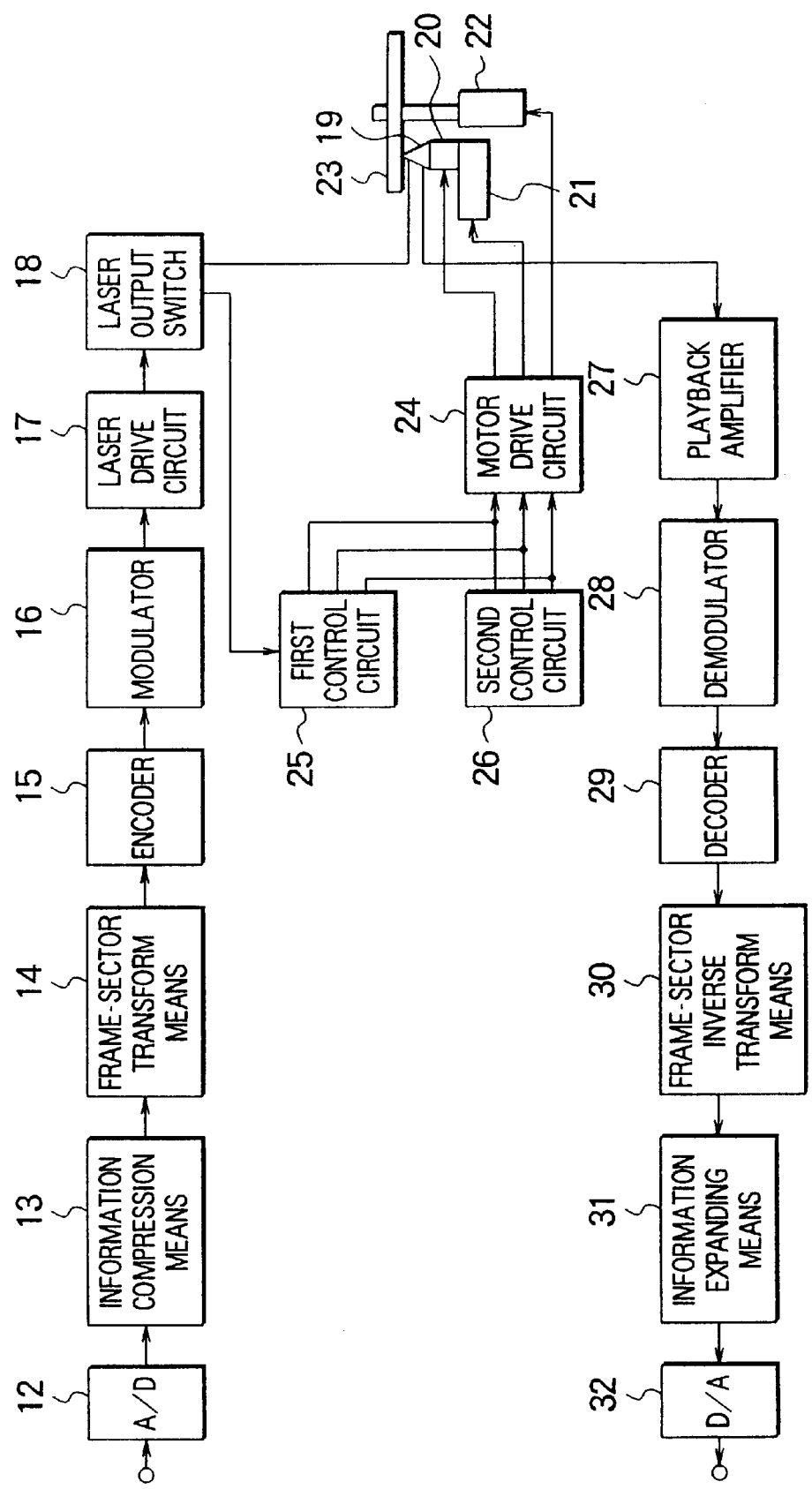
FIG. 40 is a block diagram showing the configuration of a conventional optical disk recording/playback device.

FIG. 39 is a flowchart illustrating the operations of an optical disk device for performing the aforesaid fast playback or retrieval. First, when fast playback or retrieval is started, a viewer selects a playback/retrieval mode from between the scene change-dependent mode and adjoining GOP-based mode. When the scene change-dependent playback/retrieval is selected, a playback/retrieval level is designated by selecting any of the thresholds L0 to L2 in FIG. 35. Based on the designated level, information representing the positions of desired scene changes is read from the address area 555. Fast playback/retrieval is executed according to the position information. By contrast, when the adjoining GOP-based mode in which I pictures of adjoining GOPs are consecutively reproduced or retrieved is selected, after I-picture data of a certain GOP is reproduced, a track jump is made in order to access the start position of I-picture data of an adjoining GOP indicated by the address information recorded at the start of the I-picture data having been reproduced. The I-picture data accessed is then reproduced. This operation is repeated until the viewer instructs termination of fast playback/retrieval.

According to the device for and method of optical disk recording/playback of Embodiments D1 to D4, fast playback or retrieval can be performed in harmony with human visual characteristics, especially, a characteristics that human eyes are sensitive to scene changes. A viewer can therefore retrieve his/her wanted images quickly.

In addition, according to the present embodiment, the start positions of two-dimensionally compressed images used for fast playback or retrieval are always aligned at predetermined angular positions on an optical disk, i.e., along radially extending straight lines. This makes it possible to perform reproduction taking account of the rotation wait time associated with the track jump of the optical pickup during fast playback or retrieval. Consequently, smooth, consecutive playback of two-dimensionally compressed images can be achieved with ease.

Furthermore, according to the present embodiment, a plurality of thresholds are used for detecting scene changes. This makes it possible to use a plurality of different speeds for fast playback or retrieval and to speed up the fast playback or retrieval. According to the aforesaid method, speedup is carried out in harmony with human visual characteristics. A viewer can therefore identify wanted images relatively easily from among images even at the increased playback or retrieval speed.

In the above embodiments, a viewer can select either fast playback/retrieval dependent on scene changes or fast playback/retrieval based on adjoining GOPs according to his/her need. For wanted parts, adjoining GOP-based fast playback/retrieval may be selected to perform retrieval at a relatively low speed with excellent precision. For unwanted parts, scene change-dependent fast playback/retrieval may be selected to perform retrieval at a very high speed, which is a speed harmonious with human visual characteristics, with minimum required precision.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video disk playback device for playing back from a video disk on which high-efficiency coded data of a digital video signal is recorded, said digital video signal being a succession of image signals of several frames comprising in combination one or more of an I-picture coded within the frame, a P picture inter-frame coded by forward motion compensation with reference to the I picture or another P picture, and B pictures inter-frame coded by both directional motion compensation with reference to the I and/or P pictures positioned in front and at the back, said device comprising:

an information table memory containing identification information identifying user specified video sequences including information indicating the beginning of sequence headers that define formatting parameters needed to reproduce selected video sequences to be played back to enable reproduction of a selected series of images, the user specified video sequences having user specifiable start and end points, wherein said images are selected through user selection of identification information identifying the desired video sequences to be reproduced; and a playback device responsive to the identification information and reproducing only the selected video sequences identified thereby, thereby enabling user editing of the video images output from said video disk.

2. A video disk playback device as set forth in claim 1, further comprising a selector selecting the image through restoration of its coded data recorded on the video disk.

3. A video disk playback device as set forth in claim 1, further comprising:

means for low-pass filtering the selected images having been decoded;
means for sub-sampling the filtered images; and
means for storing the sub-sampled images and displaying them as reduced screens of 1/N of a full screen.

4. The video disk playback device of claim 1, further comprising a header detecting circuit for detecting a start address of each image identified by said identification information.

5. The video disk playback device of claim 4, wherein said start address of said selected image is data decoded from coded data on the video disk.

6. The video disk playback device of claim 1 wherein said identification information is stored on said video disk.

7. The video disk playback device of claim 1, wherein said start address further comprises a start address of a sequence header, a start address of a GOP header, and a start address of said selected image.

8. The video disk playback device of claim 1, wherein said information table memory stores a identification information of a plurality of selected images.

9. The video disk playback device of claim 1 wherein said identification information is used to identify the location of a sequence header.

10. The video disk player of claim 9 wherein said identification information includes the size and location of the sequence header.

11. The video disk player of claim 1 wherein said identification information includes the file or sequence title.

12. The video disk player of claim 1 wherein a user of said playback device actuates a switch to develop the identification information and select the images to be played back.

13. A video disk playback device for playing back from a video disk on which a high-efficiency coded data of a digital video signal is recorded, said digital video signal being a succession of image signals of several frames comprising in combination one or more of an I-picture coded within the frame, a P picture inter-frame coded by forward motion compensation with reference to the I picture or another P picture, and B pictures inter-frame coded by both directional motion compensation with reference to the I and/or P pictures positioned in front and at the back, said device comprising:

a decoded image generator for outputting data reproduced from a optical disk;

an image selector generating a selection signal for user selecting any output image sequence of user specifiable length outputted from said decoded image generator; and an information table memory for storing identification information representative of the selected output image sequence identified by said image selector, said identification information including information indicating the beginning of sequence headers that define formatting parameters needed to reproduce a video sequence, wherein a selected image sequence is retrieved by accessing said stored identification information from said information table memory, said selected output image sequences having user specifiable start and end points.

14. A video disk playback device for playing back from a video disk on which a high-efficiency coded data of a digital video signal is recorded, said digital video signal being a succession of image signals of several frames comprising in combination one or more of an I-picture coded within the frame, a P picture inter-frame coded by forward motion compensation with reference to the I picture or another P picture, and B pictures inter-frame coded by both directional motion compensation with reference to the I and/or P pictures positioned in front and at the back, said device comprising:

an information table memory for storing identification information representative of plural selected output image sequences, the user specified video sequences having user specifiable start and end points, said identification information including information indicating the beginning of sequence headers that define formatting parameters needed to reproduce a video sequence, each said selected image sequence being selected through an input, said identification information being used to determine GOP headers and sequence headers, wherein said images include at least one I-picture, and may further include a P-picture or a B-picture.

15. A method for playing back from a video disk on which a high-efficiency coded data of a digital video signal is recorded, wherein the digital video signal is a succession of image signals of several frames comprising in combination an I-picture coded within the frame, a P picture inter-frame coded by forward motion compensation with reference to the I picture or another P picture, and B pictures inter-frame coded by both directional motion compensation with reference to the I and/or P pictures positioned in front and at the back, said method comprising the steps of:
 a) identifying user selected video sequences having user specifiable start and end points to be reproduced;
 b) generating identification information specifying each said user selected video sequence to be reproduced as identified in step a), said identification information including information indicating the beginning of sequence headers that define formatting parameters needed to reproduce a video sequence; and
 c) using said identification information to locate and reproduce the user selected video portions to be played back.

16. A video disk on which a digital video signal is recorded as high-efficiency coded video data, said digital video signal being a succession of image signals of several frames comprising in combination one or more of an I-picture coded within the frame, a P picture inter-frame coded by forward motion compensation with reference to the I picture or another P picture, and B pictures inter-frame coded by both directional motion compensation with reference to the I and/or P pictures positioned in front and at the back, comprising:
 plural information sectors storing said coded video data; and
 an information table memory for storing identification information representative of the selected output image sequences identified by a user to be reproduced, said identification information including information indicating the beginning of sequence headers that define formatting parameters needed to reproduce a video sequence, wherein each selected image sequence is retrieved by a player by accessing said stored identification information from said information table memory, the selected output image sequences having user specifiable start and end points.

17. A video disk on which a digital video signal is recorded as high-efficiency coded video data, said digital video signal being a succession of image signals of several frames comprising in combination one or more of an I-picture coded within the frame, a P picture inter-frame coded by forward motion compensation with reference to the I picture or another P picture, and B pictures inter-frame coded by both directional motion compensation with reference to the I and/or P pictures positioned in front and at the back, said disk comprising:

plural information sectors storing said coded video data; and
an information table memory storing identification information representative of plural selected output image sequences, the selected output image sequences having user specifiable start and end points, said identification information including information identifying the start of sequence headers that define formatting parameters needed to reproduce a video sequence, each said selected image sequence being selected through an input, said identification information being used to determine GOP headers and sequence headers, wherein said images include at least one I-picture, and may further include a P-picture or a B-picture.

18. The video disk of claim 17 wherein said identification information is used to identify the location of a sequence header.

19. The video disk of claim 18 wherein said identification information includes the size and location of the sequence header.

20. The video disk of claim 17 wherein said identification information includes the file or sequence title.

21. An optical disk having digital image information recorded thereon, the digital image information including I-picture data for intra-frame coded pictures, P-picture data for predictive coded pictures, and B-picture data for bidirectionally predictive coded pictures, said disk comprising:
 a plurality of recording sectors, each recording sector being associated with an address recorded on said optical disk; and
 a plurality of tracks, each track including a plurality of recording sectors;
 wherein said digital image information is recorded in recording sectors of said optical disk and includes
  a plurality of image data blocks, each image data block including data for a sequence of I-, P-, and B-pictures, and
  file sequence table data, said file sequence table data describing, for each of a plurality of playback sequences, an order of playback for a plurality of said image data blocks and identifying the start point of each image data block in the corresponding playback sequence, including the start point for each of a plurality of intermediate image data blocks of the corresponding playback sequence, wherein said table data identifying start points for image data blocks identifies the start of sequence headers that define formatting parameters needed to reproduce a video sequence.

22. The optical disk according to claim 21, wherein each of said plurality of image data blocks is a group of pictures.

23. The optical disk according to claim 22, wherein each of said plurality of playback sequences is a sequence of groups of pictures.

24. The optical disk according to claim 21, where said file sequence table data includes, for each of a plurality of playback sequences, start points for a plurality of groups of pictures to be played back sequentially.

25. The optical disk according to claim 21, wherein said file sequence table data is stored in a predetermined region of said optical disk.

26. The optical disk according to claim 21, wherein the digital image information recorded on said optical disk includes an image information table that includes, for each image data block, a time code indicating the time for the image data block in a sequence of image data blocks.

27. The optical disk according to claim 26, wherein said image information table further includes the size of each image data block.

28. A method for reproducing and displaying a plurality of selected video segments from one or more optical disks storing digital image information in recording sectors, said stored digital image information including I-picture data for intra-frame coded pictures, P-picture data for predictive coded pictures, and B-picture data for bidirectionally predictive coded pictures, said digital image information stored on said optical disk being arranged as a plurality of image data blocks that each include data for a sequence of I-, P- and B-pictures, said method comprising:

accessing an information table that stores, for each of said plurality of selected video segments, an identification signal indicating the optical disk storing the video segment and a start point indicating the point at which the video segment starts, said information table including information indicating the beginning of sequence headers that define formatting parameters needed to reproduce the video segment;

identifying a corresponding optical disk and start point for each of the plurality of selected video segments to be reproduced and displayed based on the accessed information table;

reproducing digital image information for each of the selected video segments using the corresponding optical disk and the start point; and displaying each of said selected video segments from reproduced digital image information.

29. The method according to claim 28, wherein each of said plurality of selected video segments is an image in a group of pictures.

30. The method according to claim 28, wherein said information table includes a start point of each selected image and a start point of a header for the group of pictures that contains the selected image.

31. The method according to claim 28, wherein said information table is accessed from a memory of a video disk playback device.

32. The method according to claim 28, wherein said one or more optical disks each stores an identification signal and said method further comprises:

reproducing an identification signal stored in the optical disk and comparing the reproduced identification signal with identification signals in the access information table to determine whether the optical disk stores the selected video segment.

33. An apparatus for reproducing and displaying a plurality of selected video segments from one or more optical disks that store digital image information in recording sectors, said stored digital image information including I-picture data for intra-frame coded pictures, P-picture data for predictive coded pictures, and B-picture data for bidirectionally predictive coded pictures, said digital image information stored on said optical disk being arranged as a plurality of image data blocks that each include data for a sequence of I-, P-, and B-pictures, said apparatus comprising:

memory storing an information table that contains, for each of the plurality of selected video segments, an identification signal indicating the optical disk that stores the video segment and a start point indicating at which point the video segment starts, said information table including information indicating the beginning of sequence headers that define formatting parameters needed to reproduce the video segment;

means for accessing said memory to identify the optical disk and the start point for each of the plurality of selected video segments to be reproduced and displayed;

means for reproducing digital image information for each of the selected video segments using the identified optical disk and the start point; and a display for displaying each of the selected video segments from reproduced digital image information.

34. The apparatus according to claim 33, wherein each of said plurality of selected video segments is an image in a group of pictures.

35. The apparatus according to claim 34, wherein said information table stored in said memory includes a start point of each selected image and a start point of a header for the group of pictures that contains the selected image.

36. The apparatus according to claim 33, wherein said one or more optical disks stores an identification signal, said means for reproducing reproduces the identification signal from the optical disk, and said apparatus compares the reproduced identification signal with identification signals in the accessed information table to determine whether the optical disk stores the selected video segment.

\* \* \* \* \*